(12) United States Patent
Humfeld et al.

(10) Patent No.: US 10,786,955 B2
(45) Date of Patent: Sep. 29, 2020

(54) APPARATUSES AND METHODS FOR FABRICATING A COMPOSITE STRUCTURE AND REACTING TO A PLACEMENT FORCE

(71) Applicant: The Boeing Company, Chicago, IL (US)

(72) Inventors: Keith D. Humfeld, Federal Way, WA (US); Adam B. Lubchansky, Denver, CO (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 16/036,215

(22) Filed: Jul. 16, 2018

(65) Prior Publication Data

US 2020/0016849 A1   Jan. 16, 2020

(51) Int. Cl.
*B29C 70/38* (2006.01)

(52) U.S. Cl.
CPC ....... *B29C 70/386* (2013.01); *Y10T 156/1788* (2015.01)

(58) Field of Classification Search
CPC ......... Y10T 156/1348; Y10T 156/1788; B29C 70/386; B29C 70/388
See application file for complete search history.

(56) References Cited

U.S. PATENT DOCUMENTS

| | | | |
|---|---|---|---|
| 6,766,984 B1 | 7/2004 | Ochoa | |
| 7,842,145 B2 | 11/2010 | Hogg | |
| 9,272,769 B2 | 3/2016 | Lin et al. | |
| 2006/0073311 A1 | 4/2006 | Hogg | |
| 2006/0118244 A1 | 6/2006 | Zaballos et al. | |
| 2012/0006475 A1* | 1/2012 | Colombo | B29C 70/388 156/243 |
| 2014/0290866 A1* | 10/2014 | Brufau Redondo | B29C 70/386 156/535 |
| 2015/0217850 A1 | 8/2015 | Tien et al. | |
| 2016/0185030 A1 | 6/2016 | Buckley et al. | |
| 2016/0193806 A1 | 7/2016 | Balabanov et al. | |

FOREIGN PATENT DOCUMENTS

EP   3 002 117   4/2016

OTHER PUBLICATIONS

Müller et al.: "Comparison of integrated rib stiffened and L-blade stiffened composite panels manufactured using simple tooling methods," NLR Netherlands Aerospace Centre (Apr. 1, 2017).
European Patent Office, Extended European Search Report, App. No. 19186210.1 (dated Dec. 6, 2019).
Netherlands Patent Office, Search Report and Written Opinion, App. No. NL2021454 (dated May 23, 2019).

\* cited by examiner

*Primary Examiner* — Scott W Dodds
(74) *Attorney, Agent, or Firm* — Walters & Wasylyna LLC

(57) ABSTRACT

A method for fabricating a composite structure includes steps of: (1) laying up, with a delivery head of a tape placement machine, a continuous segment of a composite tape on a composite panel to form a flange portion of an initial ply of a composite stiffener; (2) locating a backing plate, coupled to the delivery head, relative to the delivery head and the composite panel; and (3) further layup up, with the delivery head, the continuous segment of the composite tape on the backing plate to form a web portion of the initial ply of the composite stiffener.

20 Claims, 34 Drawing Sheets

APPARATUSES AND METHODS FOR FABRICATING A COMPOSITE STRUCTURE AND REACTING TO A PLACEMENT FORCE

FIELD

The present disclosure is generally related to the manufacture of composite structures and, more particularly, to apparatuses and methods for disposing continuous composite tape to form a composite structure and reacting to a placement force associated with disposing the continuous composite tape.

BACKGROUND

Composite structures are typically formed of a composite material that includes a reinforcement material disposed in a matrix material. The composite material is typically placed in a desired shape to form the composite structure. According to one conventional manufacturing method, the composite material is placed by laying a number of composite tapes in the desired shape to progressively build layers of the composite structure. This manufacturing method may be automated using a tape placement machine that is configured to lay a number of layers of the composite tape.

Depending upon a desired application, certain composite structures include one or more stiffening members that prevent undesired movement, flexing, and vibration of the composite structure. In an example, the composite structure may include a composite panel and a number of composite stiffeners that are coupled to the composite panel. Typically, the composite panel and each one of the composite stiffeners are formed separately, such as in accordance with the manufacturing method described above. Following formation of each of these components, the composite stiffeners are placed on the composite panel and the combined composite structure is then cured. However, undesired inconsistencies may be created in the composite structure when placing the composite stiffeners onto the composite panel.

Accordingly, those skilled in the art continue with research and development efforts in the field of composite structure manufacturing.

SUMMARY

In an example, the disclosed method for fabricating a composite structure includes steps of: (1) laying up, with a delivery head of a tape placement machine, a continuous segment of a composite tape on a composite panel to form a flange portion of an initial ply of a composite stiffener; (2) locating a backing plate, coupled to the delivery head, relative to the delivery head; and (3) further layup up, with the deposition head, the continuous segment of the composite tape on the backing plate to form a web portion of the initial ply of the composite stiffener.

In an example, disclosed is a portion of an aircraft assembled according to a method that includes the steps of: (1) laying up, with a delivery head of a tape placement machine, a continuous segment of a composite tape on a composite panel to form a flange portion of an initial ply of a composite stiffener; (2) locating a backing plate, coupled to the delivery head, relative to the delivery head; and (3) further layup up, with the deposition head, the continuous segment of the composite tape on the backing plate to form a web portion of the initial ply of the composite stiffener.

In an example, the disclosed method for reacting to a placement force applied by a tape placement machine laying up a composite tape includes steps of: (1) coupling a backing plate to a delivery head of the tape placement machine with a reaction structure; (2) selectively locating the backing plate relative to the delivery head with a drive assembly; (3) laying up, with the delivery head, the composite tape on the backing plate; (4) applying, by the delivery head, the placement force to the composite tape when laying up the composite tape on the backing plate with the delivery head; and (5) reacting to the placement force through the backing plate to the reaction structure and from the reaction structure back to the delivery head when laying up the composite tape on the backing plate with the delivery head.

In an example, discloses is a portion of an aircraft assembled according to a method that includes steps of: (1) coupling a backing plate to a delivery head of the tape placement machine with a reaction structure; (2) selectively locating the backing plate relative to the delivery head with a drive assembly; (3) laying up, with the delivery head, the composite tape on the backing plate; (4) applying, by the delivery head, the placement force to the composite tape when laying up the composite tape on the backing plate with the delivery head; and (5) reacting to the placement force through the backing plate to the reaction structure and from the reaction structure back to the delivery head when laying up the composite tape on the backing plate with the delivery head.

In an example, the disclosed method for fabricating a composite structure includes a step of laying up, with a tape placement machine, a flange portion, a web portion, a complementary web portion, and a complementary flange portion in a continuous segment of composite tape to form a composite stiffener upon a composite panel while reacting a placement force applied to the web portion and the complementary web portion by a compaction roller of the tape placement machine back into the tape placement machine.

In an example, disclosed is a portion of an aircraft assembled according to a method that includes a step of laying up, with a tape placement machine, a flange portion, a web portion, a complementary web portion, and a complementary flange portion in a continuous segment of composite tape to form a composite stiffener upon a composite panel while reacting a placement force applied to the web portion and the complementary web portion by a compaction roller of the tape placement machine back into the tape placement machine.

In an example, the disclosed method for fabricating a composite structure, including a composite panel with an integral composite stiffener, includes steps of: (1) laying up a composite panel on a mandrel with a tape placement machine; (2) locating a backing plate, coupled to a delivery head of the tape placement machine, to support a portion of a web of the composite stiffener; and (3) laying up the portion of the web on the backing plate with the backing plate reacting a placement force into the delivery head.

In an example, disclosed is a portion of an aircraft assembled according to a method that includes steps of: (1) laying up a composite panel on a mandrel with a tape placement machine; (2) locating a backing plate, coupled to a delivery head of the tape placement machine, to support a portion of a web of the composite stiffener; and (3) laying up the portion of the web on the backing plate with the backing plate reacting a placement force into the delivery head.

In an example, the disclosed apparatus for fabricating a composite structure includes a tape placement machine including a delivery head configured to dispose a composite tape and a backing plate coupled to the tape placement machine and selectively located relative to the delivery head to react to a placement force applied by the tape placement machine as the composite tape is being disposed.

In an example, disclosed is a method for fabricating a portion of an aircraft using an apparatus that includes a tape placement machine including a delivery head configured to dispose a composite tape and a backing plate coupled to the tape placement machine and selectively located relative to the delivery head to react to a placement force applied by the tape placement machine as the composite tape is being disposed.

In an example, the disclosed apparatus for fabricating a composite structure includes a mandrel to support formation of a composite panel of the composite structure. The apparatus also includes a tape placement machine including a delivery head configured to dispose a composite tape and a compaction roller configured to apply a placement force when disposing the composite tape. The apparatus also includes a backing plate coupled to the delivery head and selectively movable relative to the delivery head to support formation of a composite stiffener extending from the composite panel. The backing plate reacts the placement force back to the delivery head when the delivery head disposes the composite tape on the backing plate.

In an example, disclosed is a method for fabricating a portion of an aircraft using an apparatus that includes a mandrel to support formation of a composite panel of the composite structure. The apparatus also includes a tape placement machine including a delivery head configured to dispose a composite tape and a compaction roller configured to apply a placement force when disposing the composite tape. The apparatus also includes a backing plate coupled to the delivery head and selectively movable relative to the delivery head to support formation of a composite stiffener extending from the composite panel. The backing plate reacts the placement force back to the delivery head when the delivery head disposes the composite tape on the backing plate.

In an example, disclosed is a composite structure fabricated using a tape placement machine including a delivery head and a backing plate movably coupled with the delivery head, the composite structure includes a composite panel and a composite stiffener formed in situ on the composite panel and including a web formed on the backing plate and extending from the composite panel.

Other examples of the disclosed apparatuses and methods will become apparent from the following detailed description, the accompanying drawings and the appended claims.

DETAILED DESCRIPTION

Figure 1:
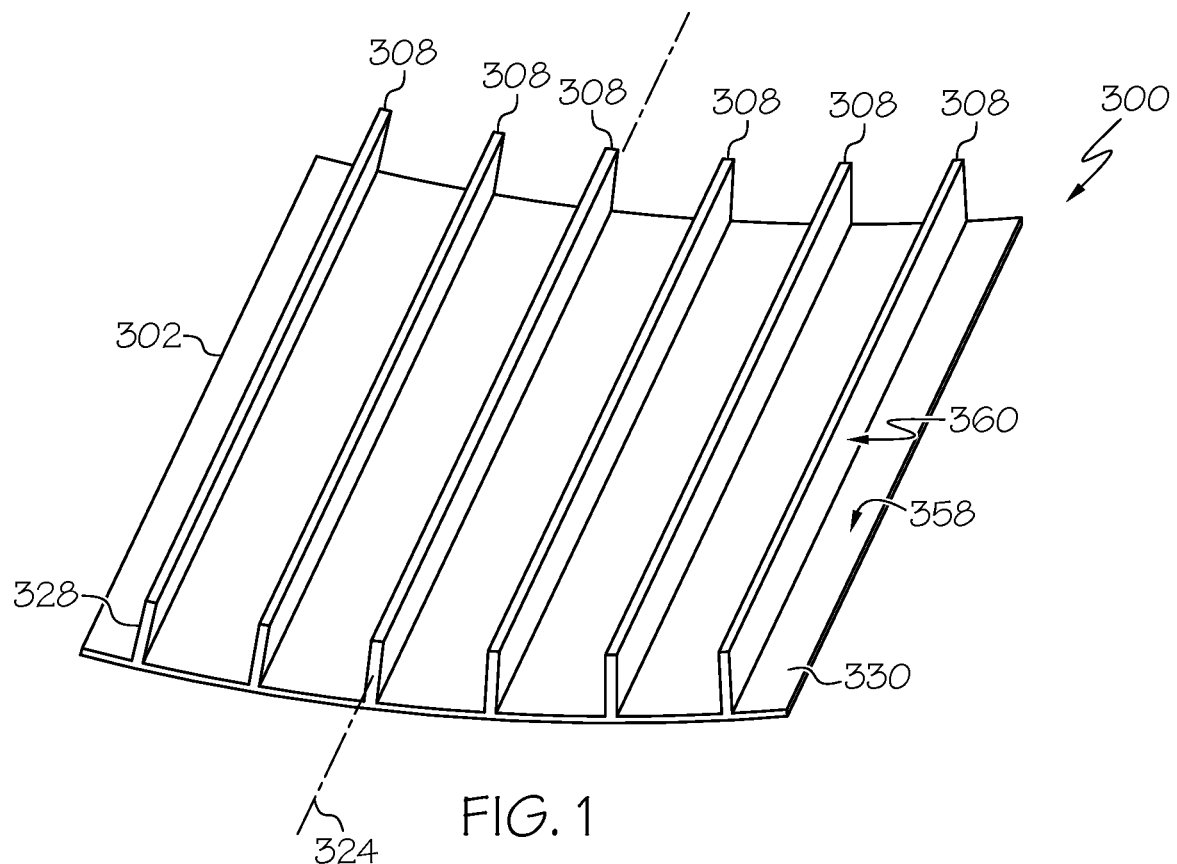
FIG. 1 is a schematic, perspective view of an example of a disclosed composite structure.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below.

The present disclosure provides examples of apparatuses and methods for fabricating composite structures. Such composite structures include at least a first portion and a second portion that extends from or stands up relative to the first portion. Such apparatuses and methods may be used to form the composite structures without the need for complex and expensive tooling configured to correspond to the shapes of the different portions of the composite structures. In addition, such apparatuses and methods enable in situ formation of the upstanding second portions of the composite structures.

Referring to FIG. 1, disclosed in an example of a composite structure 300, such as the composite structure fabricated using the apparatuses and methods disclosed herein. In an example, the composite structure 300 includes a composite panel 302. In some examples, the composite panel 302 is planar. In some examples, the composite panel 302 is curved. The composite structure 300 also includes a number of (one or more) composite stiffeners 308 coupled to the composite panel 302. In this example, the composite panel 302 may be an example of a first portion 358 of the composite structure 300 and the composite stiffener 308 may be an example of a second portion 360 of the composite structure 300.

The composite stiffeners 308 may typically be called blade stiffeners or blade stringers. In an example, each one of the composite stiffeners 308 includes a web 328 that stands up on or projects from an inner surface 330 of the composite panel 302. In the illustrative example, the composite stiffener 308 is approximately perpendicular relative to a location on the inner surface 330 where a base of the web 328 of the composite stiffener 308 is located.

According to the apparatuses and methods disclosed herein, in some examples, the composite stiffeners 308 are formed in situ on the composite panel 302. In some examples, at least a portion of the composite stiffener 308 is integral to the composite panel 302. In other words, both the composite panel 302 and the composite stiffener 308 share at least some plies or layers of composite material. Thus, in some examples, the composite structure 300 includes the composite panel 302 with the composite stiffeners 308 being integral to the composite panel 302 (i.e., a composite panel with integral composite stiffeners 308).

In an example, the composite structure 300 illustrated in FIG. 1 is a portion of a wing of an aircraft. In other examples, the composite structure 300 may be used as a portion of other airfoils, aircraft body panels, or other members for aerospace vehicles and structures, structural members of automobiles, marine vehicles or other vehicles, and the like. In some examples, the composite structure 300 may define a complex geometry, such as one or more contours that are curved about multiple axes, define bends, apertures, or other irregular shapes, and the like.

In an example, the composite panel 302 is a composite skin panel of an aircraft and the composite stiffeners 308 are composite stringers coupled to the composite skin panel. The present disclosure recognizes that aircraft generally include an airframe, which may be regarded as an underlying skeleton, to which composite skin panels are attached to form a smooth aerodynamic outer surface. Similarly, the wings of the aircraft also include an underlying structure covered with composite skin panels. Typically, composite skin panels are light and thin to minimize the weight of the aircraft and increase its payload and range. Since skin panels are thin, they are generally flexible and are often provided with the stiffeners to prevent undesired movement, flexing, and vibration during flight. Aircraft composite skin panels are often provided with the composite stringers to provide the desired stiffening. The composite stringers are essentially upstanding ribs that are fixedly attached to the underside of the composite panel (also referred to as the "inner mold line" or IML) and are generally perpendicular to the plane of the composite panel. The stringers effectively take a flat panel with relatively low stiffness in bending, and substantially increase the bending stiffness. The composite stringers may have a variety of cross-sectional shapes, including those commonly referred to as S-shaped stringers, I-shaped stringers, C-shaped stringers, T-shaped stringers, J-shaped stringers, back-to-back stringers, straight stringer, blade stringers, and any other non-closed cross sectional shaped stringers. The amount of additional stiffness that the stringer provides depends on its size, shape, thickness and the spacing of adjacent stringers.

The present disclosure also recognizes that in the case of composite aircraft, providing a composite skin panel with composite stringers may be complicated, given that the composite panel is a cured carbon fiber composite material, and elongated structural shapes of composite material are generally not produced using the same processes as those used for structural shapes of metal. Instead, structural shapes of composite material are generally produced by heat-curing several different plies of composite material together in a form that provides the desired shape, or by co-consolidated thermoplastic layers. These processes can involve many parts, and can be somewhat labor-intensive. Consequently, fabricating a composite skin panel with co-cured composite stringers may involve significant time and complexity, which adds to the cost of aircraft.

Advantageously, the apparatuses and methods disclosed herein have been developed that provide a stiffened composite structure that reduces the complexity associated with fabrication by enabling in situ formation of a composite stiffener directly on a surface of a composite panel.

Figure 2:
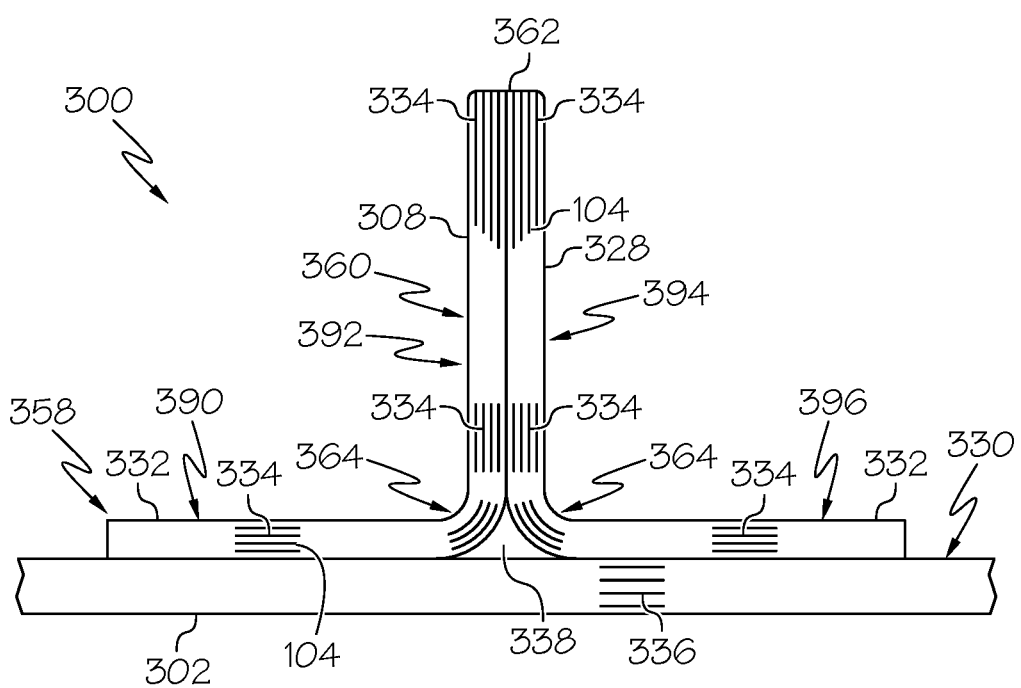
FIG. 2 is a schematic, elevation, sectional view of an example of the disclosed composite structure.
Figure 3:
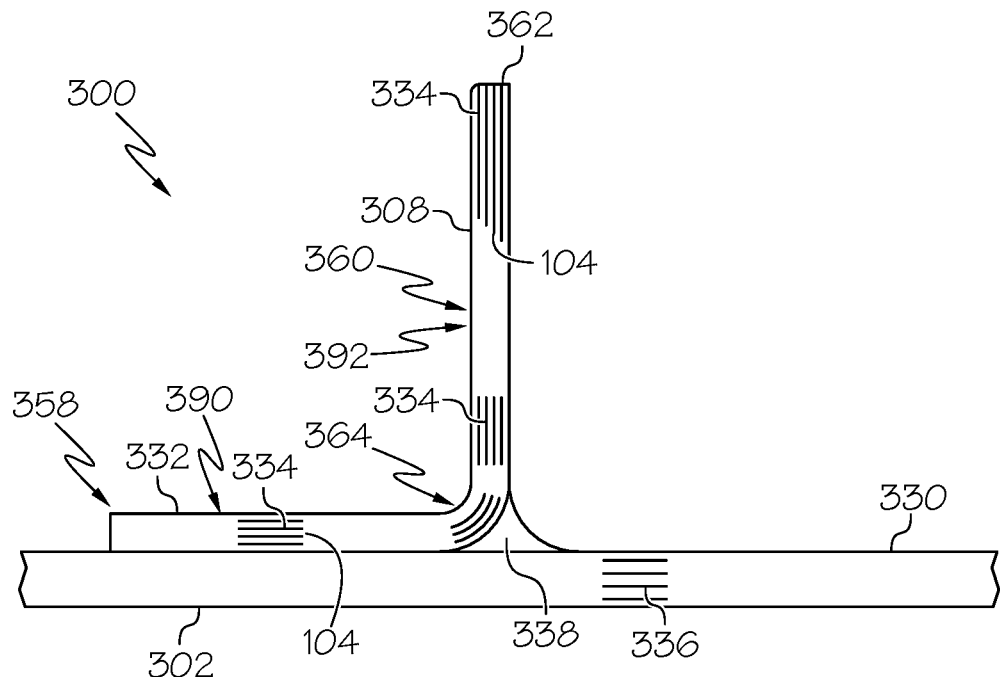
FIG. 3 is a schematic, elevation, sectional view of an example of the disclosed composite structure.
Figure 4:
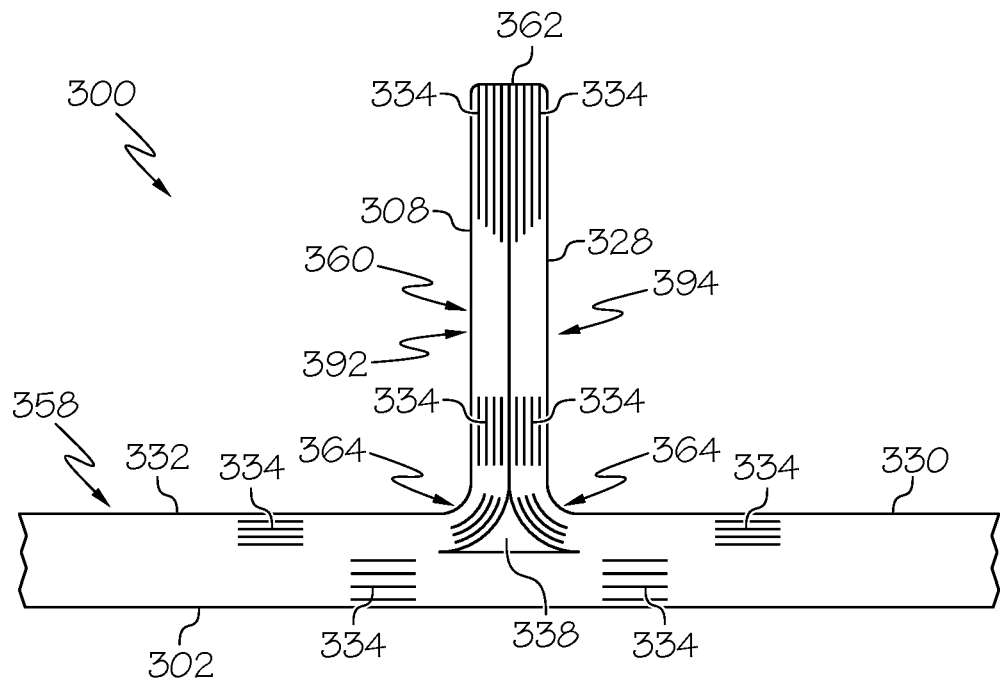
FIG. 4 is a schematic, elevation, sectional view of an example of the disclosed composite structure.

FIGS. 2-4 are schematic, cross-sectional views of examples of the composite stiffener 308 shown coupled to a portion of the composite panel 302. In some examples, as illustrated in FIGS. 2 and 3, the composite stiffener 308 includes a flange 332 and the web 328. In these examples, the flange 332 is disposed along the inner surface 330 of the composite panel 302 and the web 328 that extends from the flange 332. In these examples, the flange 332 of the composite stiffener 308 may be an example of the first portion 358 of the composite structure 300 and the web 328 of the composite stiffener 308 may be an example of the second portion 360 of the composite structure 300.

In some examples, as illustrated in FIG. 4, the composite stiffener 308 includes the web 328. In these examples, the web 328 is disposed along the inner surface 330 of the composite panel 302 and extends from the inner surface 330 of the composite panel 302. In these examples, a portion of the composite panel 302, for example, adjacent to a base of the web 328, may be an example of the first portion 358 of the composite structure 300 and the web 328 of the composite stiffener 308 may be an example of the second portion 360 of the composite structure 300.

In some examples, the web 328 is oriented approximately perpendicularly relative to the flange 332 and/or the inner surface 330 of the composite panel 302 (i.e., the web 328 extends approximately perpendicular from the flange 332 and/or the composite panel 302). In other examples, the web 328 is oriented at any one of various angles relative to the flange 332 and/or the inner surface 330 of the composite panel 302.

In an example of the composite stiffener 308, as illustrated in FIG. 2, the web 328 is located at a middle portion of the flange 332 (e.g., between ends of the flange 332), the flange 332 extends outwardly from opposing sides of the web 328, and the web 328 terminates at a free distal end 362. Such a beam structure or shape of the composite stiffener 308 is commonly referred to as a blade stringer having an inverted T-shape in cross-section or back-to-back L-shapes in cross-section.

In some examples, as illustrated in FIG. 2, the composite stiffener 308 includes a stiffener flange portion 390 that is located on the composite panel 302 and that shares at least some plies 334 of the composite tape 104 with the inner surface 330 of the composite panel 302. The composite stiffener 308 also includes a stiffener web portion 392 that extends (e.g., perpendicular) from the stiffener flange portion 390 and that shares at least some plies 334 of the composite tape 104 with the stiffener flange portion 390. The composite stiffener 308 also includes a stiffener complementary web portion 394 that is in contact with, opposite, and parallel to the stiffener web portion 392 and that shares at least some plies 334 of the composite tape 104 with the stiffener web portion 392. The composite stiffener 308 also includes a stiffener complementary flange portion 396 that extends (e.g., perpendicular) from the stiffener complementary web portion 394, opposite the stiffener flange portion 390, and that shares at least some plies 334 with the stiffener complementary web portion 394. In other words, in some examples, at least some of a plurality of plies 334 forming the composite panel 302 and the composite stiffener 308 are shared by the flange 332 and the web 328 of the composite stiffener 308 and an inner portion of the composite panel 302.

In another example of the composite stiffener 308, as illustrated in FIG. 3, the web 328 is located at an end of the flange 332, the flange extends outwardly from one side of the web 328, and the web terminates at the free distal end 362. Such a beam structure or shape of the composite stiffener 308 is commonly referred to as a stringer having an L-shape in cross-section.

In some examples, as illustrated in FIG. 3, the composite stiffener 308 includes the stiffener flange portion 390 that is located on the composite panel 302 and that shares at least some plies 334 of the composite tape 104 with the inner surface 330 of the composite panel 302. The composite stiffener 308 also includes the stiffener web portion 392 that extends (e.g., perpendicular) from the stiffener flange portion 390 and that shares at least some plies 334 of the composite tape 104 with the stiffener flange portion 390. In other words, in some examples, at least some of a plurality of plies 334 forming the composite panel 302 and the composite stiffener 308 are shared by the flange 332 and the web 328 of the composite stiffener 308 and an inner portion of the composite panel 302.

In another example of the composite stiffener 308 (not illustrated), the web 328 is located at an end of the flange 332, the flange extends outwardly from one side of the web 328, and a second flange is located at the distal end of the web 328 and extends outwardly from an opposing side of the web 328, commonly referred to as a stringer having a Z-shape in cross-section.

In an example of the composite stiffener 308, as illustrated in FIG. 4, the web 328 is located directly on the inner surface 330 of the composite panel 302, the web 328 extends outwardly from the inner surface 330 of the composite panel 302, and the web 328 terminates at a free distal end 362. Such a structure or shape of the composite stiffener 308 is commonly referred to as a blade stringer.

In some examples, as illustrated in FIG. 4, the composite stiffener 308 includes the stiffener web portion 392 that extends (e.g., perpendicular) from the composite panel 302 and that shares at least some plies 334 of the composite tape 104 with the inner surface 330 of the composite panel 302. The composite stiffener 308 also includes the stiffener complementary web portion 394 that is in contact with, opposite, and parallel to the stiffener web portion 392 and that shares at least some plies 334 of the composite tape 104 with the stiffener web portion 392 and with the inner surface 330 of the composite panel 302. In other words, in some examples, at least some of a plurality of plies 334 forming the composite panel 302 and the composite stiffener 308 are shared by the web 328 of the composite stiffener 308 and an inner portion of the composite panel 302.

Referring to FIGS. 2-4, in some examples, the flange 332 and the web 328 of the composite stiffener 308 include, or are formed of, a plurality of plies 334 of the composite tape 104 that are coupled (e.g., bonded) to each other and to the inner surface 330 of the composite panel 302. In some examples, at least a portion of the composite panel 302 is a lay-up of multiple continuous layers or plies 336 of composite material, such as sheets of carbon fiber that are impregnated with a resin material, which are laid atop each other. In some examples, the composite panel 302 is a lay-up of multiple continuous layers or plies 334 of the composite tape 104, which are laid atop each other, for example, using the tape placement machine 102 (FIG. 1). Each portion of the composite stiffener 308 is a lay-up of multiple continuous layers or plies 334 of the composite tape 104, which are laid atop each other. The composite stiffener 308 and the composite panel 302 are then co-cured together as a single unit.

In some examples, as illustrated in FIGS. 2 and 3, the continuous plies 334 of the composite tape 104 forming the flange 332 (e.g., the stiffener flange portion 390 and/or the stiffener complementary flange portion 396) curve upward together into the upstanding web 328 (e.g., the stiffener web portion 392 and the stiffener complementary web portion 394, respectively). In some examples, as illustrated in FIG. 4, some of continuous plies 334 of the composite tape 104 forming the composite panel 302 curve upward together into the upstanding web 328 (e.g., the stiffener web portion 392 and the stiffener complementary web portion 394, respectively). In other words, portions of the lay-up of the continuous plies 334 of the composite tape 104 curve up against each other, where these lay-ups bond together, to form the web 328.

In some examples, as illustrated in FIGS. 2 and 3, a portion of the composite stiffener 308 that forms a transition 364 from the flange 332 to the web 328 is curved (e.g., a transition from the stiffener flange portion 390 to the stiffener web portion 392 and a transition from the stiffener complementary flange portion 396 to the stiffener complementary web portion 394). The curve of the transition 364 has a radius. The radius of the curve forming the transition 364 is the radius of a transition between a portion of the flange 332 and a portion of the web 328 formed by the outermost layer of the composite tape 104 that forms the composite stiffener 308.

In some examples, as illustrated in FIG. 4, a portion of the composite stiffener 308 that forms the transition 364 from the composite panel 302 to the web 328 is curved (e.g., a transition from the inner surface 330 of the composite panel 302 to the stiffener web portion 392 and a transition from the stiffener complementary flange portion 396 to the inner surface 330 of the composite panel 302). The curve of the transition 364 has a radius. The radius of the curve forming the transition 364 is the radius of a transition between a portion of the composite panel 302 and a portion of the web 328 formed by the outermost layer of the composite tape 104 that forms the inner surface 330 of the composite panel 302 and the composite stiffener 308.

In some examples, after each one of the plies 334 of the composite tape 104 is placed to form a respective layer of the stiffener web portion 392 of the web 328, each one of the plies 334 is folded over on itself, at the distal end 362 of the web 328, to from a respective layer of the stiffener complementary web portion 394 of the web 328. In other words, each one of the plies 334 of the composite tape 104 forms a continuous, respective layer of the stiffener web portion 392 and the stiffener complementary web portion 394. This placement configuration may be used to the form the composite stiffener 308 having the inverted T-shape cross-section.

In some examples, a first plurality of plies 334 is placed to form some of or all of the respective layers of the stiffener web portion 392 of the web 328. After at least some of the first plurality of plies 334 are placed, a second plurality of plies 334 is placed to form the respective layers of the stiffener complementary web portion 394 of the web 328. In other words, each one of the first plurality of plies 334 of the composite tape 104 forms a continuous, respective layer of the stiffener web portion 392 and each one of the second plurality of plies 334 forms a continuous, respective layer of the stiffener complementary web portion 394. This placement configuration may be used to form the composite stiffener 308 having the back-to-back L-shape cross-section.

Figure 5:
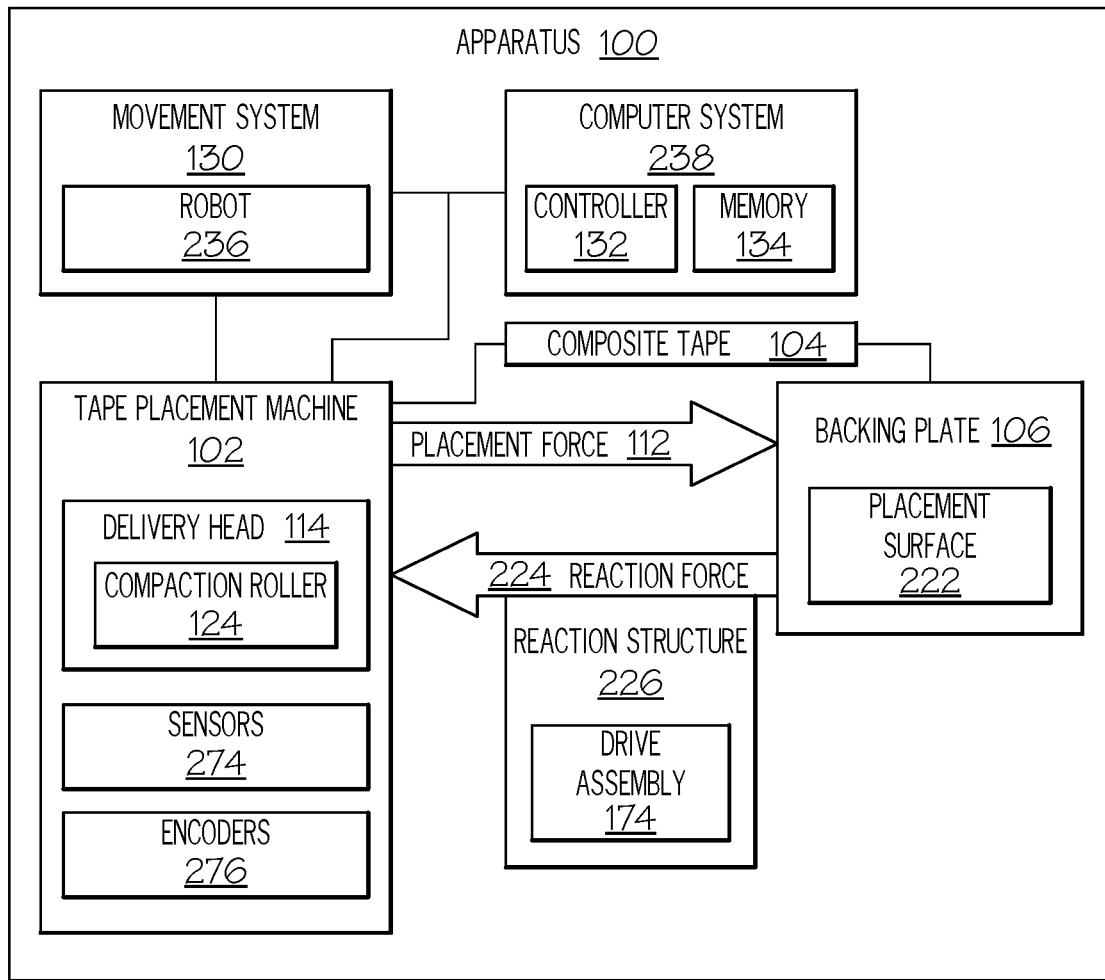
FIG. 5 is a schematic block diagram of a disclosed apparatus for fabricating a composite structure.
Figure 6:
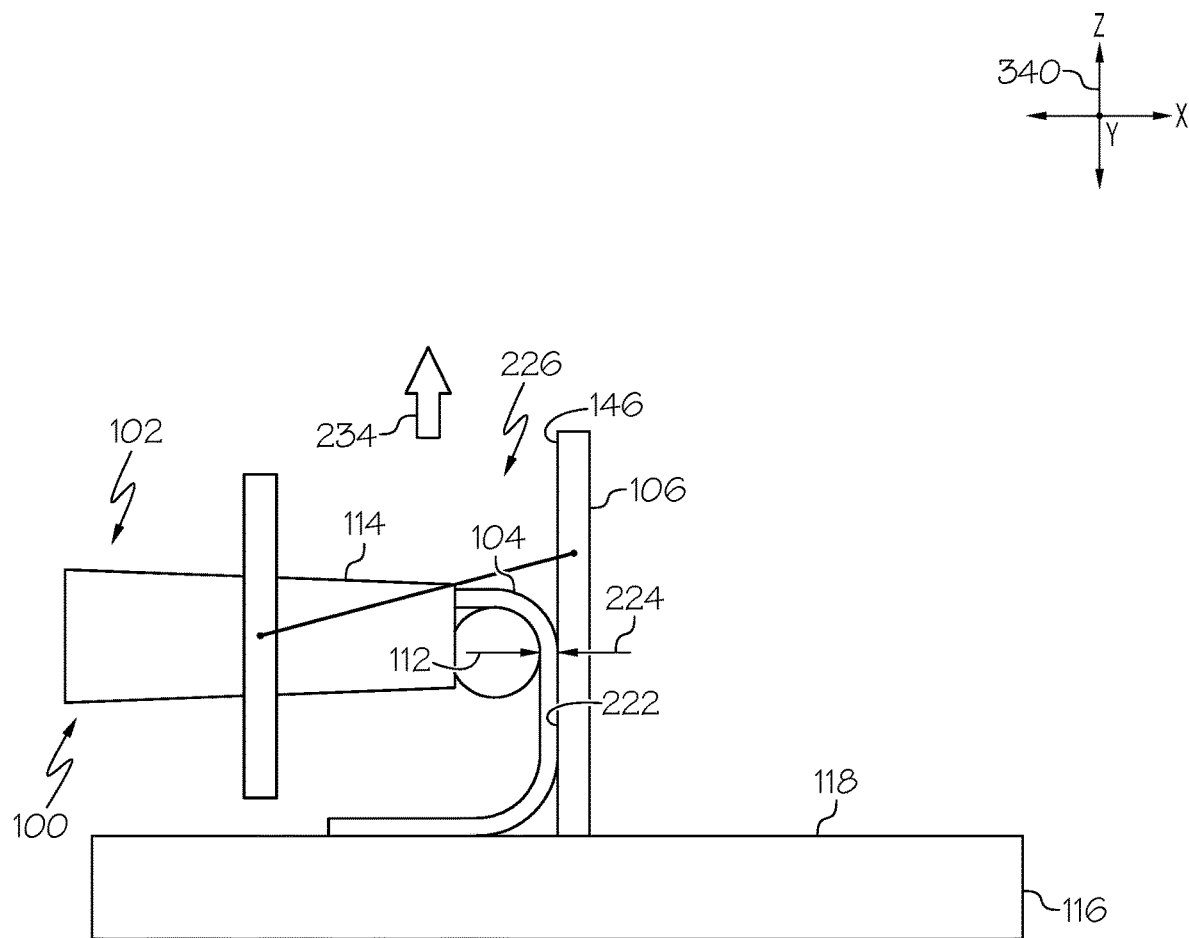
FIG. 6 is a schematic, elevation view of an example of the disclosed apparatus reacting to a placement force.

Referring to FIGS. 5 and 6, disclosed are examples of an apparatus 100 for fabricating or otherwise forming the composite structure 300. The apparatus 100 is configured for disposing the composite tape 104 during formation of the composite structure 300. The apparatus 100 may be used to form composite structures of a variety of materials and having various configurations and shapes.

For the purpose of the present disclosure, the terms "dispose," "disposing," and similar terms have their ordinary meaning as known to those skilled in the art and include putting an item in a particular or a proper arrangement, position, or place. Throughout the present disclosure, phrases such as "disposing the composite tape," "to dispose the composite tape," and similar phrases refer to selectively placing composite tape in a particular position and/or orientation relative to another article. In an example, placing composite tape includes laying a number of (one or more) composite tapes on a surface of an article along a predetermined placement path, commonly referred to as "laying up" the composite tape. Accordingly, throughout the present disclosure, the terms "dispose," "place," "lay," "lay up," and similar terms may be used interchangeably.

In an example, the apparatus 100 includes a tape placement machine 102. The tape placement machine 102 is configured to dispose (e.g., place or lay) the composite tape 104. The tape placement machine 102 is selectively positioned and/or selectively oriented, also referred to herein as selectively located, relative to a placement surface 222 on which the composite tape 104 is disposed. In other words, the tape placement machine 102 is configured to move relative to the placement surface 222 when disposing the composite tape 104. When the composite tape 104 is disposed on the placement surface 222 by the tape placement machine 102, the tape placement machine 102 applies a placement force 112 to the composite tape 104 and, thus, to the placement surface 222. While it is generally described herein that the composite tape 104 be disposed "on" the placement surface 222, it is appreciated that a one layer of the composite tape 104 be disposed directly on the placement surface 222 and that each subsequent layer of the composite tape 104 be disposed on a previous layer of the composite tape 104.

The apparatus 100 also includes a backing plate 106. The backing plate 106 is coupled to the tape placement machine 102. The backing plate 106 is selectively positioned and/or selectively oriented, also referred to herein as selectively located, relative to the tape placement machine 102 to serve as the placement surface 222. In other words, the backing plate 106 is configured to move relative to the tape placement machine 102 for the tape placement machine 102 to dispose the composite tape 104 on the backing plate 106. With the backing plate 106 selectively located for use as the placement surface 222, the tape placement machine 102 is selectively located relative to the backing plate 106. In other words, the tape placement machine 102 is configured to move relative to the backing plate 106 when disposing the composite tape 104.

Referring to FIG. 6, when the backing plate 106 is used as the placement surface 222, the backing plate 106 is configured to react to the placement force 112, applied by the tape placement machine 102 as the composite tape 104 is being disposed (e.g., placed or laid) on the backing plate 106. In other words, the backing plate 106 provides a reaction force 224 that is equal to and opposite the placement force 112. In an example, the apparatus 100 includes a reaction structure 226 that couples the backing plate 106 and the tape placement machine 102 together and, thereby, forms a closed force-reaction system. In other words, when disposing the composite tape 104, the placement force 112 is applied to the backing plate 106 and is reacted by the backing plate 106, through the reaction structure 226, and back into the tape placement machine 102.

For the purpose of this disclosure, the term "placement force" refers to a force, or load, exerted on the composite tape 104 and the placement surface 222 by the tape placement machine 102 that is sufficient to adequately compress or compact the composite tape 104 on the placement surface 222 when the tape placement machine 102 disposes the composite tape 104. Generally, the placement force 112, applied by the tape placement machine 102, is directed toward the placement surface 222 (e.g., in a direction approximately normal to a relative location on the placement surface 222). For the purpose of this disclosure, the terms "react to," "reacting to," and similar terms, for example, in reference to the backing plate 106 reacting to the placement force 112, refer to providing the reaction force 224 that acts in the opposite direction to the placement force 112. Thus, for the purpose of this disclosure, the term "reaction force" refers to a force exerted on the composite tape 104 and the tape placement machine 102 by the placement surface 222 that is equal to and opposite the placement force 112.

The tape placement machine 102 may take the form of any suitable machine, apparatus, or device configured to handle the composite tape 104 and accurately place the composite tape 104 on a placement surface along a computer programmed placement path or course. The tape placement machine 102 is configured to lay the composite tape 104 in a variety of configurations corresponding to a selected placement surface 222 to thereby form one or more portions of the composite structure 300 to the desired shape. In an example, the tape placement machine 102 is a commercially available automated tape layer configured to accept composite tape having various widths. In an example, the tape placement machine 102 is an automated tape layup machine (ATLM). In an example, the tape placement machine 102 is a flat tape laying machine (FTLM). In an example, the tape placement machine 102 is a contour tape laying machine (CTLM).

In an example, the tape placement machine 102 includes a delivery head 114, also referred to as a tape placement head. The delivery head 114 is configured to, or is used to, dispose (e.g., place or lay) the composite tape 104 in a configuration corresponding to the desired shape of the composite structure 300. In an example, the backing plate 106 is coupled to the delivery head 114 and is selectively located relative to the delivery head 114 to react to the placement force 112 applied by the delivery head 114 as the composite tape 104 is being disposed. In an example, the reaction structure 226 couples the backing plate 106 and the delivery head 114 together to form the closed force-reaction system.

Figure 7:
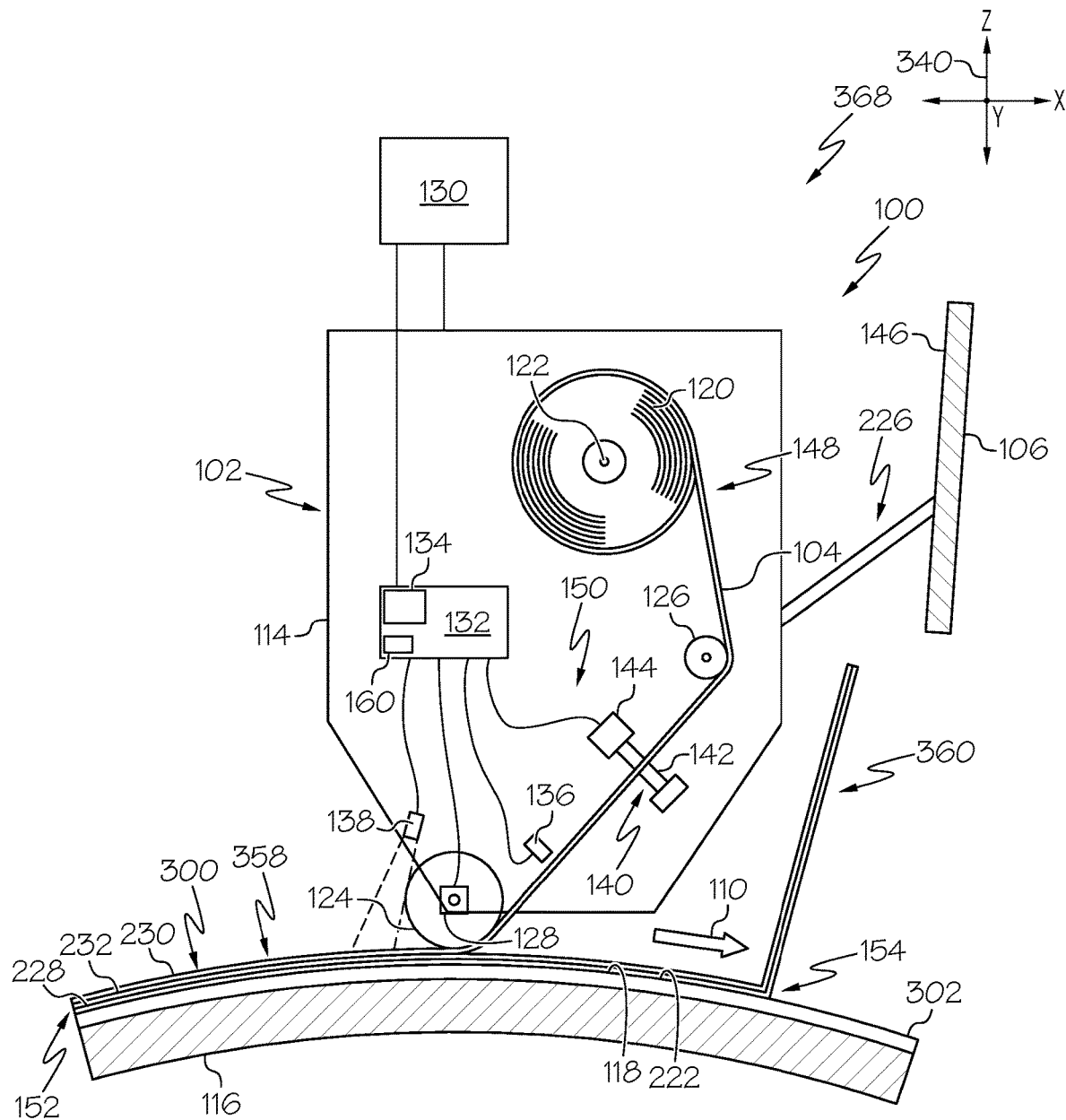
FIG. 7 is a schematic, elevation view of an example of the disclosed apparatus.
Figure 8:
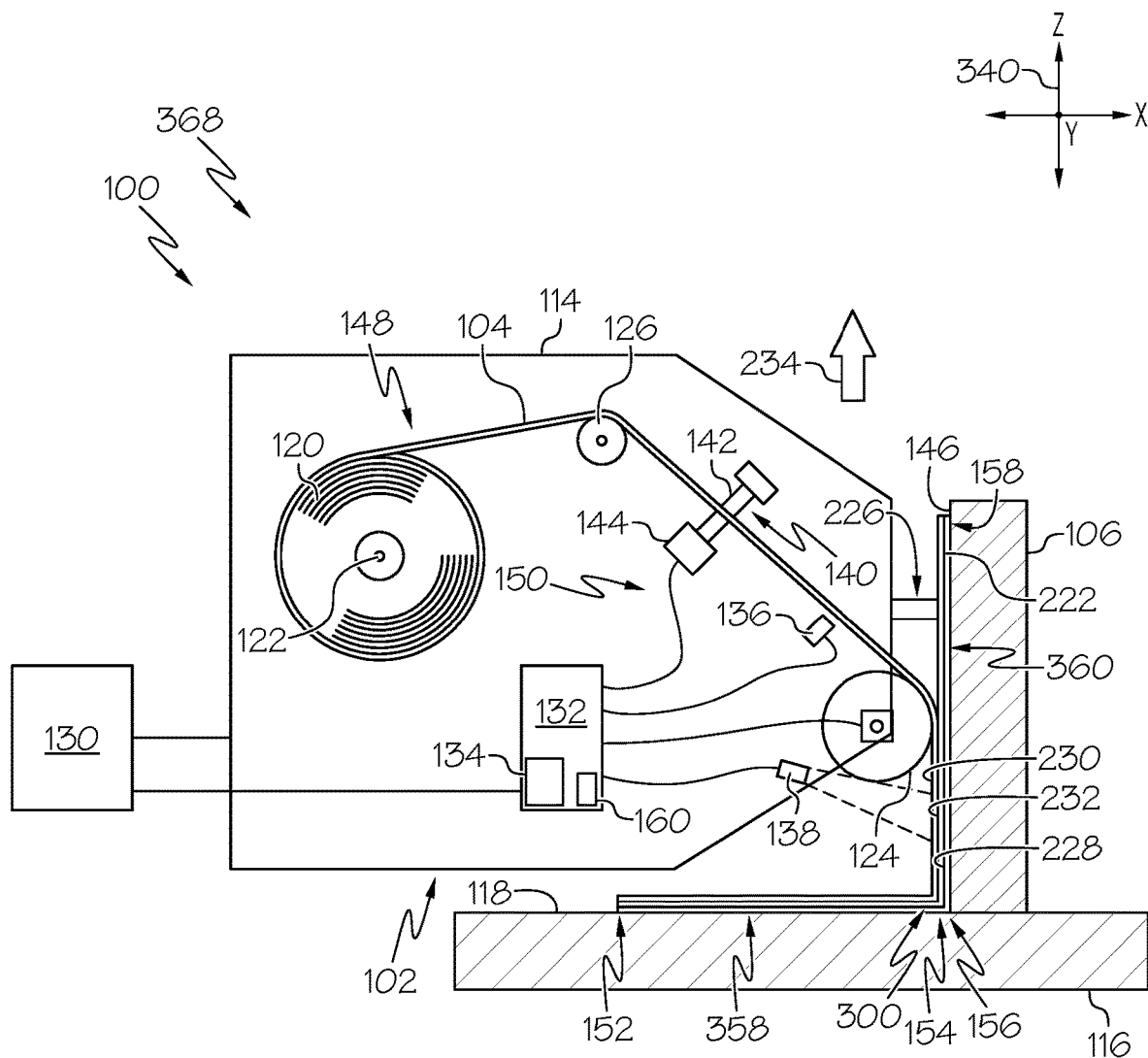
FIG. 8 is a schematic, elevation view of an example of the disclosed apparatus.

FIG. 7 schematically illustrates an example implementation of a method for using the disclosed apparatus 100 to form a portion (e.g., the first portion 358) of the composite structure 300. FIG. 8 schematically illustrates an example implementation of a method for using the disclosed apparatus 100 to form another portion (e.g., the second portion 360) of the composite structure 300. In an example, as illustrated in FIG. 7, the apparatus 100 is configured to form the first portion 358 of the composite structure 300 on a mandrel 116. In an example, as illustrated in FIG. 8, the apparatus 100 is also configured to form the second portion 360 of the composite structure 300 on the backing plate 106.

In an example, the mandrel 116 is a tool with a tool surface 118) having a shape that is imparted to the composite tape 104 and, thereby, to at least a portion (e.g., the first portion 358) of the composite structure 300. In an example, as illustrated in FIG. 7, the tool surface 118 is a contour surface. In an example, as illustrated in FIG. 8, the tool surface 118 is a planar surface. It is appreciated that various types of mandrels may be used and that the mandrel 116 may have a variety of shapes and/or sizes and may define a variety of contours.

Referring to FIG. 7, in an example, the mandrel 116 and, more particularly, the tool surface 118 of the mandrel 116, serves as the placement surface 222 for placing the composite tape 104 to form the first portion 358 of the composite structure 300 using the tape placement machine 102. In an example implementation of a first portion of the method for using the apparatus 100, the delivery head 114 is selectively located relative to the mandrel 116 so that the delivery head 114 comes into contact with the mandrel 116 to place the composite tape 104 on the tool surface 118.

While it is generally described herein that the composite tape 104 be disposed "on" the mandrel 116, it is appreciated that a first layer 228 of the composite tape 104 be disposed directly on the mandrel 116, a second layer 232 be disposed on the first layer 228 of the composite tape 104, a third layer 230 of the composite tape 104 be disposed on the second layer 232 of the composite tape 104, etc. In other words, each subsequent layer of the composite tape 104 is disposed on a previous layer of the composite tape 104.

In an example, when disposing the composite tape 104 on the mandrel 116, the delivery head 114 is moved linearly along one or more axes of a three-axis coordinate system and/or is rotationally oriented about one or more axes of the three-axis coordinate system, for example, relative to an environment reference frame 340 of a manufacturing environment 368. In other words, the delivery head 114 is linearly and/or rotationally moved relative to the mandrel 116 to position the delivery head 114 in contact with the tool surface 118 (e.g., when the placement surface 222 is defined by the mandrel 116) and to dispose the composite tape 104 on the mandrel 116.

For the purpose of this disclosure, the environment reference frame 340 refers to a reference coordinate system that is defined with respect to the manufacturing environment 368. In an example, the environment reference frame 340 is a three-dimensional Cartesian coordinate system that is defined by an X-axis, a Y-axis, and a Z-axis. It can be appreciated that the Y-axis of the environment reference frame 340 appears as a point in FIGS. 7-9 and 17-30.

When the delivery head 114 is disposing the composite tape 104 on the mandrel 116, the backing plate 106 is selectively located relative to the delivery head 114 and the mandrel 116 so that the backing plate 106 does not obstruct or otherwise interfere with placement of composite tape 104 on the mandrel 116.

Once the delivery head 114 is in contact with the mandrel 116, the delivery head 114 is configured to move relative to the mandrel 116 to dispose the composite tape 104 on the tool surface 118 in a predetermined configuration or lay up. In an example, the delivery head 114 moves along a programmed placement path, indicated by directional arrow 110, to lay each layer of the composite tape 104 on the mandrel 116.

Typically, the delivery head 114 is moved generally linearly along the tool surface 118 of mandrel 116 (e.g., the placement surface 222) following the placement path, indicated by directional arrow 110. In an example, the delivery head 114 is moved along the tool surface 118 of the mandrel 116 in multiple passes, with a layer of the composite tape 104 being disposed in each pass to form one or more portions of the composite structure 300.

In an example, as illustrated in FIG. 7, the delivery head 114 moves along the placement path, indicated by directional arrow 110, from a first mandrel location 152 (e.g., a start location of the placement path) on the mandrel 116 to a second mandrel location 154 (e.g., an end location of the placement path) on the mandrel 116, opposite the first mandrel location 152, to dispose the first layer 228 of the composite tape 104. The delivery head 114 then returns to the first mandrel location 152 to start another pass. As will be described in more detail herein, in some examples, during one or more passes, the delivery head 114 may at least partially rotate, for example, about the Z-axis of the environment reference frame 340 to lay down the composite tape 104 in other directions. As such, an orientation of reinforcing fibers of the composite tape 104 forming the plies or layers of the composite structure 300 may change from ply to ply, for example, from orientations of +/−90 degrees, +/−45 degrees, etc. The delivery head 114 moves along the placement path, indicated by directional arrow 110, from the first mandrel location 152 to the second mandrel location 154 to dispose the second layer 232 of the composite tape 104 in the same direction as the first layer 228. This operation is repeated to dispose any additional layers (e.g., the third layer 230, a fourth layer, a fifth layer, etc.) of the composite tape 104.

Referring to FIG. 8, in an example, the delivery head 114 and the backing plate 106 are selectively located relative to each other and the mandrel 116 so that the backing plate 106 provides, or serves as, the placement surface 222 for disposing the composite tape 104 to form the second portion 360 of the composite structure 300 using the tape placement machine 102. In an example implementation of a second portion of the method for using the apparatus 100, the delivery head 114 is selectively located relative to mandrel 116 and the backing plate 106 and the backing plate 106 is selectively located relative to the delivery head 114 and the mandrel 116 so that the delivery head 114 comes into contact with the backing plate 106 to place the composite tape 104 on the plate surface 146. In other words, the delivery head 114 and, thus, the layer of the composite tape 104 rotates about the Y-axis of the environment reference frame 340 to lay up the composite tape 104 on the backing plate 106.

While it is generally described herein that the composite tape 104 be disposed "on" the backing plate 106, it is appreciated that the first layer 228 of the composite tape 104 be disposed directly on the backing plate 106, the second layer 232 be disposed on the first layer 228 of the composite tape 104, the third layer 230 of the composite tape 104 be disposed on the second layer 232 of the composite tape 104, etc. In other words, each subsequent layer of the composite tape 104 is disposed on a previous layer of the composite tape 104.

In an example, the backing plate 106 is a tool, such as a mandrel, with a plate surface 146 having a shape that is imparted to the composite tape 104 and, thereby, to at least a portion (e.g., the second portion 360) of the composite structure 300. In other words, the plate surface 146 of the backing plate 106 serves as the placement surface 222 for placing the composite tape 104. In an example, the plate surface 146 is a planar surface. In an example, the plate surface 146 is a contour surface. It is appreciated that various types of plate members may be used and that the backing plate 106 may have a variety of shapes and/or sizes and may define a variety of contours. Generally, the shape of the backing plate 106 is compatible with formation of a portion (e.g., the second portion 360) of the composite structure 300 that projects from the tool surface 118 of the mandrel 116 or otherwise stands up relative to another portion (e.g., the first portion 358) of the composite structure 300.

In an example, when disposing the composite tape 104 on the backing plate 106, each one of the delivery head 114 and the backing plate 106 is moved linearly along one or more axes of a three-axis coordinate system and/or is rotationally oriented about one or more axes of the three-axis coordinate system, for example, relative to the environment reference frame 340 of the manufacturing environment 368. In other words, one or both of the delivery head 114 and/or the backing plate 106 is linearly and/or rotationally moved relative to the mandrel 116 and each other to position the delivery head 114 in contact with the plate surface 146 (e.g., when the placement surface 222 is defined by the backing plate 106) and to dispose the composite tape 104 on the backing plate 106.

When disposing the composite tape 104 on the backing plate 106 with the delivery head 114, the backing plate 106 does not move (the position and/or orientation of the backing plate 106 does not change) relative to the composite tape 104 being placed. The delivery head 114 moves relative to the backing plate 106 as the composite tape 104 is being placed on the backing plate 106 with the delivery head 114.

In the illustrative example, the backing plate 106 is selectively moved linearly and/or rotationally to a position proximate to (e.g., at or near) the tool surface 118 of the mandrel 116 and an orientation approximately normal to a relative location on the tool surface 118 of the mandrel 116. In other words, the backing plate 106 is located so that the plate surface 146 serves as a continuation of the placement surface 222 from the tool surface 118. The delivery head 114 is selectively moved rotationally (e.g., approximately 90-degrees) and/or linearly (e.g., toward the backing plate 106) to position the delivery head 114 in contact with the backing plate 106 to continue disposing the composite tape 104 on the backing plate 106 from the mandrel 116.

Once the delivery head 114 is in contact with the backing plate 106, the delivery head 114 is configured to move relative to the mandrel 116 and to the backing plate 106 to dispose the composite tape 104 on the plate surface 146 in a predetermined configuration or lay up. In an example, the delivery head 114 moves along a programmed placement path, indicated by directional arrow 234, to lay each layer of the composite tape 104 on the backing plate 106.

When the delivery head 114 is disposing the composite tape 104 on the backing plate 106 (i.e., during placement of the composite tape 104), the location of the backing plate 106 relative to the environment reference frame 340 is fixed.

In other words, the backing plate 106 serves as a fixed force-reacting support for the composite tape 104 and, thus, reacts to the placement force 112 (FIGS. 5 and 6.) applied to the composite tape 104 by the delivery head 114 by transferring the placement force 112 from the backing plate 106, through the reaction structure 226, and back to the delivery head 114.

Typically, the delivery head 114 is moved generally rotationally (e.g., tilts), for example, about the Y-axis of the environment reference frame 340, to transition from the programmed placement path, indicated by directional arrow 110 (FIG. 7), to the programmed placement path, indicated by directional arrow 234 (FIG. 8). The delivery head 114 is then moved generally linearly along the plate surface 146 of the backing plate 106 (e.g., the placement surface 222) following the programmed placement path, indicated by directional arrow 234, to lay the composite tape 104 in a plane on the plate surface 146 of the backing plate 106. In an example, the delivery head 114 is moved along the plate surface 146 of the backing plate 106 in multiple passes, with a layer of the composite tape 104 being disposed in each pass to form one or more portions of the composite structure 300.

In an example, as illustrated in FIG. 8, the delivery head 114 moves along the placement path, indicated by directional arrow 234, from a first plate location 156 (e.g., a start location of the placement path) on the backing plate 106 to a second plate location 158 (e.g., a stop location of the placement path) on the backing plate 106, opposite the first plate location 156, to dispose the first layer 228 of the composite tape 104. The delivery head 114 then returns to the first plate location 156 to start another pass. In an example, the delivery head 114 again moves along the placement path, indicated by directional arrow 234, from the first plate location 156 to the second plate location 158 to dispose the second layer 232 of the composite tape 104 in the same direction and, thus, the same fiber orientation, as the first layer 228. In an example, the delivery head 114 moves along a different placement path (not illustrated in FIG. 8), which is oriented in a different direction than the placement path, indicated by directional arrow 234, for example, by partially rotating the delivery head 114 about the X-axis of the environment reference frame 340, to dispose the second layer 232 of the composite tape 104 in a different direction and, thus, a different fiber orientation, than the first layer 228. This operation is repeated to dispose any additional layers (e.g., the third layer 230, a fourth layer, a fifth layer, etc.) of the composite tape 104.

Thus, in an example implementation of a method for using the apparatus 100 to form the composite structure 300, as illustrated in the combination of FIGS. 7 and 8, the delivery head 114 selectively moves, for example, linearly along the X-axis of the environment reference frame 340, relative to the mandrel 116 along a first placement path, indicated by directional arrow 110 (FIG. 7), from the first mandrel location 152 to the second mandrel location 154 to dispose a first portion of the first layer 228 of the composite tape 104 on the mandrel 116 and partially form the first portion 358 of the composite structure 300. The backing plate 106 is then selectively moved, for example, rotationally about the Y-axis of the environment reference frame 340 and/or linearly along the Z-axis of the environment reference frame 340, relative to the delivery head 114 and the mandrel 116 so that the plate surface 146 serves as a continuation of the placement surface 222 and a second portion of the first layer 228 of the composite tape 104 can be disposed on the plate surface 146. The delivery head 114 is then selectively moved, for example, rotationally about the Y-axis of the environment reference frame 340, relative to the mandrel 116 so that the delivery head 114 transitions from the first placement path, indicated by directional arrow 110, to a second placement path, indicated by directional arrow 234 (FIG. 8). The delivery head 114 then selectively moves, for example, linearly along the Z-axis of the environment reference frame 340, relative to the backing plate 106 along the second placement path, indicated by directional arrow 234, from the first plate location 156 to the second plate location 158 to dispose the second portion of the first layer 228 of the composite tape 104 on the backing plate 106 and partially form the second portion 360 of the composite structure 300. In addition, selective rotational movement of the delivery head 114, for example, about the Z-axis of the environment reference frame 340 when disposing the composite tape 104 on the mandrel 116 or about the X-axis of the environment reference frame 340 when disposing the composite tape 104 on the backing plate 106, enables laying the composite tape 104 in a +45-degree orientation or a −45-degree orientation or a 90-degree orientation. The delivery head 114 then returns to the first mandrel location 152 to start another pass. The delivery head 114 then selectively moves, for example, linearly along the X-axis of the environment reference frame 340, relative to the mandrel 116 along the first placement path, indicated by directional arrow 110, from the first mandrel location 152 to the second mandrel location 154 to dispose a first portion of the second layer 232 of the composite tape 104 on the first portion of the first layer 228 of the composite tape 104 and further form the first portion 358 of the composite structure 300. The backing plate 106 is then selectively moved, for example, rotationally about the Y-axis of the environment reference frame 340 and/or linearly along the Z-axis of the environment reference frame 340, relative to the delivery head 114 and the mandrel 116 so that the plate surface 146 is in contact with a surface of the second portion of the first layer 228, opposite the delivery head 114, to back up the second portion of the first layer 228 and so that a second portion of the second layer 232 of the composite tape 104 can be disposed on the second portion of the first layer 228 of the composite tape 104, supported from behind by the plate surface 146. The delivery head 114 is then selectively moved, for example, rotationally about the Y-axis of the environment reference frame 340, relative to the mandrel 116 so that the delivery head 114 transitions from the first placement path, indicated by directional arrow 110, to the second placement path, indicated by directional arrow 234. The delivery head 114 then continues to selectively move, for example, linearly along the Z-axis of the environment reference frame 340, relative to the backing plate 106 along the second placement path, indicated by directional arrow 234, from the first plate location 156 to the second plate location 158 to dispose the second portion of the second layer 232 of the composite tape 104 on the second portion of the first layer 228 of the composite tape 104 and further form the second portion 360 of the composite structure 300. In addition, selective rotational movement of the delivery head 114, for example, about the Z-axis of the environment reference frame 340 when disposing the composite tape 104 on the mandrel 116 or about the X-axis of the environment reference frame 340 when disposing the composite tape 104 on the backing plate 106, enables laying the composite tape 104 in a +45-degree orientation or a −45-degree orientation or a 90-degree orientation. This operation is repeated to dispose any additional layers (e.g., the third layer 230, a fourth layer, a fifth layer, etc.) of the composite tape 104.

In some examples, the composite tape 104 has a sufficient tack, or stickiness, such that when the first layer 228 of the composite tape 104 is disposed on the tool surface 118 of the mandrel 116 and compacted by the compaction roller 124, the composite tape 104 adheres to the tool surface 118. When the delivery head 114 transitions from disposing the composite tape 104 on the mandrel 116 to disposing the composite tape 104 on the backing plate 106 (e.g., transitions from the first placement path, indicated by directional arrow 110, to the second placement path, indicated by directional arrow 234), a sufficient length of the composite tape 104 is fed from the delivery head 114 so as to not lift or otherwise pull the first portion of the first layer 228 of the composite tape 104 from the tool surface 118.

In the illustrative example, the second placement path, indicated by directional arrow 234, is approximately perpendicular to the first placement path, indicated by directional arrow 110, so that the second portion 360 of the composite structure 300 extends from and is formed approximately perpendicular to the first portion 358 of the composite structure 300.

Referring still to FIGS. 7 and 8, in an example, the apparatus 100 includes a supply of one or more composite tapes 104, which is dispensed by the delivery head 114 and is disposed on the placement surface 222, such as the tool surface 118 of the mandrel 116 (FIG. 7) or the plate surface 146 of the backing plate 106 (FIG. 8). In an example, the composite tape 104 is supplied in a dispenser 148. In an example, the dispenser 148 includes a roll 120 of the composite tape 104 that is supported on a spool 122 mounted to the tape placement machine 102. In the illustrative example, the dispenser 148 is mounted to or is located in the delivery head 114. In other examples, dispenser 148 may be located remotely from the delivery head 114.

In some examples, the dispenser 148 includes multiple rolls 120 of the composite tape 104 or other supply devices that provide multiple composite tapes 104 to be simultaneously disposed by the delivery head 114 on the placement surface 222 and which operate in parallel to form a portion of a ply, or layer, of the composite structure 300. Alternatively, a single composite tape 104 may be disposed in one or more portions. For example, a single composite tape 104 may be severed into multiple portions that are disposed successively on the placement surface 222 or the single composite tape 104 may be disposed continuously on the placement surface as a single piece without being severed. That is, the "plurality of composite tapes" or "multiple composite tapes" referred to herein may be disposed as a single piece of composite tape that defines a plurality of adjacent elongate portions.

In an example, the spool 122 supporting the roll 120 of the composite tape 104 is rotationally mounted so that the composite tape 104 can be dispensed from the roll 120. The composite tape 104 is supplied from the roll 120 to a placement guide 150 that controls the placement of the composite tape 104 on the placement surface (e.g., the tool surface 118 or the plate surface 146).

In an example, the placement guide 150 includes one or more compaction rollers 124 that are rotationally mounted to the delivery head 114 so that the delivery head 114 can be moved over the placement surface 222 with the compaction roller 124 in rolling contact therewith. As illustrated in FIG. 2, the apparatus 100 exerts the placement force 112 on the placement surface 222 via the delivery head 114 through the compaction roller 124. The placement force 112 is generally applied toward the placement surface 222, for example, the placement force 112 is approximately normal to the placement surface 222, so that the compaction roller 124 exerts the placement force 112 (e.g., a compaction pressure) on the composite tape 104 to press it against the placement surface 222. The apparatus 100 reacts to the placement force 112 via the backing plate 106 through the reaction structure 226 back to the delivery head 114 so that the reaction force 224 exerted on the compaction roller 124 cancels the placement force 112 (e.g., the sum of the forces is zero).

In an example, the compaction roller 124 is adjustably mounted to the delivery head 114 by one or more roller mounts 128. The roller mount 128 adjusts the position of the compaction roller 124 relative to the rest of the delivery head 114 so that the compaction roller 124 can apply varying pressures against the composite tape 104 and the placement surface 222 (e.g., the mandrel 116 or the backing plate 106) or otherwise control the placement of the composite tape 104. In an example, application of the placement force 112 is exerted through the compaction roller 124 via the roller mount 128. While the illustrative example of the placement guide 150 includes the compaction roller 124, in other examples, the placement guide 150 may include other types of compaction devices, such as a compaction shoe or a press.

In an example, the apparatus 100 also includes a movement system 130. The movement system 130 is configured to locate the tape placement machine 102 when disposing the composite tape 104. More particularly, the movement system 130 is configured to move the delivery head 114 relative to the placement surface 222 to achieve the desired relative location of the delivery head 114 relative to the placement surface 222 for disposing the composite tape 104. In an example, as illustrated in FIG. 7, the movement system 130 moves the delivery head 114 relative to the mandrel 116 to achieve the desired location, position, and/or orientation of the delivery head 114 relative to the tool surface 118 for placing the composite tape 104 on the mandrel 116. In an example, as illustrated in FIG. 8, the movement system 130 moves the delivery head 114 relative to the backing plate 106 to achieve the desired location, position, and/or orientation of the delivery head 114 relative to the plate surface 146 for placing the composite tape 104 on the backing plate 106.

The movement system 130 may include various drive devices such as pneumatic or hydraulic actuators, electrical motors or servos, and/or chain, gear, or shaft drive mechanisms. In an example, the movement system 130 includes, or takes the form of, a robot 236 (FIG. 5) or other robotic arm that is configured to move the tape placement machine 102, or at least the delivery head 114, about a number of axes relative to the placement surface. In an example, the robot 236 includes a base, one or more arms, and one or more actuators (e.g., servomotors) that are operable to move the various arms. It is noted that the robot 236 may be include a greater or less number of arms and/or different types of members such that any desirable range of rotational and/or translational movement of the delivery head 114 may be provided. In other examples, the movement system 130 may include a gantry robot or other suitable types of movement assemblies.

In some examples, the tape placement machine 102 may also include various other components. In an example, the placement guide 150 includes one or more guide rollers 126 that are rotationally mounted to the delivery head 114 to guide the composite tape 104 along or through the delivery head 114. Any number of guide rollers 126 may be provided, and in some examples, some or all of the guide rollers 126 may be driven by a motor or other actuator to control the motion of the composite tape 104.

In an example, the tape placement machine 102 includes a heater 136 for heating the composite tape 104. In some examples, the heater 136 is a laser, a laser diode array, a hot gas torch, an electric heater, an infrared heater, or another type of suitable heating device. The heater 136 typically delivers sufficient energy to permit the composite tape 104, once subjected to compaction forces (i.e., the placement force 112), for example, applied by the compaction roller 124, to adhere to an underlying composite tape 104. In other words, the composite tape 104 is heated sufficiently to facilitate a desired tact of the composite tape 104 to the surface on which it is applied.

The heater 136 may include multiple independent heating elements, such as that form an array. Each heating element may be coupled to a power source in a manner independent of the other laser elements so that the operating power of each heating element can be controlled independently of the other heating elements. Further, the individual heating elements may be arranged so that each is configured to heat a particular area or zone, which can be defined by the composite tape 104, before and/or after being disposed on the placement surface. Thus, by altering the operating power of one or more of the heating elements, the heating of a particular one of the composite tapes 104 or a particular area of the composite tapes 104 may be controlled independently of the heating of other composite tapes 104. Non-uniform heating of the zones may be desirable, for example, if the composite tapes 104 are not the same size or are not made of the same materials and thus require different amounts of energy to attain their optimum temperature for placement.

In an example, the tape placement machine 102 includes an inspection system 138. In an example, the inspection system 138 includes cameras, temperature sensors, pre-placement detectors, tack monitoring devices, and the like for monitoring the composite tape 104. In an example, the tape placement machine 102 may include a marking device for marking defects or other designated portions of the composite tape 104. In an example, the tape placement machine 102 may include a detector, such as a camera or photo eye, configured to detect the profile and location of the composite tapes 104 on the placement surface to verify that the composite tapes 104 are properly configured, e.g., with minimum gaps and laps.

In an example, the tape placement machine 102 includes a trimmer 140. The trimmer 140 is configured to trim, shear, clip, or otherwise cut the composite tape 104 to a desired length and/or configuration. In an example, the trimmer 140 is located proximate to a nip of the compaction roller 124. For the purpose of this disclosure, the "nip" of the compaction roller 124 refers to a location on the compaction roller 124 where the placement force 112 is applied to the placement surface 222. Locating the trimmer 140 close the nip of the compaction roller 124 may eliminate an uncontrolled length of the composite tape 104 after the composite tape 104 is cut.

In an example, the trimmer 140 includes a mechanical cutting device such as a blade 142 defining a sharp edge. The trimmer 140 may also include a reciprocating actuator 144 for moving the blade 142 in alternating directions, for example, generally perpendicular to the plane of the composite tape 104, so that the edge of the blade 142 can be used to cut smoothly through the composite tape 104. In other examples, the trimmer 140 may include other cutting devices, such as a roller defining a sharp circumferential edge, a stationary blade, a laser, or the like. In any example, the actuator 144 may also be configured to move the blade 142 or other cutting device in directions transverse to the length of the composite tape 104 to adjust the amount of the composite tape 104 to be trimmed. In some examples, the actuator 144 may be configured to adjust an angle of the blade 142 relative to the composite tape 104, for example, to optimize the cutting operation of the blade 142. In some examples, one or more collector devices may be provided for receiving a trimmed portion of the composite tape 104, which may be discarded or re-used.

In an example, the apparatus 100 includes a controller 132. The controller 132 is configured to control the function and/or operation of one or more components of the apparatus 100. In an example, the controller 132 is communicatively (e.g., electrically) coupled with one or more of the placement guide 150, the heater 136, the trimmer 140, and the inspection system 138 to control operation thereof. In an example, the controller 132 is configured to selectively control the location of the backing plate 106 relative to the delivery head 114. In some examples, the controller 132 is located within the delivery head 114. In some examples, the controller 132 is located remotely from the delivery head 114.

In some examples, the controller 132 is communicatively coupled with the movement system 130 to control movement of the delivery head 114 relative to the placement surface 222 along the programmed placement path when disposing the composite tape 104. In some examples, the apparatus 100 may include one or more additional controllers configured to control operation of the movement system 130.

In some examples, the apparatus 100 may include a computer system 238 (e.g., one or more computers) configured to execute instructions that control operation of the tape placement machine 102 and/or movement of the delivery head 114 along the programmed path when disposing the composite tape 104. In an example, the controller 132, and any additional control devices, may be implemented at least partially by the computer system 238.

In some examples, the controller 132 and/or the computer system 238 is operable to perform other functions, for example, functions integral to inspection of the composite tape 104 after it is disposed on the placement surface 222, control of a placement speed of the composite tape 104, detection of the temperature of the composite tape 104, marking of detected defects of the composite tape 104, and the like.

In an example, the configuration of the placement path of the delivery head 114 may be determined before some or all of the composite tapes 104 are disposed on the placement surface 222. In an example, a method for determining the configuration of the placement paths may be performed theoretically or numerically, and then the composite tapes 104 may be disposed accordingly. In an example, the configurations of the calculated placement paths are stored electronically in a memory 134 of the apparatus 100. The apparatus 100 then disposes the composite tapes 104 according to the calculated configurations of the respective placement paths.

In an example, the composite tape 104 includes a reinforcement material that is disposed in a matrix material. The composite tape 104 may be provided in various sizes and/or shapes. In an example, the composite tape 104 is a continuous composite tape. Generally, as used herein, the term "continuous" refers to an item that is uninterrupted or that has a length dimension that is orders of magnitude greater that a width dimension. In an example, the composite tape 104 takes the form of a long rectangular strip having a width of between approximately 0.5 inches (1.27 centimeters) and approximately 12 inches (30.48 centimeters).

In various examples, the reinforcement material of the composite tape 104 includes a plurality of fibrous members such as fibers, strands, braids, woven or nonwoven mats, and the like of materials such as fiberglass, metal, minerals, conductive or nonconductive graphite or carbon, nylon, aramids such as Kevlar®, and the like. In some examples, the composite tape 104 is unidirectionally fiber-reinforced (e.g., includes a unidirectional reinforcement material). In various examples, the composite tape 104 includes the matrix material, in which the reinforcement material is disposed. In some examples, however, the composite tape 104 can be formed without the matrix material, and the matrix material can be disposed separately. In any example, the matrix material may include various materials such as thermoplastic or thermoset polymeric resins. Example thermosetting resins include allyls, alkyd polyesters, bismaleimides (BMI), epoxies, phenolic resins, polyesters, polyurethanes (PUR), polyurea-formaldehyde, cyanate ester, and vinyl ester resin. Exemplary thermoplastic resins include liquid-crystal polymers (LCP); fluoroplastics, including polytetrafluoroethylene (PTFE), fluorinated ethylene propylene (FEP), perfluoroalkoxy resin (PFA), polychlorotrifluoroethylene (PCTFE), and polytetrafluoroethylene-perfluoromethylvinylether (MFA); ketone-based resins, including polyetheretherketone (PEEK™, a trademark of Victrex PLC Corporation, Thointons Cleveleys Lancashire, UK); polyamides such as nylon-6/6, 30% glass fiber; polyethersulfones (PES); polyamideimides (PAIS), polyethylenes (PE); polyester thermoplastics, including polybutylene terephthalate (PBT), polyethylene terephthalate (PET), and poly(phenylene terephthalates); polysulfones (PSU); poly(phenylene sulfides) (PPS).

Figure 9:
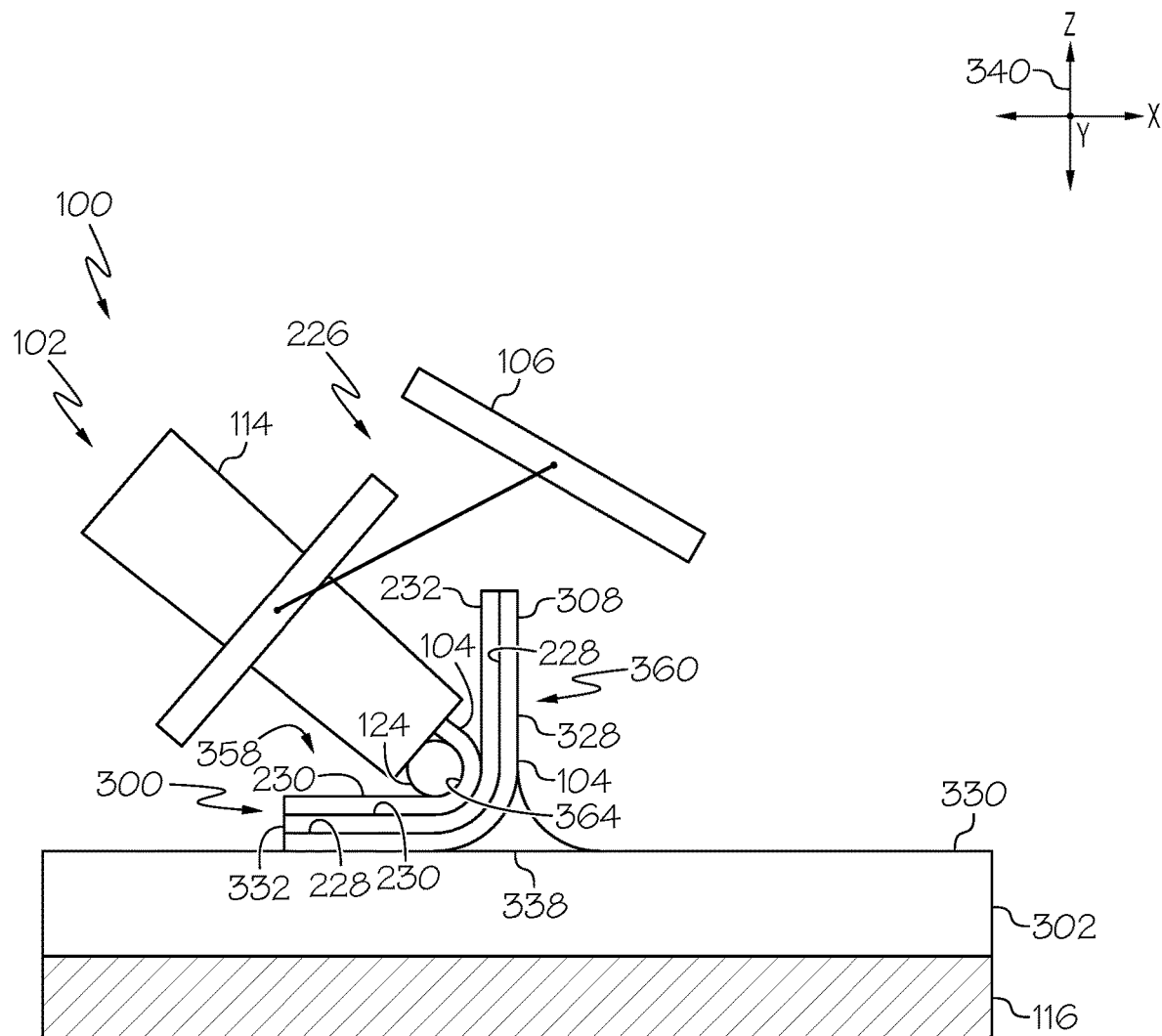
FIG. 9 is a schematic, elevation view of an example of the disclosed apparatus.

Referring to FIG. 9, in some examples, the radius of the curve forming the transition 364 of the composite stiffener 308 is defined by, or is dependent upon, a radius of the compaction roller 124. The compaction roller 124 is selected (e.g., sized) so that the radius of the compaction roller 124 is substantially equal to the radius of the transition 364 of the composite stiffener 308. In other words, the radius of the compaction roller 124 is equal to the radius of the curved transition between the portion of the flange 332 and the portion of the web 328 formed by the outermost layer of the composite tape 104 that forms the composite stiffener 308. For example, as illustrated in FIG. 9, the radius of the compaction roller 124 is less than a radius of the curved transition between the flange 332 and the web 328 formed by the first layer 228 (i.e., the innermost layer) of the composite tape 104. The radius of the compaction roller 124 is also less than a radius of the curved transition between the flange 332 and the web 328 formed by the second layer 232 (i.e., an intermediate layer) of the composite tape 104. The radius of the compaction roller 124 is substantially equal to a radius of the curved transition between the flange 332 and the web 328 formed by the third layer 230 (i.e., the outermost layer) of the composite tape 104.

Referring to FIGS. 2-4 and 9, in some examples, the composite structure 300 includes a radius filler 338, also commonly referred to as a noodle. The radius filler 338 is configured to support the transition 364 between the flange 332 and the web 328 of the composite stiffener 308 when the composite tape 104 is disposed by the delivery head 114. In some examples, as illustrated in FIGS. 2 and 4, the radius filler 338 is located within the small space formed between the composite stiffener 308 and the composite panel 302 at the base, or root, of the web 328 of the composite stiffener 308. In some examples, as illustrated in FIGS. 3 and 9, the radius filler 338 is partially located between the composite stiffener 308 and the composite panel 302 at the base of the web 328 of the composite stiffener 308.

In an example, the radius filler 338 is placed on the inner surface 330 of the composite panel 302 prior to lay-up of the plies 334 of the composite tape 104 to form the composite stiffener 308. In an example, the radius filler 338 includes a generally triangular shape and may be of various materials, such as carbon fiber (e.g. woven or unwoven) and resin material. The shape and material of the radius filler 338 are selected to fill the space between the composite stiffener 308 and the composite panel 302 at the base of the web 328 and to bond to the composite material of the composite stiffener 308 and the composite panel 302. The radius filler 338 may also transfer loads between the adjacent portions of the composite stiffener 308 and the composite panel 302, depending on the material of the radius filler 338.

Figure 10:
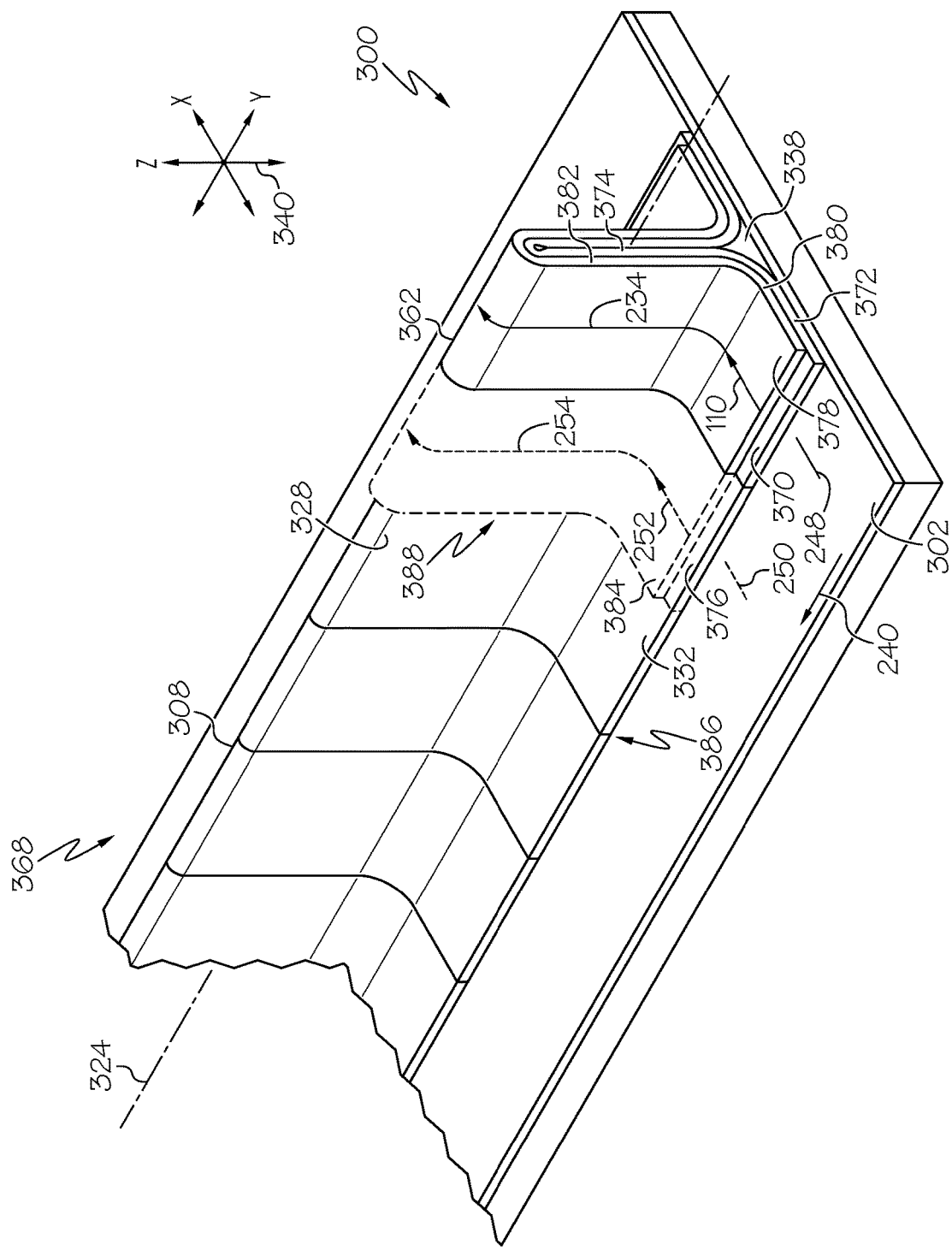
FIG. 10 is a schematic, partial, perspective view of an example of the disclosed composite structure.

FIG. 10 schematically illustrates an example formation of a portion of the composite structure 300 utilizing the disclosed apparatus 100. The apparatus 100 is not illustrated in FIG. 10 in order to more clearly illustrate the various movement, or placement, paths followed by the delivery head 114 and the lay-up configuration of the composite tape 104 forming the composite structure 300.

In some examples, the composite stiffener 308 includes a longitudinal axis 324 and has a length dimension that is parallel to or runs with the longitudinal axis 324, a width dimension that is transverse to the longitudinal axis 324, and a height dimension that is transverse to the longitudinal axis 324. In addition, each of the flange 332 and the web 328 have a thickness dimension. In an example, the flange 332 and the web 328 define the width dimension of the composite stiffener 308. The flange 332 and the web 328 also define the height dimension of the composite stiffener 308. Throughout this disclosure, and as illustrated in FIGS. 6-10 and 17-32, the longitudinal axis 324 of the composite stiffener 308 is parallel to the Y-axis of the environment reference frame 340.

In order to build the composite stiffener 308 having a desired length dimension, multiple layers of the composite tape 104 are disposed adjacent to (e.g., side-by-side) each other. In order to build the composite stiffener 308 having a desired height dimension, and the flange 332 and the web 328 having desired respective thickness dimensions, multiple layers of the composite tape 104 are disposed on top of (e.g., stacked on) each other.

In an example, when initially forming the composite stiffener 308 on the composite panel 302, the delivery head 114 (not illustrated in FIG. 10) is selectively located at a first index location 248, for example, relative to the composite panel 302 and/or the environment reference frame 340. The delivery head 114 then selectively moves, for example, linearly along the X-axis of the environment reference frame 340, along the first placement path, indicated by directional arrow 110, to dispose a first continuous segment 370 of the composite tape 104 on the composite panel 302, as illustrated in FIG. 7, and form a flange portion of a first flange-layer 372 of the flange 332 of the composite stiffener 308. The delivery head 114 then selectively moves, for example, rotationally about the Y-axis of the environment reference frame 340, to dispose the first continuous segment 370 of the composite tape 104 on the radius filler 338 and to transition from the flange portion of the first flange-layer 372 of the flange 332 to a web portion of a first web-layer 374 of the web 328 of the composite stiffener 308 and form a portion of the transition 364 (FIGS. 2-4) of the composite stiffener 308. The delivery head 114 then selectively moves, for example, linearly along the Z-axis of the environment reference frame 340, along the second placement path, indicated by directional arrow 234, to dispose the first continuous segment 370 of the composite tape 104 on the backing plate 106 (not illustrated in FIG. 10), as illustrated in FIG. 8, and form a web portion of the first web-layer 374 of the web 328 of the composite stiffener 308.

In some example configurations of the composite stiffener 308, such as those having the inverted "T" shape in cross section illustrated in FIGS. 2 and 10, the delivery head 114 then selectively moves, for example, rotationally about the Y-axis of the environment reference frame 340, to transition from the web portion of the first web-layer 374 to a complementary web portion of the first web-layer 374 and form a portion of the distal end 362 of the web 328. The delivery head 114 then selectively moves, for example, linearly along the Z-axis of the environment reference frame 340, along a corresponding placement path (not visible in FIG. 10) to dispose the first continuous segment 370 of the composite tape 104 on the web portion of the first web-layer 374, supported from behind by the backing plate 106 (not shown in FIG. 10) and form the complementary web portion of a first web-layer 374 of the web 328. The delivery head 114 then selectively moves, for example, rotationally about the Y-axis of the environment reference frame 340, to dispose the first continuous segment 370 of the composite tape 104 on the radius filler 338 and to transition from the complementary web portion of the first web-layer 374 of the web 328 to a complementary flange portion of the first flange-layer 372 of the flange 332 and form a portion of a complementary transition of the composite stiffener 308. The delivery head 114 then selectively moves, for example, linearly along the X-axis of the environment reference frame 340, along a corresponding placement path (not visible in FIG. 10) to dispose the first continuous segment 370 of the composite tape 104 on the composite panel 302 and form the flange portion of the first flange-layer 372 of the flange 332 of the composite stiffener 308. The first continuous segment 370 of the composite tape 104 is then cut to complete the respective portion of the composite stiffener 308.

In some example configurations of the composite stiffener 308, such as those having the "L" shape in cross section illustrated in FIG. 3, the first continuous segment 370 of the composite tape 104 is cut after formation of the web portion of the first web-layer 374 to complete the respective portion of the composite stiffener 308.

In some example configurations of the composite stiffener 308, such as the blade-type stringers illustrated in FIG. 4, the delivery head 114 then selectively moves, as described above, to further form the complementary web portion of the first web-layer 374 of the web 328 and a layer of the composite panel 302. The first continuous segment 370 of the composite tape 104 is then cut to complete the respective portion of the composite stiffener 308.

Once the portion of first flange-layer 372 and the first web-layer 374 formed by the first continuous segment 370 of the composite tape 104 has been disposed, the delivery head 114 is selectively located to a second index location 250. For example, the delivery head 114 may return to the first index location 248 and selectively move, for example, linearly along the Y-axis of the environment reference frame 340, along an index path, indicated by directional arrow 240, to the second index location 250.

The delivery head 114 then selectively moves, for example, linearly along to the X-axis of the environment reference frame 340, along a third placement path, indicated by directional arrow 252, to dispose a second continuous segment 376 of the composite tape 104 on the composite panel 302, adjacent to (e.g., directly next to) the first continuous segment 370 of the composite tape 104, and further form the flange portion of the first flange-layer 372 of the flange 332 of the composite stiffener 308. The delivery head 114 then selectively moves, for example, rotationally about the Y-axis of the environment reference frame 340, to dispose the second continuous segment 376 of the composite tape 104 on the radius filler 338, adjacent to (e.g., directly next to) the first continuous segment 370 of the composite tape 104, and to transition from the flange portion of the first flange-layer 372 of the flange 332 to the web portion of the first web-layer 374 of the web 328 and form another portion of the transition 364 (FIGS. 2-4) of the composite stiffener 308. The delivery head 114 then selectively moves, for example, linearly along the Z-axis of the environment reference frame 340, along a fourth placement path, indicated by directional arrow 254, to dispose the second continuous segment 376 of the composite tape 104 on the backing plate 106, adjacent to (e.g., directly next to) the first continuous segment 370 of the composite tape 104, and further form the web portion of the first web-layer 374 of the web 328 of the composite stiffener 308.

In some example configurations of the composite stiffener 308, such as those having the inverted "T" shape in cross section illustrated in FIGS. 2 and 10, the delivery head 114 then selectively moves, as described above, to further form the complementary web portion of the first web-layer 374 of the web 328 and the complementary flange portion of the first flange-layer 372 of the flange 332 with the second continuous segment 376 of the composite tape 104. The second continuous segment 376 of the composite tape 104 is then cut to complete the respective portion of the composite stiffener 308.

In some example configurations of the composite stiffener 308, such as those having the "L" shape in cross section illustrated in FIG. 3, the second continuous segment 376 of the composite tape 104 is cut after formation of the web portion of the first web-layer 374 to complete the respective portion of the composite stiffener 308.

In some example configurations of the composite stiffener 308, such as the blade-type stringers illustrated in FIG. 4, the delivery head 114 then selectively moves, as described above, to further form the complementary web portion of the first web-layer 374 of the web 328 and a layer of the composite panel 302. The second continuous segment 376 of the composite tape 104 is then cut to complete the respective portion of the composite stiffener 308.

This process is repeated to form additional portions of the first flange-layer 372 of the flange 332 and the first web-layer 374 of the web 328 by selectively moving the delivery head 114, for example, linearly along the Y-axis of the environment reference frame 340, along the index path, indicated by directional arrow 240, to subsequent index locations and disposing subsequent continuous segments of the composite tape 104 adjacent to previous segments of the composite tape 104. In an example, the index path, indicated by directional arrow 240, is parallel to the longitudinal axis 324 of the composite stiffener 308.

Once the first flange-layer 372 and the first web-layer 374 and the composite stiffener 308 are completely formed, the delivery head 114 is selectively moved back to the first index location 248. The delivery head 114 then selectively moves, for example, linearly along the X-axis of the environment reference frame 340, along the first placement path, indicated by directional arrow 110, to dispose a third continuous segment 378 of the composite tape 104 on the first continuous segment 370 and form a flange portion of a second flange-layer 380 of the flange 332 of the composite stiffener 308. The delivery head 114 then selectively moves, for example, rotationally about the Y-axis of the environment reference frame 340, to dispose the third continuous segment 378 of the composite tape 104 on the first continuous segment 370 and to transition from the flange portion of the second flange-layer 380 of the flange 332 to a web portion of a second web-layer 382 of the web 328 of the composite stiffener 308 and form another portion of the transition 364 (FIGS. 2-4) of the composite stiffener 308. The delivery head 114 then selectively moves, for example, linearly along the Z-axis of the environment reference frame 340, along the second placement path, as indicated by directional arrow 234, to dispose the third continuous segment 378 of the composite tape 104 on the first continuous segment 370, supported from behind by the backing plate 106 (not shown in FIG. 9) and form a web portion of the second web-layer 382 of the web 328 of the composite stiffener 308.

In some example configurations of the composite stiffener 308, such as those having the inverted "T" shape in cross section illustrated in FIGS. 2 and 10, the delivery head 114 then selectively moves, as described above, to further form the complementary web portion of the second web-layer 382 of the web 328 and the complementary flange portion of the second flange-layer 380 of the flange 332 with the third continuous segment 378 of the composite tape 104. The third continuous segment 378 of the composite tape 104 is then cut to complete the respective portion of the composite stiffener 308.

In some example configurations of the composite stiffener 308, such as those having the "L" shape in cross section illustrated in FIG. 3, the third continuous segment 378 of the composite tape 104 is cut after formation of the web portion of the second web-layer 382 to complete the respective portion of the composite stiffener 308.

In some example configurations of the composite stiffener 308, such as the blade-type stringers illustrated in FIG. 4, the delivery head 114 then selectively moves, as described above, to further form the complementary web portion of the first web-layer 374 of the web 328 and a layer of the composite panel 302. The third continuous segment 378 of the composite tape 104 is then cut to complete the respective portion of the composite stiffener 308.

Once the portion of second flange-layer 380 and the second web-layer 382 formed by the third continuous segment 378 of the composite tape 104 has been disposed, the delivery head 114 is selectively located to the second index location 250. For example, the delivery head 114 may return to the first index location 248 and selectively move, for example, linearly along the Y-axis of the environment reference frame 340, along the index path, indicated by directional arrow 240, to the second index location 250. The delivery head 114 then selectively moves, for example, linearly along the X-axis of the environment reference frame 340, along the third placement path, indicated by directional arrow 252, to dispose a fourth continuous segment 384 of the composite tape 104 on the second continuous segment 376, adjacent to (e.g., directly next to) the third continuous segment 378 of the composite tape 104, and further form a flange portion of the second flange-layer 380 of the flange 332 of the composite stiffener 308. The delivery head 114 then selectively moves, for example, rotationally about the Y-axis of the environment reference frame 340, to dispose the fourth continuous segment 384 of the composite tape 104 on the second continuous segment 376 and to transition from the flange portion of the second flange-layer 380 of the flange 332 to a web portion of the second web-layer 382 of the web 328 and further form a portion of the transition 364 (FIGS. 2-4) of the composite stiffener 308. The delivery head 114 then selectively moves, for example, linearly along the Z-axis of the environment reference frame 340, along the fourth placement path, indicated by directional arrow 254, to dispose the fourth continuous segment 384 of the composite tape 104 on the second continuous segment 376, adjacent to (e.g., directly next to) the third continuous segment 378 of the composite tape 104, and further form the web portion of the second web-layer 382 of the web 328 of the composite stiffener 308.

In some example configurations of the composite stiffener 308, such as those having the inverted "T" shape in cross section illustrated in FIGS. 2 and 10, the delivery head 114 then selectively moves, as described above, to further form the complementary web portion of the second web-layer 382 of the web 328 and the complementary flange portion of the second flange-layer 380 of the flange 332 with the fourth continuous segment 384 of the composite tape 104. The fourth continuous segment 384 of the composite tape 104 is then cut to complete the respective portion of the composite stiffener 308.

In some example configurations of the composite stiffener 308, such as those having the "L" shape in cross section illustrated in FIG. 3, the fourth continuous segment 384 of the composite tape 104 is cut after formation of the web portion of the second web-layer 382 to complete the respective portion of the composite stiffener 308.

In some example configurations of the composite stiffener 308, such as the blade-type stringers illustrated in FIG. 4, the delivery head 114 then selectively moves, as described above, to further form the complementary web portion of the first web-layer 374 of the web 328 and a layer of the composite panel 302. The fourth continuous segment 384 of the composite tape 104 is then cut to complete the respective portion of the composite stiffener 308.

This process is repeated to form additional portions of the second flange-layer 380 of the flange 332 and the second web-layer 382 of the web 328 by moving the delivery head 114 along the index path, indicated by directional arrow 240, to subsequent index locations and disposing subsequent continuous segments of the composite tape 104 adjacent to previous continuous segments of the composite tape 104.

This process is also repeated to form additional flange-layers on top of the flange 332 and additional web-layers of the web 328 by moving the delivery head 114 in subsequent passes along the placement paths, and disposing subsequent continuous segments of the composite tape 104 on top of previous continuous segments of the composite tape 104.

Figure 11:
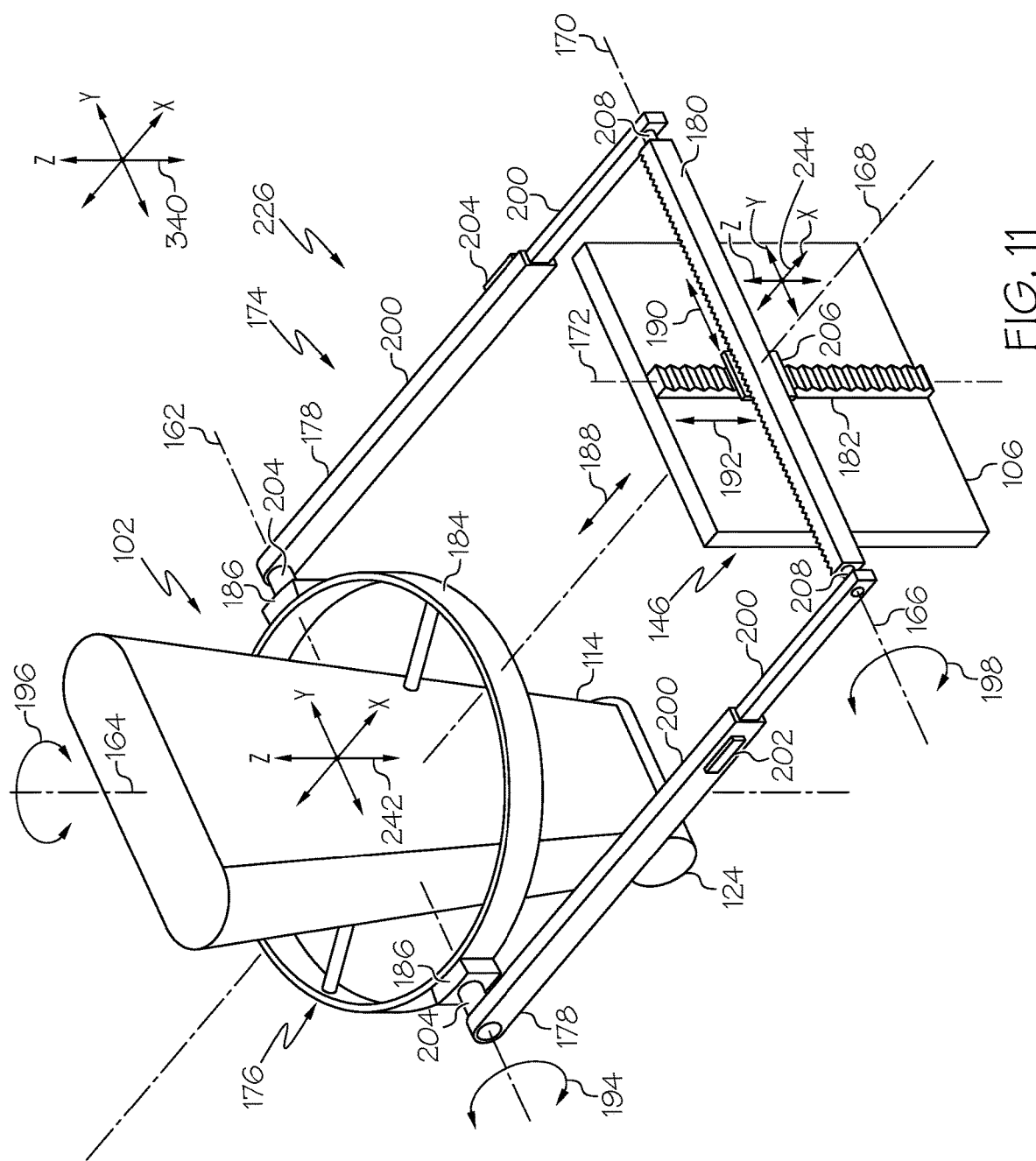
FIG. 11 is a schematic, perspective view of an example of the disclosed apparatus.
Figure 12:
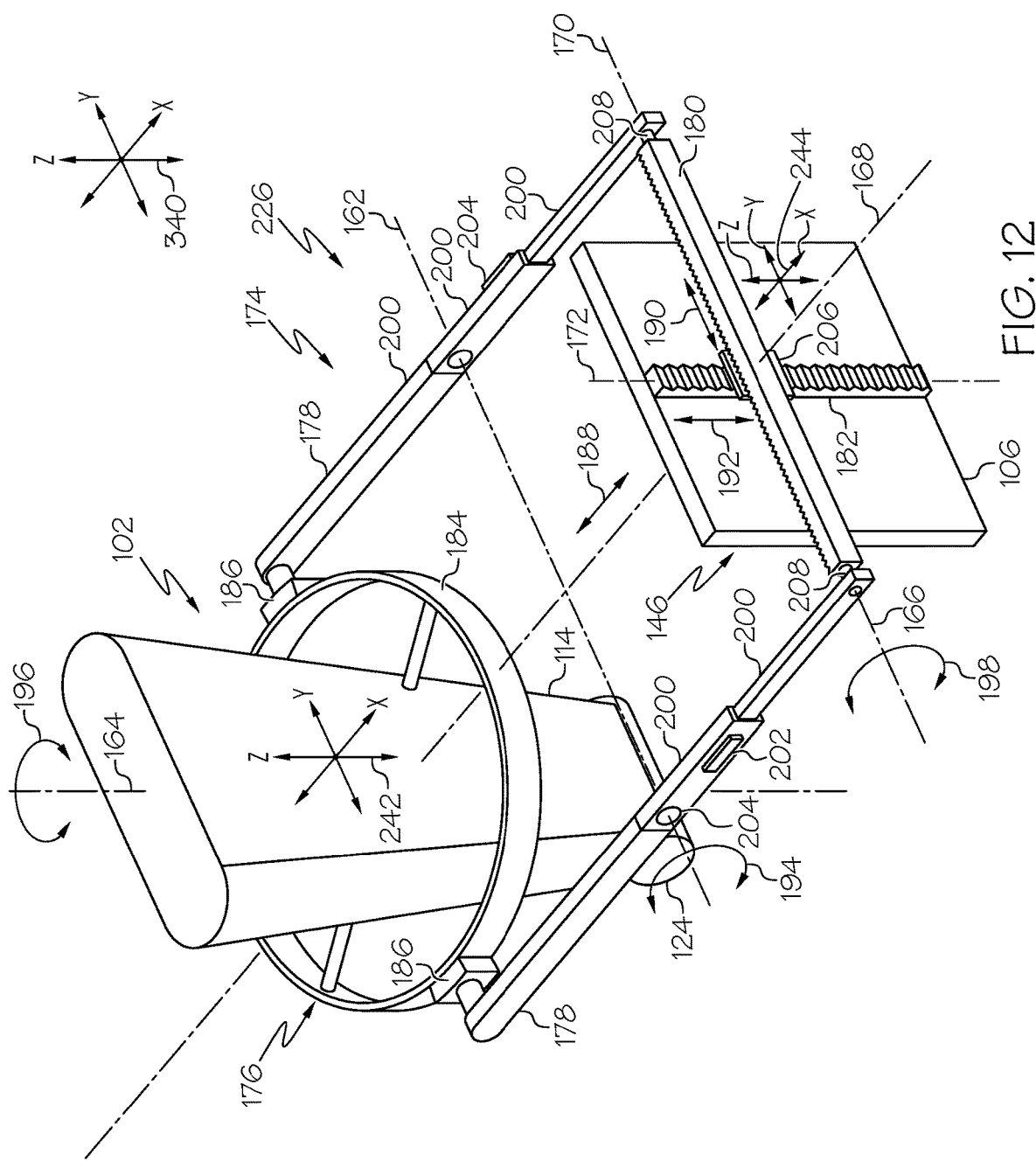
FIG. 12 is a schematic, perspective view of an example of the disclosed apparatus.
Figure 13:
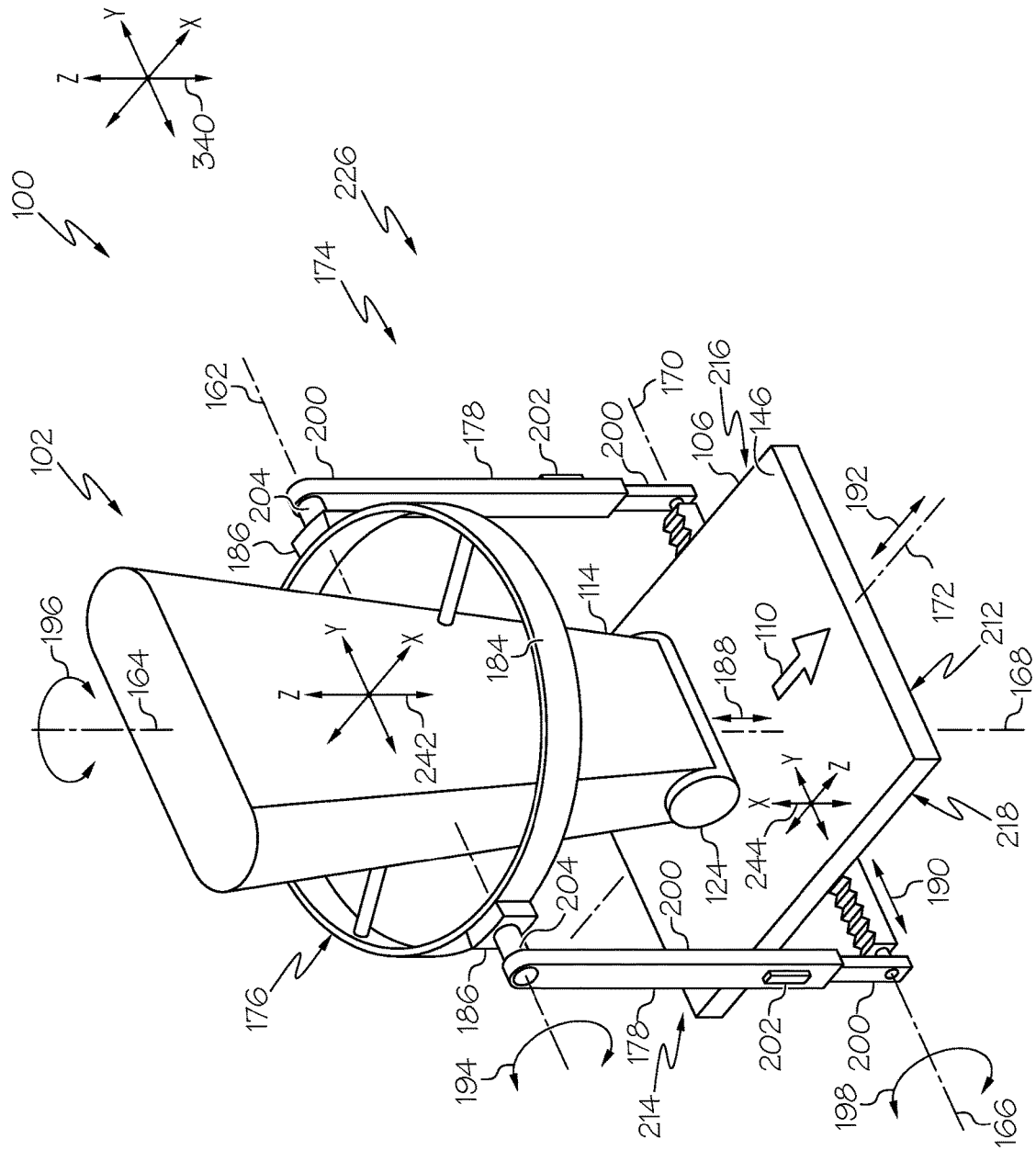
FIG. 13 is a schematic, perspective view of an example of the disclosed apparatus.
Figure 14:
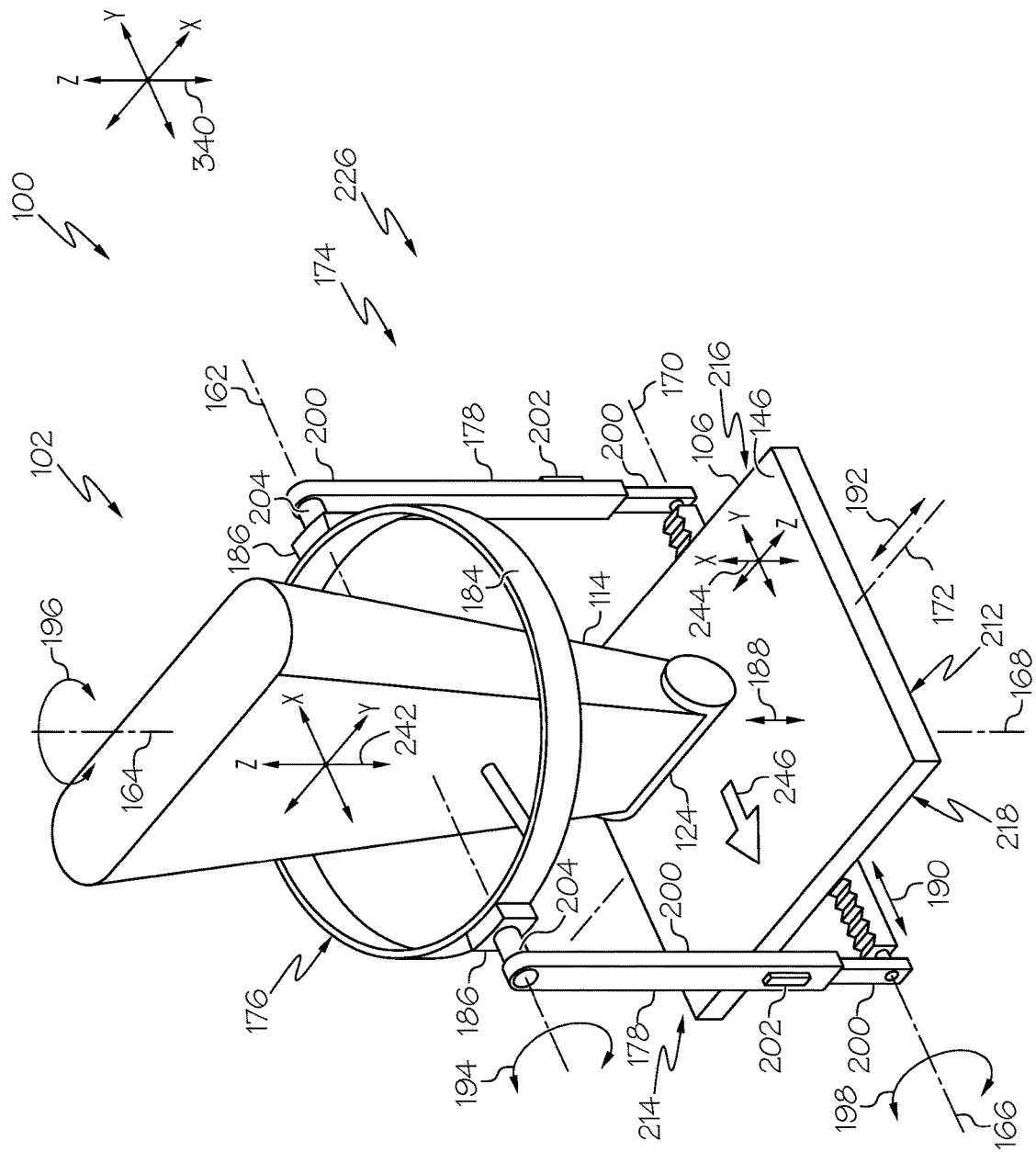
FIG. 14 is a schematic, perspective view of an example of the disclosed apparatus.

FIGS. 11 and 12 schematically illustrate examples of the apparatus 100 with the backing plate 106 selectively moved to a suitable location relative to the delivery head 114 so that the composite tape 104 (not shown in FIGS. 11 and 12) can be disposed on the mandrel 116 (not shown in FIGS. 11 and 12), for example, as illustrated in FIG. 7. FIGS. 13 and 14 schematically illustrate examples of the apparatus 100 with the backing plate 106 selectively moved to a suitable location relative to the delivery head 114 so that the composite tape 104 (not shown in FIGS. 13 and 14) can be disposed on the backing plate 106, for example, as illustrated in FIG. 8.

Referring to FIGS. 11-14, generally, the delivery head 114 is linearly and/or rotationally movable relative to the environment reference frame 340 to selectively locate the delivery head 114 relative to one of the mandrel 116 or the backing plate 106 and to dispose the composite tape 104 on one of the mandrel 116 or the backing plate 106, for example, to form the first portion 358 of the composite structure 300, as illustrated in FIGS. 7 and 8. The backing plate 106 is linearly and/or rotationally movable relative to the environment reference frame 340 to selectively locate the backing plate 106 relative to the delivery head 114 and mandrel 116 and to dispose the composite tape 104 on the backing plate 106, for example, to form the second portion 360 of the composite structure 300, as illustrated in FIG. 8.

In some examples, the delivery head 114 includes a head reference frame 242. For the purpose of this disclosure, the head reference frame 242 refers to a reference coordinate system that is defined with respect to a point on and that is rigid to the delivery head 114. In an example, the head reference frame 242 is a three-dimensional Cartesian coordinate system that is defined by an X-axis, a Y-axis, and a Z-axis. In an example, the placement path followed by the delivery head 114 when disposing the composite tape 104 is parallel to the X-axis of the head reference frame 242. In an example, an axis of rotation of the compaction roller 124 is parallel to the Y-axis of the head reference frame 242.

In some examples, the backing plate 106 includes a plate reference frame 244. For the purpose of this disclosure, the plate reference frame 244 refers to a reference coordinate system that is defined with respect to a point on and that is rigid to the backing plate 106. In an example, the plate reference frame 244 is a three-dimensional Cartesian coordinate system that is defined by an X-axis, a Y-axis, and a Z-axis.

In some examples, the apparatus 100 includes a first axis of linear motion 168. The backing plate 106 is linearly movable relative to the delivery head 114 along the first axis of linear motion 168. In an example, the backing plate 106 is linearly movable along the first axis of linear motion 168 in the directions indicated by first linear motion directional arrow 188. In an example, as illustrated in FIGS. 11 and 12, when the backing plate 106 is selectively located to enable the delivery head 114 to dispose the composite tape 104 on the mandrel 116 (FIG. 7), linear movement of the backing plate 106 along the first axis of linear motion 168 moves the backing plate 106 toward and away from the delivery head 114 so that the backing plate 106 does not obstruct or otherwise interfere with placement of the composite tape 104 on the mandrel 116. In an example, as illustrated in FIGS. 13 and 14, when the backing plate 106 is selectively located to enable the delivery head 114 to dispose the composite tape 104 on the backing plate 106 (FIG. 8), linear movement of the backing plate 106 along the first axis of linear motion 168 moves the backing plate 106 toward and away from the compaction roller 124 so that the backing plate 106 is in position to serve as the placement surface 222 for disposing the composite tape 104 and react to the placement force 112.

In an example, the first axis of linear motion 168 passes through the backing plate 106 and the delivery head 114. In an example, the first axis of linear motion 168 is parallel to the X-axis of the plate reference frame 244. In an example, when the delivery head 114 and the backing plate 106 are selectively located relative to each other to dispose the composite tape 104 on the backing plate 106, the first axis of linear motion 168 is parallel to the Z-axis of the head reference frame 242 (FIGS. 13 and 14).

In an example, selective linear movement of the backing plate 106 along the first axis of linear motion 168 selectively locates the backing plate 106 relative to the delivery head 114 so that backing plate 106 is in position for the delivery head 114 to come into contact with the backing plate 106 and the plate surface 146 of the backing plate 106 serves as the placement surface 222 for placing the first layer 228 (FIG. 8) of the composite tape 104 on the plate surface 146 to form a portion of the first web-layer 374 (FIG. 10) of the web 328. In an example, selective linear movement of the backing plate 106 along the first axis of linear motion 168 selectively locates the backing plate 106 relative to the first web-layer 374 of the web 328 so that backing plate 106 is in position for the delivery head 114 to come into contact with the first layer 228 (FIG. 8) of the composite tape 104, which serves as the placement surface 222 for placing the second layer 232 (FIG. 8) of the composite tape 104 on the first layer 228 to form a portion of the second web-layer 382 (FIG. 10) of the web 328 and so on.

As described herein above, when disposing the composite tape 104, the delivery head 114 moves relative to the environment reference frame 340 and the backing plate 106 and the backing plate 106 may move relative to the delivery head 114 but remains fixed relative to the environment reference frame 340. Thus, selective linear movement of the backing plate 106 along the first axis of linear motion 168 also accommodates linear movement of the delivery head 114 relative to the backing plate 106 when disposing the composite tape 104 on the backing plate 106.

In an example, the apparatus 100 includes a first axis of rotational motion 162. The backing plate 106 is rotationally movable relative to the delivery head 114 about the first axis of rotational motion 162. In an example, the backing plate 106 is rotationally movable about the first axis of rotational motion 162 in the directions indicated by first rotational motion directional arrow 194. For example, selective rotation of the backing plate 106 about the first axis of rotational motion 162 orbitally revolves the backing plate 106 at least partially around the delivery head 114 and, more particularly, at least partially around the compaction roller 124. In an example, as illustrated in FIGS. 9 and 10, when the backing plate 106 is selectively located to enable the delivery head 114 to dispose the composite tape 104 on the mandrel 116 (FIG. 7), rotational movement of the backing plate 106 along the first axis of rotational motion 162 moves the backing plate 106 out of alignment with the compaction roller 124. In an example, as illustrated in FIGS. 11 and 12, when the backing plate 106 is selectively located to enable the delivery head 114 to dispose the composite tape 104 on the backing plate 106 (FIG. 8), rotational movement of the backing plate 106 along the first axis of rotational motion 162 moves the backing plate 106 into alignment with the compaction roller 124 so that the backing plate 106 is in position to serve as the placement surface 222 for disposing the composite tape 104 and react to the placement force 112.

In an example, as illustrated in FIG. 11, the first axis of rotational motion 162 passes through the delivery head 114. In an example, as illustrated in FIG. 12, the first axis of rotational motion 162 is located in space between the delivery head 114 and the backing plate 106. In an example, the first axis of rotational motion 162 is parallel to the Y-axis of the head reference frame 242. In an example, the first axis of linear motion 168 intersects the first axis of rotational motion 162.

In some examples, as illustrated in FIGS. 11 and 12, selective rotational movement of the backing plate 106 about the first axis of rotational motion 162 selectively locates the backing plate 106 relative to the delivery head 114 so that the backing plate 106 does not obstruct or otherwise interfere with placement of the composite tape 104 on the mandrel 116 (FIG. 6).

In some examples, as illustrated in FIGS. 13 and 14, selective rotational movement of the backing plate 106 about the first axis of rotational motion 162 selectively locates the backing plate 106 relative to the delivery head 114 so that the backing plate 106 is in position for the delivery head 114 to come into contact with the backing plate 106 and the plate surface 146 of the backing plate 106 serves as the placement surface 222 for placing the composite tape 104 (FIG. 8) to form a portion of the first web-layer 374 (FIG. 10) of the web 328. In an example, selective linear movement of the backing plate 106 along the first axis of rotational motion 162 selectively locates the backing plate 106 relative to the first web-layer 374 of the web 328 so that backing plate 106 is in position for the delivery head 114 to come into contact with the first layer 228 (FIG. 8) of the composite tape 104, which serves as the placement surface 222 for placing the second layer 232 (FIG. 8) of the composite tape 104 on the first layer 228 to form a portion of the second web-layer 382 (FIG. 10) of the web 328 and so on.

As described herein above, when disposing the composite tape 104, the delivery head 114 moves relative to the environment reference frame 340 and the backing plate 106 and the backing plate 106 may move relative to the delivery head 114 but remains fixed relative to the environment reference frame 340. Thus, selective rotational movement of the backing plate 106 about the first axis of rotational motion 162 also accommodates rotational movement of the delivery head 114 relative to the backing plate 106 when disposing the composite tape 104 on the backing plate 106.

In an example, the apparatus 100 includes a second axis of linear motion 170. The backing plate 106 is linearly movable relative to the delivery head 114 along the second axis of linear motion 170. In an example, the backing plate 106 is linearly movable along the second axis of linear motion 170 in the directions indicated by second linear motion directional arrow 190. In an example, as illustrated in FIGS. 9 and 10, when the backing plate 106 is selectively located to enable the delivery head 114 to dispose the composite tape 104 on the mandrel 116 (FIG. 7), linear movement of the backing plate 106 along the second axis of linear motion 170 moves the backing plate 106 so that the backing plate 106 does not obstruct or otherwise interfere with placement of the composite tape 104 on the mandrel 116. In an example, as illustrated in FIGS. 13 and 14, when the backing plate 106 is selectively located to enable the delivery head 114 to dispose the composite tape 104 on the backing plate 106 (FIG. 8), linear movement of the backing plate 106 along the second axis of linear motion 170 moves the backing plate 106 so that the backing plate 106 is in position to serve as the placement surface 222 for disposing the composite tape 104 and react to the placement force 112.

In an example, the second axis of linear motion 170 passes through the backing plate 106. In an example, second axis of linear motion 170 is parallel to the Y-axis of the plate reference frame 244. In an example, the second axis of linear motion 170 is parallel to the first axis of rotational motion 162. In an example, the second axis of linear motion 170 is perpendicular to the first axis of linear motion 168. In an example, the second axis of linear motion 170 intersects the first axis of linear motion 168.

In an example, selective linear movement of the backing plate 106 along the second axis of linear motion 170 selectively locates the backing plate 106 relative to the delivery head 114 so that the backing plate 106 is in position for the delivery head 114 to come into contact with the backing plate 106 and the plate surface 146 of the backing plate 106 serves as the placement surface 222 for placing the composite tape 104 as the delivery head 114 traverses along the placement path to form a portion of the first web-layer 374 (FIG. 8) of the web 328. In an example, selective linear movement of the backing plate 106 along the second axis of linear motion 170 selectively locates the backing plate 106 relative to the first web-layer 374 of the web 328 so that backing plate 106 is in position for the delivery head 114 to come into contact with the first layer 228 (FIG. 8) of the composite tape 104, which serves as the placement surface 222, for placing the second layer 232 (FIG. 8) of the composite tape 104 on the first layer 228 to form a portion of the second web-layer 382 (FIG. 10) of the web 328 and so on.

As described herein above, when disposing the composite tape 104, the delivery head 114 moves relative to the environment reference frame 340 and the backing plate 106 and the backing plate 106 may move relative to the delivery head 114 but remains fixed relative to the environment reference frame 340. Thus, selective linear movement of the backing plate 106 along the second axis of linear motion 170 also accommodates movement of the delivery head 114 along the placement path relative to the backing plate 106 when disposing the composite tape 104 on the backing plate 106.

In an example, the apparatus 100 includes a third axis of linear motion 172. The backing plate 106 is linearly moveable relative to the delivery head 114 along the third axis of linear motion 172. In an example, the backing plate 106 is linearly movable along the third axis of linear motion 172 in the directions of third linear motion directional arrow 192. In an example, as illustrated in FIGS. 11 and 12, when the backing plate 106 is selectively located to enable the delivery head 114 to dispose the composite tape 104 on the mandrel 116 (FIG. 7), linear movement of the backing plate 106 along the third axis of linear motion 172 moves the backing plate 106 so that the backing plate 106 does not obstruct or otherwise interfere with placement of the composite tape 104 on the mandrel 116. In an example, as illustrated in FIGS. 13 and 14, when the backing plate 106 is selectively located to enable the delivery head 114 to dispose the composite tape 104 on the backing plate 106 (FIG. 7), linear movement of the backing plate 106 along the third axis of linear motion 172 moves the backing plate 106 so that the backing plate 106 is in position to serve as the placement surface 222 for disposing the composite tape 104 and react to the placement force 112.

In an example, the third axis of linear motion 172 passes through the backing plate 106. In an example, third axis of linear motion 172 is parallel to the Z-axis of the plate reference frame 244. In an example, the third axis of linear motion 172 is perpendicular to the second axis of linear motion 170. In an example, the third axis of linear motion 172 intersects the second axis of linear motion 170. In an example, the third axis of linear motion 172 is perpendicular to the first axis of linear motion 168. In an example, the third axis of linear motion 172 intersects the first axis of linear motion 168.

In an example, selective linear movement of the backing plate 106 along the third axis of linear motion 172 selectively locates the backing plate 106 relative to the delivery head 114 so that the backing plate 106 is in position for the delivery head 114 to come into contact with the backing plate 106 and the plate surface 146 of the backing plate 106 serves as the placement surface for placing the composite tape 104 as the delivery head 114 traverses along the placement path to form a portion of the first web-layer 374 (FIG. 10) of the web 328. In an example, selective linear movement of the backing plate 106 along the third axis of linear motion 172 selectively locates the backing plate 106 relative to the first web-layer 374 of the web 328 so that backing plate 106 is in position for the delivery head 114 to come into contact with the first layer 228 (FIG. 8) of the composite tape 104, which serves as the placement surface 222, for placing the second layer 232 (FIG. 8) of the composite tape 104 on the first layer 228 to form a portion of the second web-layer 382 (FIG. 10) of the web 328 and so on.

As described herein above, when disposing the composite tape 104, the delivery head 114 moves relative to the environment reference frame 340 and the backing plate 106 and the backing plate 106 may move relative to the delivery head 114 but remains fixed relative to the environment reference frame 340. Thus, selective linear movement of the backing plate 106 along the third axis of linear motion 172 also accommodates movement of the delivery head 114 along the placement path relative to the backing plate 106 when disposing the composite tape 104 on the backing plate 106.

In an example, the apparatus 100 includes a second axis of rotational motion 164. The backing plate 106 is rotationally movable relative to the delivery head 114 about the second axis of rotational motion 164. In an example, the backing plate 106 is rotationally movable about the second axis of rotational motion 164 in the directions indicated by second rotational motion directional arrow 196. For example, rotational movement of the backing plate 106 about the second axis of rotational motion 164 orbitally revolves the backing plate 106 at least partially around the delivery head 114. In an example, as illustrated in FIGS. 13 and 14, when the backing plate 106 is selectively located to enable the delivery head 114 to dispose the composite tape 104 on the backing plate 106 (FIG. 8), rotational movement of the backing plate 106 about the second axis of rotational motion 164 changes or adjusts the angular orientation of the backing plate 106 relative to the compaction roller 124.

In an example, the second axis of rotational motion 164 passes through the delivery head 114. In an example, the second axis of rotational motion 164 is parallel to the Z-axis of the head reference frame 242. In an example, the second axis of rotational motion 164 is perpendicular to the first axis of rotational motion 162. In an example, the second axis of rotational motion 164 intersects the first axis of rotational motion 162.

In an example, selective rotational movement of the backing plate 106 about the second axis of rotational motion 164 selectively locates the backing plate 106 relative to the delivery head 114 so that the backing plate 106 is in position for the delivery head 114 to come into contact with the backing plate 106 and the plate surface 146 of the backing plate 106 serves as the placement surface for placing the composite tape 104 using the tape placement machine 102 to form a portion of the first web-layer 374 (FIG. 10) of the web 328. In an example, selective rotational movement of the backing plate 106 about the second axis of rotational motion 164 selectively locates the backing plate 106 relative to the to the first web-layer 374 of the web 328 so that backing plate 106 is in position for the delivery head 114 to come into contact with the first layer 228 (FIG. 8) of the composite tape 104, which serves as the placement surface 222, for folding the first layer 228 (FIG. 8) of the composite tape 104 onto itself to form a complementary portion of the first web-layer 374 (FIG. 10) of the web 328 and so on.

In an example, the apparatus 100 includes a third axis of rotational motion 166. The backing plate 106 is rotationally movable relative to the delivery head 114 about the third axis of rotational motion 166. In an example, the backing plate 106 is rotationally movable about the third axis of rotational motion 166 in the directions indicated by third rotational motion directional arrow 198. For example, rotational movement of the backing plate 106 about the third axis of rotational motion 166 changes or adjusts the angular orientation of the backing plate 106 relative to the delivery head 114 and, more particularly, relative to the compaction roller 124. In an example, as illustrated in FIGS. 11 and 12, when the backing plate 106 is selectively located to enable the delivery head 114 to dispose the composite tape 104 on the mandrel 116 (FIG. 7), rotational movement of the backing plate 106 about the third axis of rotational motion 166 moves the backing plate 106 so that the backing plate 106 does not obstruct or otherwise interfere with placement of the composite tape 104 on the mandrel 116. In an example, as illustrated in FIGS. 13 and 14, when the backing plate 106 is selectively located to enable the delivery head 114 to dispose the composite tape 104 on the backing plate 106 (FIG. 8), rotational movement of the backing plate 106 about the third axis of rotational motion 166 moves the backing plate 106 so that the backing plate 106 is in position to serve as the placement surface 222 for disposing the composite tape 104 and react to the placement force 112.

In an example, the third axis of rotational motion 166 passes through the backing plate 106. In an example, the third axis of rotational motion 166 is parallel to the Y-axis of the plate reference frame 244. In an example, the third axis of rotational motion 166 is parallel to the second axis of linear motion 170. In an example, the third axis of rotational motion 166 is coincident with (e.g., coaxial with) the second axis of linear motion 170. In an example, the third axis of rotational motion 166 is parallel to the second axis of rotational motion 164.

In an example, selective rotational movement of the backing plate 106 about the third axis of rotational motion 166 selectively orients the backing plate 106 relative to the delivery head 114 and, more particularly, to the compaction roller 124 so that the backing plate 106 is in position for the delivery head 114 to come into contact with the backing plate 106 and the plate surface 146 of the backing plate 106 serves as the placement surface for placing the composite tape 104 to form a portion of the first web-layer 374 (FIG. 10) of the web 328. In an example, selective rotational movement of the backing plate 106 about the third axis of rotational motion 166 selectively locates the backing plate 106 relative to the first web-layer 374 of the web 328 so that backing plate 106 is in position for the delivery head 114 to come into contact with the first layer 228 (FIG. 8) of the composite tape 104, which serves as the placement surface 222, for placing the second layer 232 (FIG. 8) of the composite tape 104 on the first layer 228 to form a portion of the second web-layer 382 (FIG. 10) of the web 328 and so on.

As described herein above, when disposing the composite tape 104, the delivery head 114 moves relative to the environment reference frame 340 and the backing plate 106 and the backing plate 106 may move relative to the delivery head 114 but remains fixed relative to the environment reference frame 340. Thus, selective rotational movement of the backing plate 106 about the third axis of rotational motion 166 also accommodates movement of the delivery head 114 along the placement path relative to the backing plate 106 when disposing the composite tape 104 on the backing plate 106.

Referring still to FIGS. 11-14, in an example, the reaction structure 226 includes a drive assembly 174. The drive assembly 174 movably couples the backing plate 106 with the delivery head 114. The drive assembly 174 is configured to linearly move the backing plate 106 relative to the delivery head 114, for example, along one or more of the first axis of linear motion 168, the second axis of linear motion 170, and the third axis of linear motion 172. The drive assembly 174 is also configured to rotationally move the backing plate 106 relative to the delivery head 114, for example, about one or more of the first axis of rotational motion 162, the second axis of rotational motion 164, and the third axis of rotational motion 166.

In an example, the reaction structure 226 includes a support mount 176. The support mount 176 is coupled to the tape placement machine 102, for example, to the delivery head 114. The reaction structure 226 also includes an arm 178. In an example, the arm 178 is rotationally coupled with the support mount 176 via the drive assembly 174. The backing plate 106 is coupled to the arm 178, opposite the support mount 176. In an example, the arm 178 is length-adjustable via the drive assembly 174. In other words, the arm 178 has a selectively adjustable length, to linearly move the backing plate 106 relative to the delivery head 114, for example, along the first axis of linear motion 168. Rotation of the arm 178 relative to the support mount 176 orbitally revolves the backing plate 106 at least partially about the delivery head 114.

In some examples, the reaction structure 226 includes an opposed pair of arms 178. A first end of the first one of the pair of arms 178 is rotationally coupled to the support mount 176, via the drive assembly 174, at a first location. A first end of a second one of the pair of arms 178 is rotationally coupled to the support mount 176, via the drive assembly 174, at a second location that is axially opposed to the first location. A second end of the first one of the pair of arms 178 is coupled to the backing plate 106 at a first location. A second end of the second one of the pair of arms 178 is coupled to the backing plate 106 at a second location that is axially opposed to the first location. The pair of arms 178 rotates together to rotationally move the backing plate 106.

In some examples, the reaction structure 226 includes only one arm 178. A first end of the arm 178 is rotationally coupled to the support mount 176, via the drive assembly 174. A second end of the arms 178 is coupled to the backing plate 106. The pair of arms 178 may beneficially reduce undesirable torque that may be applied to the backing plate 106 due to the placement force 112 (FIGS. 5 and 6) applied by the delivery head 114 as compared to one arm 178.

In an example, the arm 178, or each one of the pair of arm 178, includes a plurality of arm segments 200 that coupled together. At least one of the arm segments 200 is linearly movable relative to another one of the arm segments 200, via the drive assembly 174, to selectively adjust the overall length of the arm 178 and, thus, linearly move the backing plate 106 relative to the delivery head 114 along the first axis of linear motion 168. In an example, the arm 178 is a telescoping arm. For example, a first one of the arm segments 200 includes a hollow tubular member and a second one of the arm segments 200 telescopes within the first one of the arm segments 200 to adjust the overall length of the arm 178 and linearly move the backing plate 106.

In an example, the drive assembly 174 includes an arm linear actuator 202 that is associated with the arm 178, or each one of the pair of arms 178. In an example, the arm linear actuator 202 is operably coupled with adjacent ones of the arm segments 200 of the arm 178, or each one of the pair of arms 178. The arm linear actuator 202 is configured to selectively adjust the length of the arm 178 and, thus, selectively linearly move the backing plate 106 relative to the delivery head 114 along the first axis of linear motion 168. In an example, the arm linear actuator 202 is configured to selectively position at least one of the arm segments 200 relative to an adjacent one of the arm segments 200 and to fix or lock the arm segments 200 relative to each other.

In some examples, the arm linear actuator 202 includes a hydraulic linear actuator, a pneumatic linear actuator, a mechanical or electro-mechanical linear actuator, or other suitable type of linear actuation mechanism. In some examples, the arm linear actuator 202 includes a stepper motor, a servomotor, and the like.

In other examples, the drive assembly 174 may include additional linear actuators or other types of length adjustment mechanisms that are configured to selectively adjust the length of the arm 178, or each one of the pair of arms 178, and configured to selectively fix the relative position of the arm 178, or each one of the pair of arms 178, to selectively linearly move the backing plate 106 relative to the delivery head 114.

In an example, the drive assembly 174 includes an arm rotary actuator 204 that is associated with the arm 178, or each one of the pair of arms 178. The arm rotary actuator 204 is operatively coupled with the arm 178, or each one of the pair of arms 178. The arm rotary actuator 204 is configured to selectively rotationally move the backing plate 106 relative to the delivery head 114 about the first axis of rotational motion 162.

In an example, as illustrated in FIG. 11, the arm rotary actuator 204 is coupled to the support mount 176 and is operatively coupled with the arm 178, or each one of the pair of arms 178. The arm rotary actuator 204 movably couples the arm 178, or each one of the pair of arms 178, and the support mount 176 together. The arm rotary actuator 204 is configured to selectively rotate the arm 178 about the first axis of rotational motion 162 relative to the support mount 176 and, thus, selectively rotationally moves the backing plate 106 relative to the delivery head 114. In this example, the first axis of rotational motion 162 passes through the arm 178, or each one of the arms 178, and the support mount 176, for example, at a location where the arm 178 is coupled to the support mount 176.

In an example, as illustrated in FIG. 12, the arm rotary actuator 204 is operatively coupled with adjacent ones of the arm segments 200 of the arm 178, or each one of the pair of arms 178. The arm rotary actuator 204 is configured to selectively rotate one of the arm segments 200 about the first axis of rotational motion 162 relative to an adjacent one of the arm segments 200 and, thus, selectively rotationally moves the backing plate 106 relative to the delivery head 114. In this example, the first axis of rotational motion 162 passes through the arm 178, or each one of the pair of arms 178, at a location along the arm 178 between the support mount 176 and the backing plate 106.

In an example, as illustrated in FIG. 12, the arm 178, or each one of the pair of arms 178, includes a pivot joint that movably couples a first one of the arm segments 200 and a second one of the arm segments 200 together and that defines the first axis of rotational motion 162. The arm rotary actuator 204 is operatively coupled with the first one of the arm segments 200 and the second one of the arm segments 200 at the pivot joint. The arm rotary actuator 204 is configured to selectively rotate the second one of the arm segments 200 about the first axis of rotational motion 162 relative to the first one of the arm segments 200 and thus, selectively rotationally moves the backing plate 106 relative to the delivery head 114.

In some examples, the arm rotary actuator 204 includes a hydraulic rotary actuator, a pneumatic rotary actuator, a mechanical or electro-mechanical rotary actuator, or other suitable type of rotary actuation mechanism. In some examples, the arm rotary actuator 204 includes a stepper motor, a servomotor, a rotary vain actuator, an electric rotary actuator, and the like.

In other examples, the drive assembly 174 may include additional rotary actuators or other types of rotational adjustment mechanisms that are configured to selectively adjust the angular orientation of the arm 178, or each one of the pair of arms 178, and configured to selectively fix the angular orientation of the arm 178, or each one of the pair of arms 178, to selectively rotationally move the backing plate 106 relative to the delivery head 114.

In an example, the drive assembly 174 includes a first linear track 180. The first linear track 180 is coupled to the arm 178, opposite the support mount 176. The backing plate 106 is operatively coupled with the first linear track 180. Linear movement of the backing plate 106 relative to the first linear track 180 linearly moves the backing plate 106 relative to the delivery head 114 along the second axis of linear motion 170.

In an example, a first end of the first linear track 180 is coupled to the second end of the first one of the pair of arms 178, opposite the support mount 176, and a second end of the first linear track 180 is coupled to the second end of the second one of the pair of arms 178, opposite the support mount 176.

In an example, the drive assembly 174 includes a plate linear actuator 206 (FIGS. 11 and 12). The plate linear actuator 206 operatively (e.g., movably) couples the backing plate 106 with the first linear track 180. The plate linear actuator 206 is configured to traverse the first linear track 180 to selectively linearly move the backing plate 106 relative to the first linear track 180 and, thus, relative to the delivery head 114 along the second axis of linear motion 170. In an example, the second axis of linear motion 170 passes through the first linear track 180.

In an example, the first linear track 180 includes any suitable structure that defines the course or the line of travel or motion of the backing plate 106 along the second axis of linear motion 170. In an example, the plate linear actuator 206 includes any suitable device configured to traverse the first linear track 180. In an example, the first linear track 180 includes a linear gear, or rack. The plate linear actuator 206 includes circular gear, or pinion, that engages the linear gear. The plate linear actuator 206 also includes a motor, such as a stepper motor or servomotor, that is operatively coupled to the circular gear and that is configured to rotate the circular gear to cause the circular gear to linearly move relative to, or along, the linear gear. Selective linear movement of the plate rotary actuator 208 relative to (e.g., along) the first linear track 180 selectively linearly moves the backing plate 106 relative to the delivery head 114.

In other examples, the first linear track 180 and the plate linear actuator 206 may include other structures and mechanisms suitable to selectively control linear movement of the backing plate 106 relative to the delivery head 114. In an example, the first linear track 180 includes one or more guide rails and the plate linear actuator 206 includes a motorized support configured to travel along the guide rails.

In an example, the drive assembly 174 includes a second linear track 182. The second linear track 182 is operatively (e.g., movably) coupled with the first linear track 180. The second linear track 182 is linearly movable relative to the first linear track 180. The backing plate 106 is coupled to the second linear track 182. Linear movement of the second linear track 182 relative to the first linear track 180 linearly moves the backing plate 106 relative to the first linear track 180 and, thus, relative to the delivery head 114 along the third axis of linear motion 172. In an example, the third axis of linear motion 172 passes through the second linear track 182. In an example, as illustrated in FIGS. 11 and 12, the second linear track 182 is perpendicular to the first linear track 180.

In an example, the plate linear actuator 206 operatively (e.g., movably) couples the second linear track 182 with the first linear track 180. The plate linear actuator 206 is configured to traverse the second linear track 182 to selectively linearly move the second linear track 182 relative to the first linear track 180 and, thus, selectively linearly move the backing plate 106 relative to the delivery head 114 along the third axis of linear motion 172.

In an example, the second linear track 182 includes any suitable structure that defines the course or the line of travel or motion of the backing plate 106 along the third axis of linear motion 172. In an example, the second linear track 182 is coupled to a back surface 210 of the backing plate 106 that is opposite to the plate surface 146. In an example, the plate linear actuator 206 is any suitable device configured to traverse the second linear track 182. In an example, the second linear track 182 includes a linear gear, or rack. The plate linear actuator 206 includes a second circular gear, or pinion, that engages the linear gear. The plate linear actuator 206 also includes a second motor, such as a stepper motor or servomotor, that is operatively coupled to the second circular gear and that is configured to rotate the second circular gear to cause the second circular gear to linearly move relative to, or along, the linear gear. Selective linear movement of the plate rotary actuator 208 relative to (e.g., along) the second linear track 182 selectively linearly moves the backing plate 106 relative to the delivery head 114.

In other examples, the second linear track 182 and the plate linear actuator 206 may include other structures and mechanisms suitable to selectively control linear movement of the backing plate 106 relative to the delivery head 114. In an example, the second linear track 182 includes one or more guide rails and the plate linear actuator 206 includes a motorized support configured to travel along the guide rails.

In the illustrative examples, the drive assembly 174 includes one plate linear actuator 206 that is operatively coupled with both the first linear track 180 and the second linear track 182 and that is configured to traverse both the first linear track 180 and the second linear track 182 to selectively linearly move the backing plate 106 relative to the delivery head 114 along the second axis of linear motion 170 and the third axis of linear motion 172. In other examples, the drive assembly 174 may include additional (e.g., a plurality of) plate linear actuators 206. For example, a first one of the plate linear actuators 206 is operatively coupled with the first linear track 180 and is configured to traverse the first linear track 180 to selectively linearly move the backing plate 106 relative to the delivery head 114 along the second axis of linear motion 170. A second one of the plate linear actuators 206 is operatively coupled with the second linear track 182 and is configured to traverse the second linear track 182 to selectively linearly move the backing plate 106 relative to the delivery head 114 along the third axis of linear motion 172.

In an example, the support mount 176 includes an annular track 184. The annular track 184 is coupled to the delivery head 114. The drive assembly 174 includes a carriage 186. The carriage 186 is operatively coupled with the annular track 184 and is movable along the annular track 184. The arm 178 is rotationally coupled with the carriage 186. Movement of the carriage 186 along the annular track 184 orbitally revolves the backing plate 106 about the delivery head 114. In other words, movement of the carriage 186 along the annular track 184 rotationally moves the backing plate 106 about the second axis of rotational motion 164 relative to the delivery head 114.

In an example, the annular track 184 is coupled to the delivery head 114 so that the second axis of rotational motion 164 passes through a radial center of the annular track 184. The annular track 184 is coupled to the delivery head 114 in such a manner as to not interfere with the handling, delivery, or disposition of the composite tape 104 on the placement surface 222.

In an example, the annular track 184 includes any suitable structure that defines the course or the line of travel or motion of the backing plate 106 about the second axis of rotational motion 164. In an example, the carriage 186 includes any suitable device configured to traverse the annular track 184. In an example, the annular track 184 includes an annular gear and the carriage 186 includes a motorized gearbox, for example, powered by a stepper motor or servomotor, configured to engage and move relative to (e.g., along) the annular gear. In an example, the annular track 184 includes one or more guide rails and the carriage 186 includes a motorized support configured to move along the guide rails.

In some examples, the drive assembly 174 includes an opposed pair of carriages 186. A first one of the pair of carriages 186 is operatively coupled to the annular track 184. A second one of the pair of carriages 186 is operatively coupled to the annular track 184 at a location that is axially opposed to the first one of the pair of carriages 186. The pair of carriages 186 is configured to traverse at least partially around the annular track 184 together while maintaining their axially opposed locations.

In an example, the arm 178 is rotationally coupled with the carriage 186. Movement of the carriage 186 along the annular track 184 selectively rotationally moves the arm 178 about the second axis of rotational motion 164 and, thus, selectively rotationally moves the backing plate 106 relative to the delivery head 114 about the second axis of rotational motion 164. In an example, the arm rotary actuator 204 is coupled to the carriage 186 and the arm 178 is operatively coupled with the arm rotary actuator 204. The arm rotary actuator 204 is configured to rotationally move the arm 178 relative to the carriage 186 about the first axis of rotational motion 162 and, thus, selectively rotationally move the backing plate 106 relative to the delivery head 114 about the first axis of rotational motion 162.

In an example, the drive assembly 174 includes a plate rotary actuator 208. In an example, the plate rotary actuator 208 is coupled to arm 178 and is operatively coupled with the backing plate 106. The plate rotary actuator 208 is configured to selectively rotate the backing plate 106 about the third axis of rotational motion 166 relative to the arm 178 and, thus, selectively rotationally move the backing plate 106 relative to the delivery head and, more particularly, relative to the compaction roller 124. In the illustrative example, the third axis of rotational motion 166 passes through the arm 178, or each one of the pair of arms 178, and the backing plate 106 at the location where the arm 178 is coupled to the backing plate 106.

In some examples, the plate rotary actuator 208 includes a hydraulic rotary actuator, a pneumatic rotary actuator, a mechanical or electro-mechanical rotary actuator, or other suitable type of rotary actuation mechanism. In some examples, the plate rotary actuator 208 includes a stepper motor, a servomotor, a rotary vain actuator, an electric rotary actuator, and the like.

Referring to FIGS. 13 and 14, depending upon the angular orientation of the backing plate 106 relative to the delivery head 114 and, more particularly, relative to the compaction roller 124, defined by the rotational movement of the backing plate 106 about the second axis of rotational motion 164, and the direction of the placement path of the composite tape 104 (FIG. 8), any one of the first plate end 212, second plate end 214, third plate end 216, and fourth plate end 218 may define either one of the first plate location 156 or the second plate location 158 (FIG. 8) when the delivery head 114 is moved along the plate surface 146 to place the composite tape 104.

Figure 15:
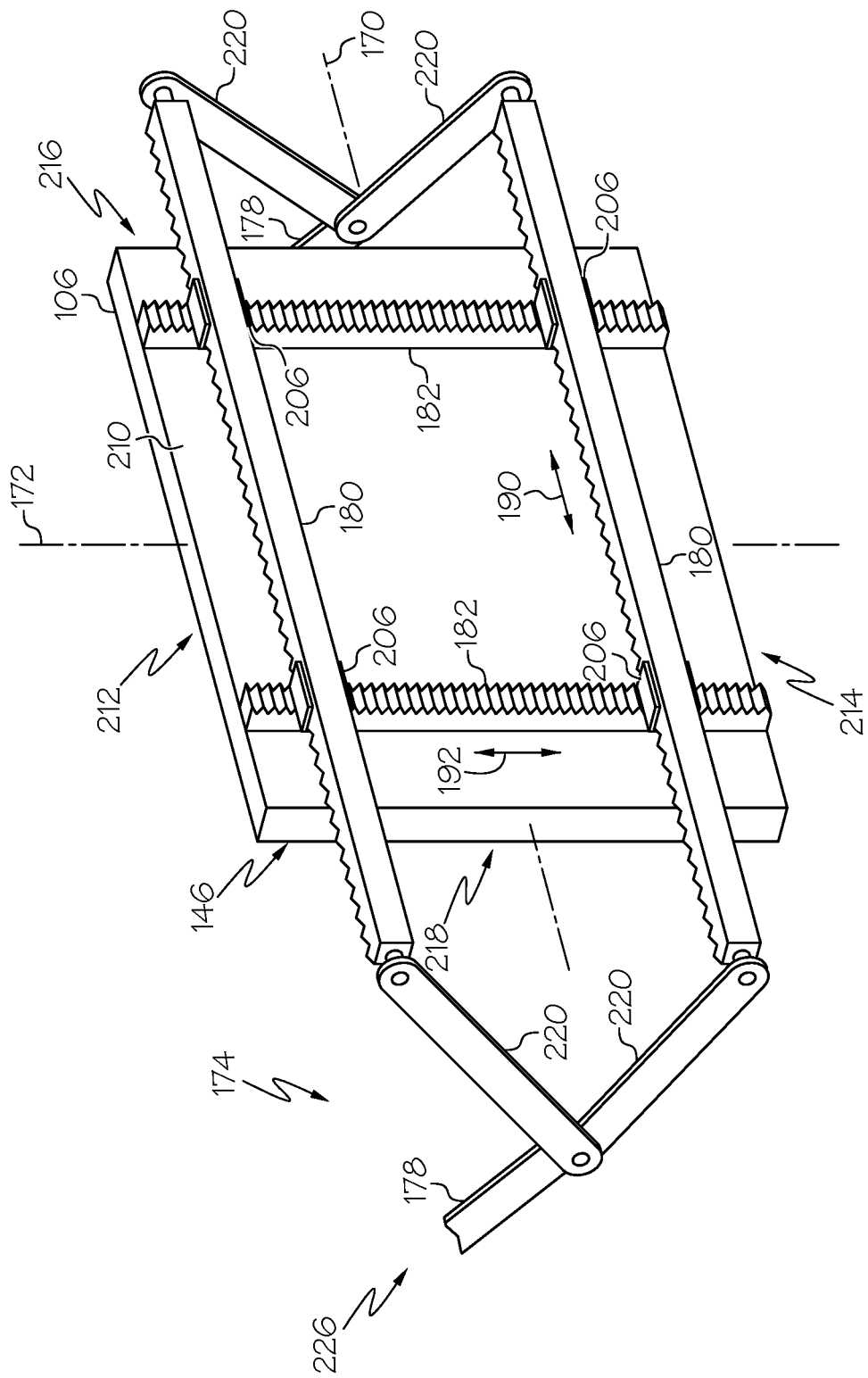
FIG. 15 is a schematic, perspective view of an example of a backing plate and a portion of a reaction structure of the disclosed apparatus.

Referring to FIG. 15, in an example, the drive assembly 174 includes a plurality of first linear tracks 180 and a plurality of second linear tracks 182. In an example, a first one of the second linear tracks 182 is coupled to the back surface 210 of the backing plate 106 proximate to a first plate end 212 (e.g., upper plate end) and a fourth plate end 218 (e.g., right plate end). A second one of the second linear tracks 182 is coupled to the back surface 210 of the backing plate 106 proximate to a second plate end 214 (e.g., lower plate end) and a third plate end 216 (e.g., left plate end). Each one of a first one of the first linear tracks 180 and a second one of the first linear tracks 180 is operatively coupled with the first one of the second linear tracks 182 and the second one of the second linear tracks 182, for example, by a corresponding one of a plurality of plate linear actuators 206. The first one of the first linear tracks 180 and the second one of the first linear tracks 180 are spaced away from each other. The utilization and relative locations of the first linear tracks 180 and the second linear tracks 182 provide increased structural support to the drive assembly 174 and the backing plate 106 and increases the ability or capacity of the backing plate 106 to react to the placement force applied by the delivery head 114 when placing the composite tape 104.

In an example, the reaction structure 226 includes a pair of linkages 220 that couple the arm 178 and the first linear tracks 180 together. In an example, a first one of the linkages 220 is coupled (e.g., pivotally coupled) with the arm 178 and is coupled (e.g., pivotally coupled) with the first one of the first linear tracks 180. A second one of the linkages 220 is coupled (e.g., pivotally coupled) with the arm 178 and is coupled (e.g., pivotally coupled) with the second one of the first linear tracks 180.

In some examples, each one of the first linear track 180 and the second linear track 182 may have any one of various different lengths, configurations, and/or locations and orientations relative to the backing plate 106. Generally, the first linear track 180, or each one of the first linear tracks 180, has a length suitable to enable linear movement of the backing plate 106 along the first linear track 180 that is sufficient to selectively locate the backing plate 106 relative to the delivery head 114 along the second axis of linear motion 170 when the composite tape 104 is being disposed on the backing plate 106 by the tape placement machine 102, as illustrated in FIG. 8. Similarly, the second linear track 182, or each one of the second linear tracks 182, has a length suitable to enable linear movement of the backing plate 106 along the second linear track 182 that is sufficient to selectively locate the backing plate 106 relative to the delivery head 114 along the third axis of linear motion 172 when the composite tape 104 is being disposed on the backing plate 106 by the tape placement machine 102.

Figure 16:
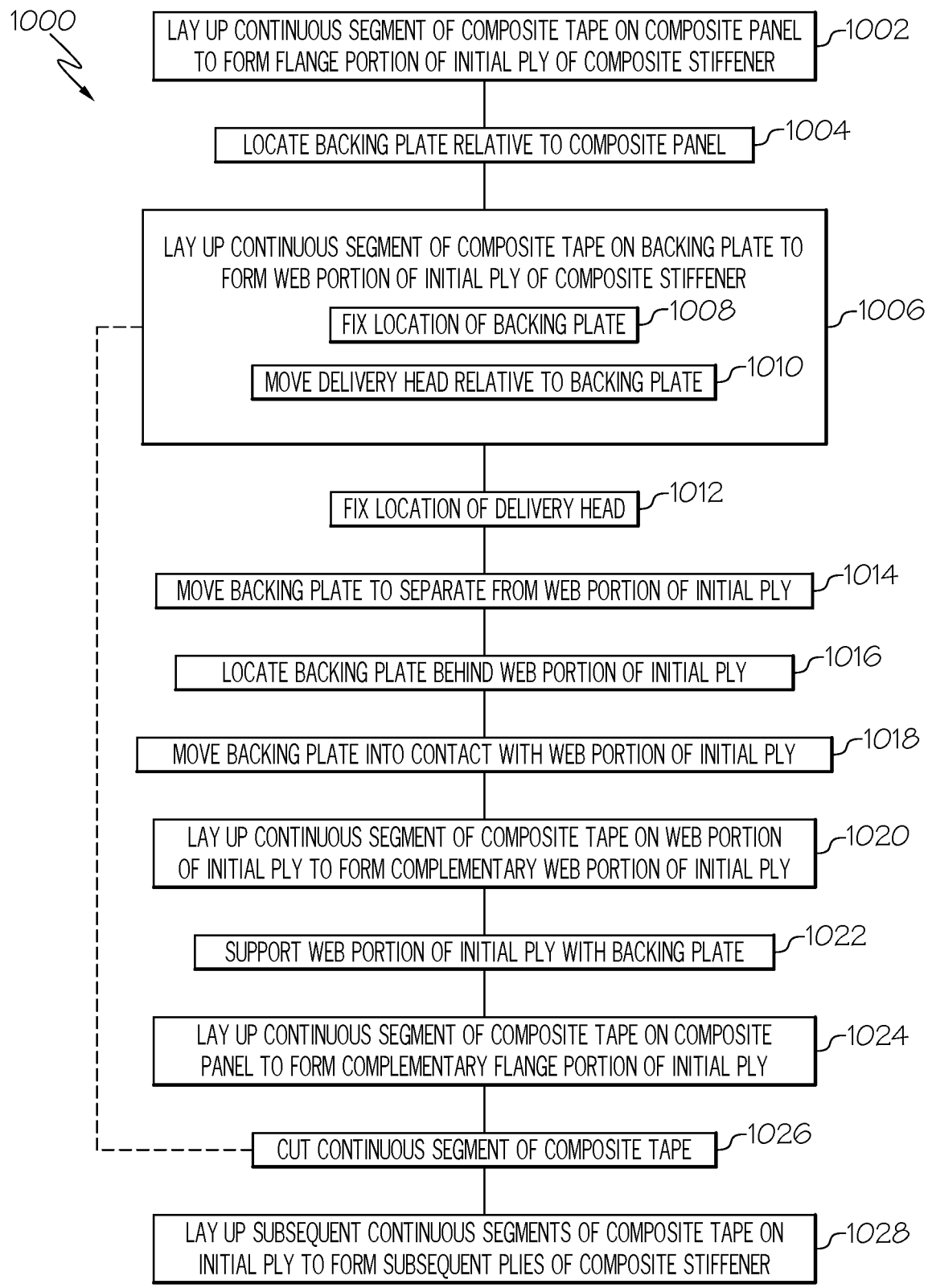
FIG. 16 is a flow diagram of an example of a disclosed method for fabricating a composite structure.

Referring to FIG. 16, also disclosed is an example of a method 1000 for forming the composite structure 300 utilizing the disclosed apparatus 100. Generally, as illustrated in FIGS. 17-30, the method 1000 utilizes selectively locating the backing plate 106 relative to the delivery head 114 of the tape placement machine 102 so that the plate surface 146 serves as the placement surface 222 for disposing the composite tape 104 to form a portion of the composite structure 300. In an example, the method 1000 is utilized for forming the composite structure 300 that includes the composite panel 302, such as a composite skin panel, having a number of (one or more) the composite stiffeners 308, such as composite stringers. In various examples, the method 1000 utilizes the disclosed apparatus 100 to form the composite stiffener 308 in situ on the composite panel 302. The method 1000 includes selectively locating the backing plate 106 to serve as the placement surface 222 for placing the composite tape 104 and reacting to the placement force 112 applied by the delivery head 114 when building up layers of the composite stiffener 308.

In an example, the method 1000 includes a step of forming the composite panel 302. In an example, the composite panel 302 is formed by laying up a plurality of plies 336 (FIGS. 2-4) of the composite material, for example, on the mandrel 116 (FIG. 7). In some examples, the plies 336 of the composite material are sheets of composite material. In some examples, the plies 336 of composite material are layers of the composite tape 104, which are placed, for example, by the tape placement machine 102 before forming the composite stiffener 308. In some examples, at least one of the plies 336 of composite material that form the composite panel 302 and at least one of the plies 334 of the composite tape 104 that form the composite stiffener 308 are the same. In other words, in some examples, the composite panel 302 and the composite stiffener 308 share at least some layers of composite material.

In an example, the method 1000 includes a step of placing the radius filler 338 on the composite panel 302 before laying up the composite tape 104 to form the composite stiffener 308. In some examples, the radius filler 338 has a sufficient tack, or stickiness, such that the radius filler 338 is coupled to the inner surface 330 of the composite panel 302. In some examples, the radius filler 338 is adhesively bonded to the inner surface 330 of the composite panel 302.

Referring to FIG. 16, in an example, the method 1000 includes a step of laying up, with the delivery head 114 of the tape placement machine 102, a continuous segment 342 of the composite tape 104 on the composite panel 302 to form a flange portion 304 of an initial ply 306 of the composite stiffener 308 (Block 1002). In an example, the initial ply 306, or first ply, is one of the plies 334 (FIGS. 2-4) of the composite tape 104 that are laid up to form the composite stiffener 308. In an example, the flange portion 304 of the initial ply 306 (FIG. 17) forms a portion (e.g., a layer) of the flange 332 (FIGS. 2-4) of the composite stiffener 308. For example, the flange portion 304 of the initial ply 306 is a portion of the first flange-layer 372 of the flange 332 (FIG. 10).

Figure 17:
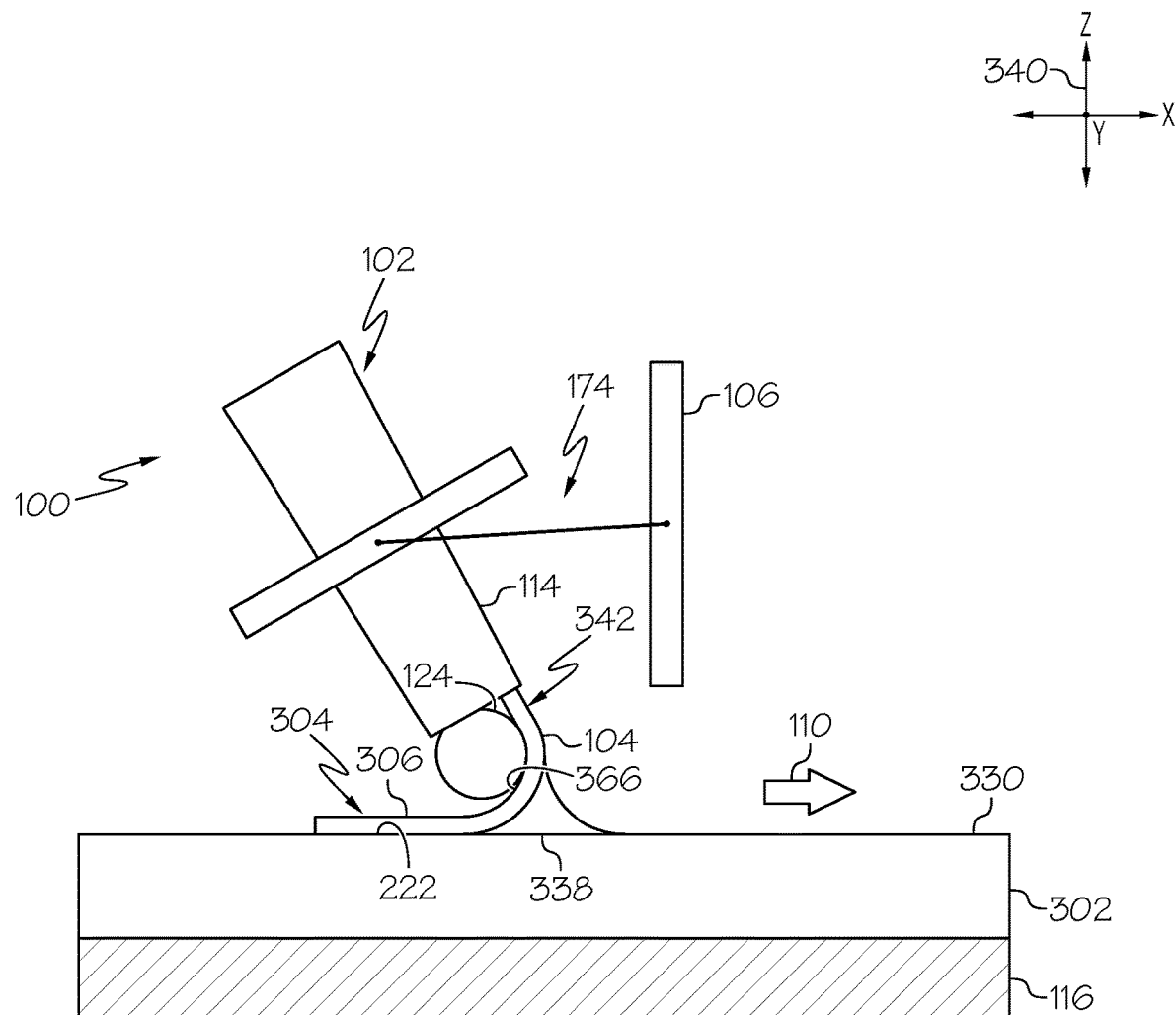
FIGS. 17-30 are a schematic, elevation views of an example of the disclosed apparatus illustrating various steps of the disclosed method of FIG. 16.

Referring to FIG. 17, in an example, the delivery head 114 is selectively positioned and oriented relative to the composite panel 302, for example, by the movement system 130 (FIG. 5). In an example, the position and orientation of the composite panel 302, for example, formed on the mandrel 116, relative to the environment reference frame 340 is fixed. The delivery head 114 is then selectively moved relative to the composite panel 302 to dispose the continuous segment 342 of the composite tape 104 on the composite panel 302 to form the flange portion 304 of the initial ply 306 of the composite stiffener 308. For example, the delivery head 114 is linearly moved relative to (e.g., along or parallel to the Z-axis of) the environment reference frame 340 along the placement path, indicated by directional arrow 110, so that the continuous segment 342 of the composite tape 104 is placed on the inner surface 330 of the composite panel 302, which serves as the placement surface 222, by the delivery head 114. The compaction roller 124 immediately or subsequently compresses the continuous segment 342 of the composite tape 104, as the composite tape 104 is disposed.

In an example, the method 1000 includes a step of laying up, with the delivery head 114, the continuous segment 342 of the composite tape 104 on the radius filler 338 to form a transition portion of the initial ply 306 of the composite stiffener 308. In an example, the transition portion of the initial ply 306 forms a portion (e.g., a layer) of the transition 364 (FIGS. 2-4) of the composite stiffener 308.

Referring still to FIG. 17, in an example, the delivery head 114 is then selectively moved relative to the composite panel 302 and the radius filler 338 to transition from the composite panel 302 to the radius filler 338 and to dispose the continuous segment 342 of composite tape 104 on the radius filler 338. For example, the delivery head 114 is linearly moved relative to (e.g., along the X-axis of) the environment reference frame 340 and/or rotationally moved relative to (e.g., about the Y-axis of) the environment reference frame 340 so that the continuous segment 342 of the composite tape 104 is placed on the radius filler 338, which serves as the placement surface 222, by the delivery head 114. The compaction roller 124 immediately or subsequently compresses the continuous segment 342 of the composite tape 104, as the composite tape 104 is disposed.

When the delivery head 114 transitions from disposing the composite tape 104 on the composite panel 302 to disposing the composite tape 104 on the radius filler 338, a sufficient length of the composite tape 104 is fed from the delivery head 114 so as to not lift or otherwise pull the continuous segment 342 of composite tape 104, forming the flange portion 304 of the initial ply 306, from the inner surface 330 of the composite panel 302.

In some examples, as illustrated in FIG. 17, the radius filler 338 is sufficiently coupled (e.g., tacked) to the inner surface 330 of the composite panel 302 such that the radius filler 338 remains in place and reacts to the placement force 112 applied by the delivery head 114 when disposing the composite tape 104 on the radius filler 338 and transitioning from the flange portion 304 of the initial ply 306 to a web portion 310 (FIG. 17) of the initial ply 306 of the composite stiffener 308.

Figure 18:
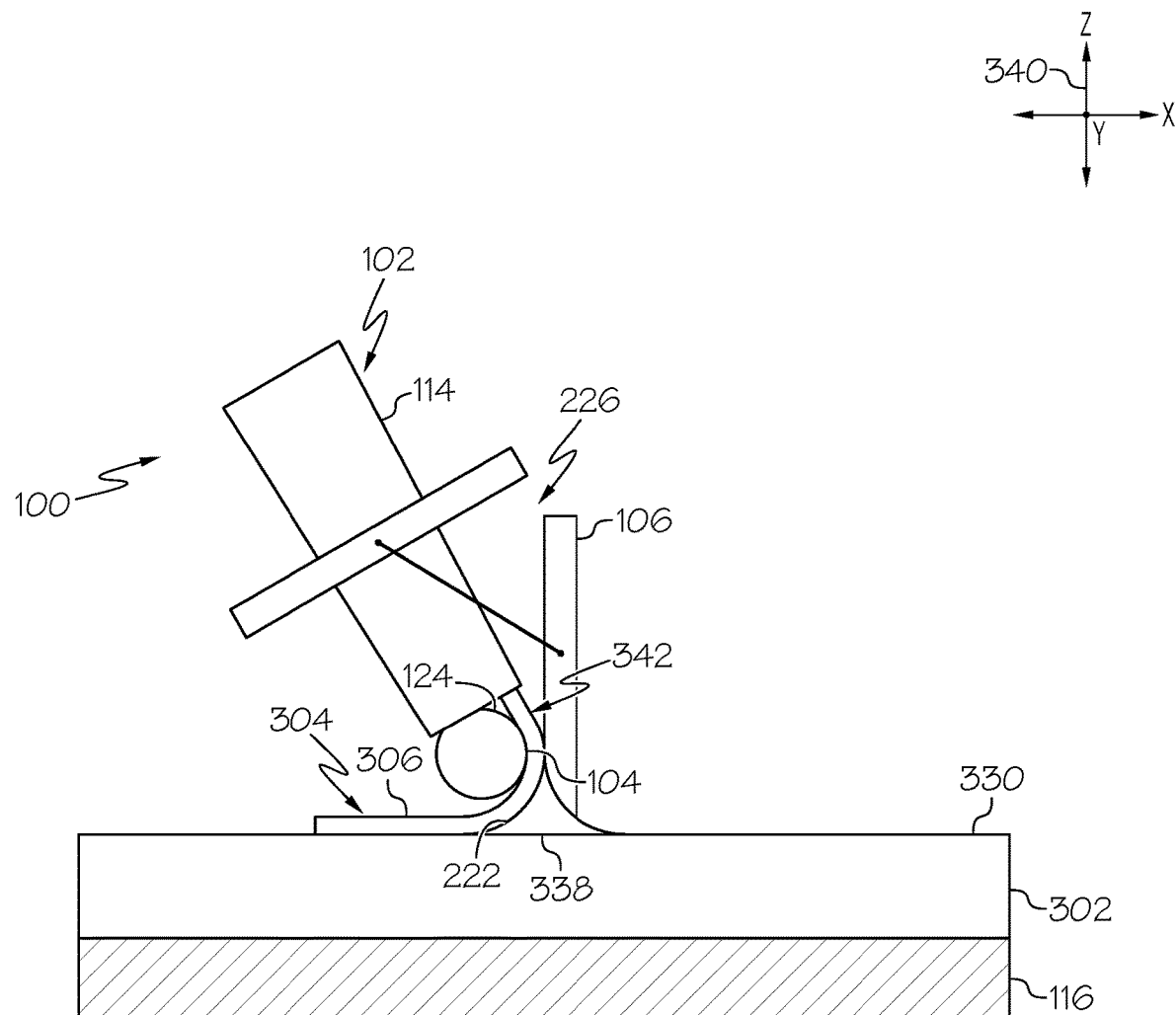

In some examples, as illustrated in FIG. 18, the backing plate 106 is selectively located relative to the composite panel 302, the radius filler 338, and the delivery head 114 to support the radius filler 338, as the composite tape 104 is disposed by the delivery head 114. For example, the backing plate 106 is linearly moved relative to (e.g., along the Z-axis of) the environment reference frame 340 and/or rotationally moved relative to (e.g., about the Y-axis of) the environment reference frame 340 so that a portion of the backing plate 106 is in contact with a side of the radius filler 338 that is opposite the delivery head 114. In this example, the backing plate 106 holds the radius filler 338 in place and reacts to the placement force 112 applied by the delivery head 114 when disposing the composite tape 104 on the radius filler 338 and transitioning from the flange portion 304 of the initial ply 306 to the web portion 310 (FIG. 19) of the initial ply 306 of the composite stiffener 308. In an example, a portion of the backing plate 106 has a shape corresponding to the shape of the portion of the radius filler 338 on which the backing plate 106 makes contact.

Referring to FIG. 16, in an example, the method 1000 includes a step of locating the backing plate 106, coupled to the delivery head 114, relative to the composite panel 302 (Block 1004). The step of locating the backing plate 106 relative to the composite panel 302 follows the steps of laying up the continuous segment 342 of the composite tape 104 on the composite panel 302 to form the flange portion 304 of the initial ply 306 of the composite stiffener 308 and laying up the continuous segment 342 of the composite tape 104 on the radius filler 338 to form the transition portion of the initial ply 306 of the composite stiffener 308.

Figure 19:
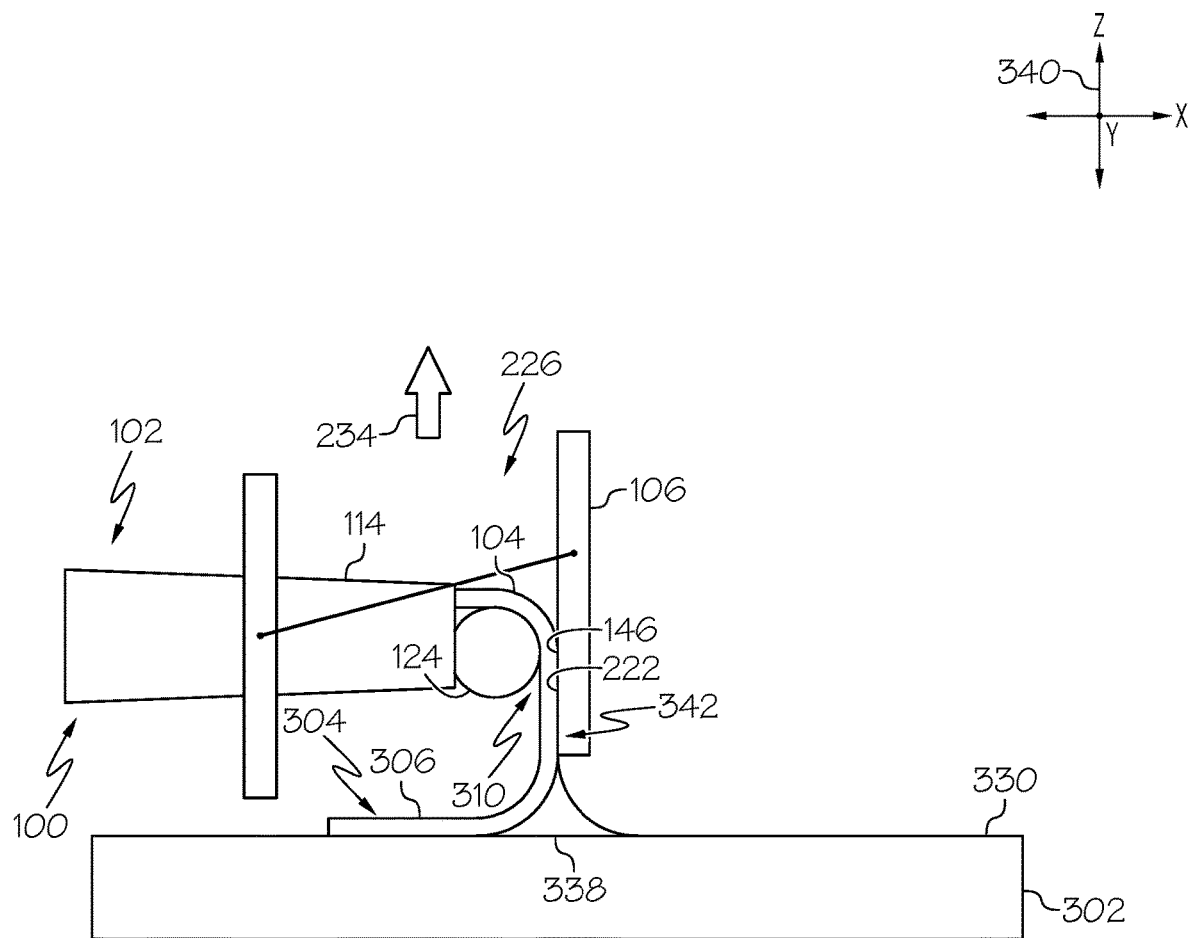

Referring to FIG. 19, in an example, the backing plate 106 is selectively moved (e.g., positioned and oriented) relative to the composite panel 302, for example, by the drive assembly 174 (FIG. 5). For example, the backing plate 106 is linearly moved relative to (e.g., along the X-axis and/or the Z-axis of) the environment reference frame 340 and/or rotationally moved relative to (e.g., about the Y-axis of) the environment reference frame 340 to that the plate surface 146 is suitably located to serve as the placement surface 222.

In an example, the backing plate 106 is located approximately perpendicular to the inner surface 330 of the composite panel 302. In other examples, the backing plate 106 is located at any one of various other (e.g., oblique) angles relative to the inner surface 330 of the composite panel 302.

Referring to FIG. 16, in an example, the method 1000 includes a step of layup up, with the delivery head 114, the continuous segment 342 of composite tape 104 on the backing plate 106 to form the web portion 310 of the initial ply 306 of the composite stiffener 308 (Block 1006). In an example, the web portion 310 of the initial ply 306 (FIG. 19) forms a portion (e.g., a layer) of the web 328 (FIGS. 2-4) of the composite stiffener 308. For example, the web portion 310 of the initial ply 306 is a portion of the first web-layer 374 of the web 328 (FIG. 9).

Referring to FIG. 19, in an example, the delivery head 114 is selectively moved (e.g., positioned and/or oriented) relative to the composite panel 302 and the backing plate 106 to dispose the continuous segment 342 of the composite tape 104 on the backing plate 106 to form the web portion 310 of the initial ply 306 of the composite stiffener 308. For example, the delivery head 114 is linearly moved relative to (e.g., along or parallel to the Z-axis of) the environment reference frame 340 along the placement path, indicated by directional arrow 234, so that the continuous segment 342 of the composite tape 104 is placed on the plate surface 146 of the composite panel 302, which serves as the placement surface 222, by the delivery head 114. The compaction roller 124 immediately or subsequently compresses the continuous segment 342 of the composite tape 104, as the composite tape 104 is disposed.

When the delivery head 114 moves relative to the composite panel 302 and the backing plate 106 to dispose the continuous segment 342 of the composite tape 104 on the backing plate 106 to form the web portion 310 of the initial ply 306 of the composite stiffener 308, a sufficient length of the composite tape 104 is fed from the delivery head 114 so as to not lift or otherwise pull the continuous segment 342 of composite tape 104, forming the flange portion 304 of the initial ply 306, from the inner surface 330 of the composite panel 302 or the radius filler 338.

Generally, the orientation of the web portion 310 of the initial ply 306 of the composite stiffener 308 relative to the flange portion 304 of the initial ply 306 of the composite stiffener 308 depends on the orientation of the backing plate 106 relative to the composite panel 302 and/or the environment reference frame 340. In an example, the web portion 310 of the initial ply 306 is disposed approximately perpendicular to the flange portion 304 of the initial ply 306. In other examples, the web portion 310 of the initial ply 306 is disposed at any one of various other (e.g., oblique) angles relative to the flange portion 304 of the initial ply 306.

Generally, the backing plate 106 is selectively located relative to the delivery head 114 and the composite panel 302 before layup up the continuous segment 342 of the composite tape 104 on the backing plate 106 to form a web portion 310 of the initial ply 306 of the composite stiffener 308. The plate surface 146 of the backing plate 106 serves as the placement surface 222 for placing the composite tape 104 and the backing plate 106 reacts to the placement force 112 (FIGS. 5 and 6), applied by the delivery head 114 when placing the composite tape 104, through the reaction structure 226 and back to the delivery head 114. In some examples, the backing plate 106 is selectively located relative to the delivery head 114, or the environment reference frame 340, by at least one of rotationally moving the backing plate 106 about the first axis of rotational motion 162 (FIGS. 11-14), linearly moving the backing plate 106 along the first axis of linear motion 168 (FIGS. 11-14), linearly moving the backing plate 106 relative to the delivery head 114 along the second axis of linear motion 170 (FIGS. 11-14), linearly moving the backing plate 106 relative to the delivery head 114 along the third axis of linear motion 172 (FIGS. 11-14), and rotationally moving the backing plate 106 relative to the delivery head 114 about the third axis of rotational motion 166 (FIGS. 11-14).

In an example, the backing plate 106 is selectively rotationally moved about at least one of the first axis of rotational motion 162 and the second axis of rotational motion 166 to orient the backing plate 106 relative to the composite panel 302 in at an angular orientation corresponding to the angular orientation of the web portion 310 of the initial ply 306 (e.g., the web 328 of the composite stiffener 308) relative to the inner surface 330 of the composite panel 302. In an example, the backing plate 106 is selectively linearly moved along the first axis of linear motion 168 toward the delivery head 114 to position the backing plate 106 for placement of the composite tape 104. In an example, the backing plate 106 is selectively linearly moved along the third axis of linear motion 172 such that the arm 178 of the drive assembly 174 does not interfere with a portion of the composite stiffener 308 that is being laid up or has previously been laid up.

Referring to FIG. 16, in an example, the method 1000 includes a step of fixing a location of the backing plate 106 relative to the composite panel 302 (Block 1008) and a step of moving the delivery head 114 relative to the backing plate 106 when laying up the composite tape 104 on the backing plate 106 to form the web portion 310 of the initial ply 306 of the composite stiffener 308 (Block 1010).

Referring to FIG. 19, in an example, with the backing plate 106 selectively located for placement of the composite tape 104, the location of the backing plate 106 relative to the composite panel 302, the radius filler 338 is fixed. The delivery head 114 moves relative to the composite panel 302, the radius filler 338, and the backing plate 106 to dispose the composite tape 104 on the backing plate 106 and to form a portion of the composite stiffener 308. In an example, the backing plate 106 is fixed relative to the environment reference frame 340 and the delivery head 114 linearly moves along the placement path, indicated by directional arrow 234, relative to (e.g., along or parallel to the Z-axis of) the environment reference frame 340 to place the continuous segment 342 of the composite tape 104 on the backing plate 106 to form the web portion 310 of the initial ply 306 of the composite stiffener 308. Thus, during placement of the composite tape 104 on the backing plate 106 to form the web portion 310 of the initial ply 306, the delivery head 114 moves relative to the backing plate 106, which remains stationary and at the fixed location relative to the environment reference frame 340. The drive assembly 174 reacting to the movement of the delivery head 114 maintains the fixed location of the backing plate 106 and achieves movement of the delivery head 114 relative to the backing plate 106.

Referring to FIG. 16, in an example, the method 1000 includes a step of fixing a location of the delivery head 114 relative to the composite panel 302 to support an orientation of the web portion 310 of the initial ply 306 of the composite stiffener 308 (Block 1012).

Figure 20:
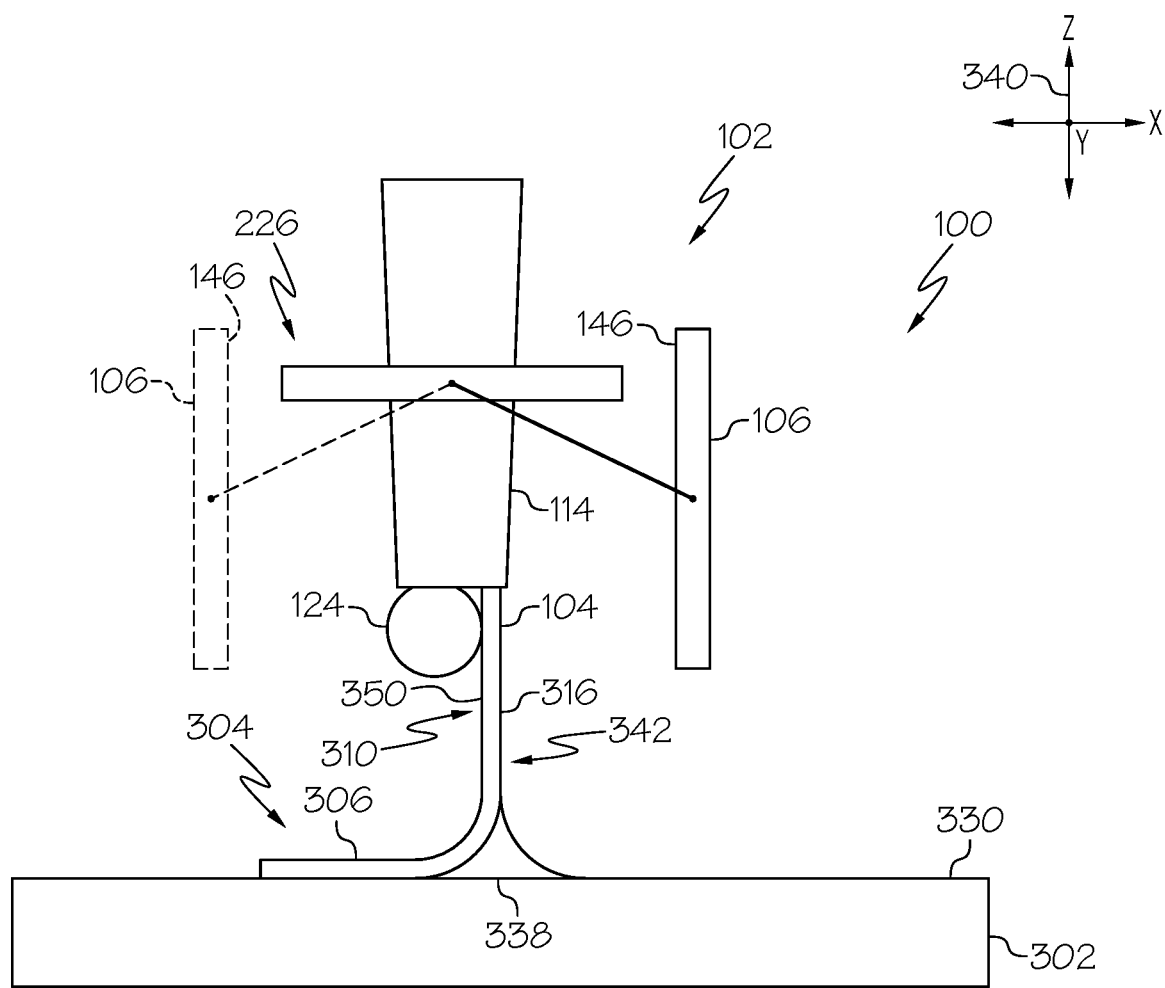

Referring to FIG. 20, in an example, following the step of layup up the continuous segment 342 of composite tape 104 on the backing plate 106 to form the web portion 310 of the initial ply 306, the delivery head 114 is selectively (e.g., rotationally) moved relative to (e.g., about the Y-axis of) the environment reference frame 340, or the composite panel 302, to support the web portion 310 of the initial ply 306 in preparation of forming a complementary portion of the web 328. In an example, the delivery head 114 supports and holds the web portion 310 of the initial ply 306 approximately perpendicular to the flange portion 304 of the initial ply 306 of the composite stiffener 308.

Referring to FIG. 16, in an example, the method 1000 includes a step of moving the backing plate 106 relative to the delivery head 114 to separate the backing plate 106 from a first surface 316 of the web portion 310 of the initial ply 306 (Block 1014).

The step of moving the backing plate 106 to separate the backing plate 106 from the first surface 316 of the web portion 310 is performed while the location of the delivery head 114 is fixed relative to the environment reference frame 340 and the web portion 310 of the initial ply 306 is held in a supported position by the delivery head 114, as illustrated in FIG. 20. In an example, the backing plate 106 selectively moves (e.g., linearly and/or rotationally) relative to (e.g., along the X-axis and/or about the Y-axis of) the environment reference frame 340. In an example, the backing plate 106 is moved relative to the delivery head 114 and to the web portion 310 of the initial ply 306 by at least one of linearly moving the backing plate 106 relative to the delivery head 114 along the first axis of linear motion 168 (FIGS. 11-14) and/or rotationally moving the backing plate 106 relative to the delivery head 114 about the first axis of rotational motion 162 (FIGS. 11-14).

In an example, the method 1000 includes a step of locating the backing plate 106 behind the web portion 310 of the initial ply 306 (Block 1016). In other words, the backing plate 106 is selectively moved relative to the environment reference frame 340, or relative to the delivery head 114 and the web portion 310 of the initial ply 306, so that the plate surface 146 of the backing plate 106 moves from facing the first surface 316 of the web portion 310 to facing a second surface 350 of the web portion 310 that is opposite the first surface 316.

The step of locating the backing plate 106 behind the web portion 310 of the initial ply 306 is performed while the location of the delivery head 114 is fixed relative to the environment reference frame 340 and the web portion 310 of the initial ply 306 is held in a supported position by the delivery head 114, as illustrated in FIG. 20. In an example, the backing plate 106 is selectively moved (e.g., rotationally) relative to (e.g., about the Z-axis of) the environment reference frame 340. In an example, the backing plate 106 is moved relative to the delivery head 114 and to the web portion 310 of the initial ply 306 by rotationally moving the backing plate 106 relative to the delivery head 114 about the second axis of rotational motion 164 (FIGS. 11-14).

For the purpose of this disclosure, the term "behind," such as in reference to the backing plate 106 being located behind a certain article, such as a portion of the composite tape 104 or behind certain ones of the plies 334 that forms the composite stiffener 308, refers to the backing plate 106 being located in a position in which the certain article is located between the backing plate 106 and the delivery head 114 and, more particularly, between the backing plate 106 and the compaction roller 124. For example, with the backing plate 106 located behind a previously laid initial ply 306 of the composite stiffener 308, the backing plate 106 supports the initial ply 306, which serves as the placement surface 222 for placing a subsequent ply of the composite tape 104, and reacts to the placement force 112 applied to the initial ply 306 by the delivery head 114 when laying up the subsequent ply of the composite tape 104 on the initial ply 306.

Referring to FIG. 16, in an example, the method 1000 includes a step of moving the backing plate 106 relative to the delivery head 114 into contact engagement with the second surface 350 of the web portion 310 of the initial ply 306, opposite the first surface 316 of the web portion 310 of the initial ply 306 (Block 1018).

Figure 21:
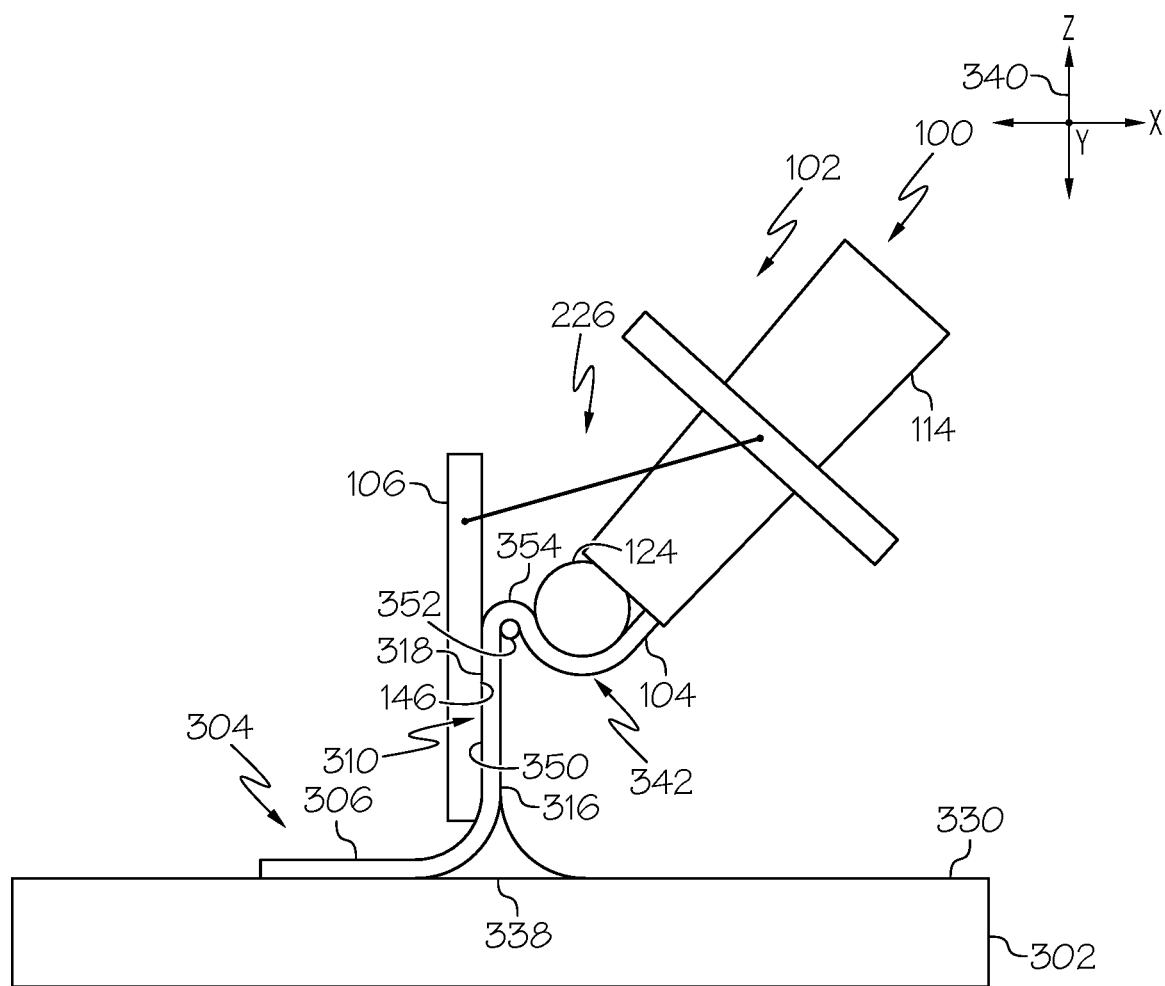

The step of moving the backing plate 106 relative to the delivery head 114 into contact engagement with the second surface 350 of the web portion 310 of the initial ply 306 is performed while the location of the delivery head 114 is fixed relative to the environment reference frame 340 and the web portion 310 of the initial ply 306 is held in a supported position by the delivery head 114, as illustrated in FIG. 21. In an example, the backing plate 106 is selectively moved (e.g., linearly and/or rotationally) relative to (e.g., along or parallel to the X-axis and/or about the Y-axis of) the environment reference frame 340. In an example, the backing plate 106 is selectively moved relative to the delivery head 114 and the web portion 310 of the initial ply 306 by at least one of rotationally moving the backing plate 106 about the first axis of rotational motion 162 (FIGS. 11-14), linearly moving the backing plate 106 along the first axis of linear motion 168 (FIGS. 11-14), linearly moving the backing plate 106 relative to the delivery head 114 along the second axis of linear motion 170 (FIGS. 11-14), linearly moving the backing plate 106 relative to the delivery head 114 along the third axis of linear motion 172 (FIGS. 11-14), and/or rotationally moving the backing plate 106 relative to the delivery head 114 about the third axis of rotational motion 166 (FIGS. 11-14).

In an example, the method 1000 includes a step of folding the continuous segment 342 of the composite tape 104 over on itself to initiate forming the complementary portion of the initial ply 306 of the web 328 and to transition from the web portion 310 of the initial ply 306 to the complementary web portion 312 of the initial ply 306. In an example, the backing plate 106 is selectively located in contact with the second surface 350 of the initial ply 306 of the web portion 310. A fold-over support 352 is located in contact with, or otherwise engages, the first surface 316 of the initial ply 306 of the web portion 310, opposite the backing plate 106. The backing plate 106 is held in a fixed location relative to the environment reference frame 340. The delivery head 114 is selectively moved (e.g., linearly and/or rotationally) relative to (e.g., along or parallel to the X-axis and/or the Z-axis and/or about the Y-axis of) the environment reference frame 340 to form a fold-over portion 354 of the initial ply 306. In other words, the fold-over support 352 serves as the placement surface 222 when the delivery head 114 disposes the continuous segment 342 of the composite tape 104 on the fold-over support 352 to form the fold-over portion 354 of the initial ply 306. In an example, the fold-over portion 354 of the initial ply 306 forms a portion (e.g., a layer) of the distal end 362 (FIGS. 2-4) of the web 328 of the composite stiffener 308.

When the delivery head 114 transitions to disposing the composite tape 104 on the fold-over support 352, a sufficient length of the composite tape 104 is fed from the delivery head 114 so as to not lift or otherwise pull the continuous segment 342 of composite tape 104 forming the flange portion 304 of the initial ply 306 from the inner surface 330 of the composite panel 302 and/or forming the transition portion of the initial ply 306 from the radius filler 338.

In an example, the fold-over support 352 is a cable, cord, rod, or other suitable member that is suspended above the composite panel 302 and that extends along (e.g., parallel to) the longitudinal axis 324 of the composite stiffener 308. After the fold-over portion 354 is formed, the fold-over support 352 is removed. In an example, the fold-over support 352 is withdrawn from between the web portion 310 of the initial ply 306 and a complementary web portion 312 (FIG. 22) of the initial ply 306.

In an example, once formation of the composite stiffener 308 is complete (e.g., after all subsequent plies of the composite tape 104 are disposed to form all subsequent layers of the composite stiffener 308), the fold-over of the web 328 may form the distal end 362 (FIGS. 2-4) of the web 328. In an example, another radius filler (not illustrated) may be located within the small space formed by the fold-over support 352 between the web portion 310 of the initial ply 306 and the complementary web portion 312 (FIG. 22) of the initial ply 306. In an example, once formation of the composite stiffener 308 is complete, the fold-over of the web 328 may be trimmed to form the distal end 362 of the web 328.

Figure 22:
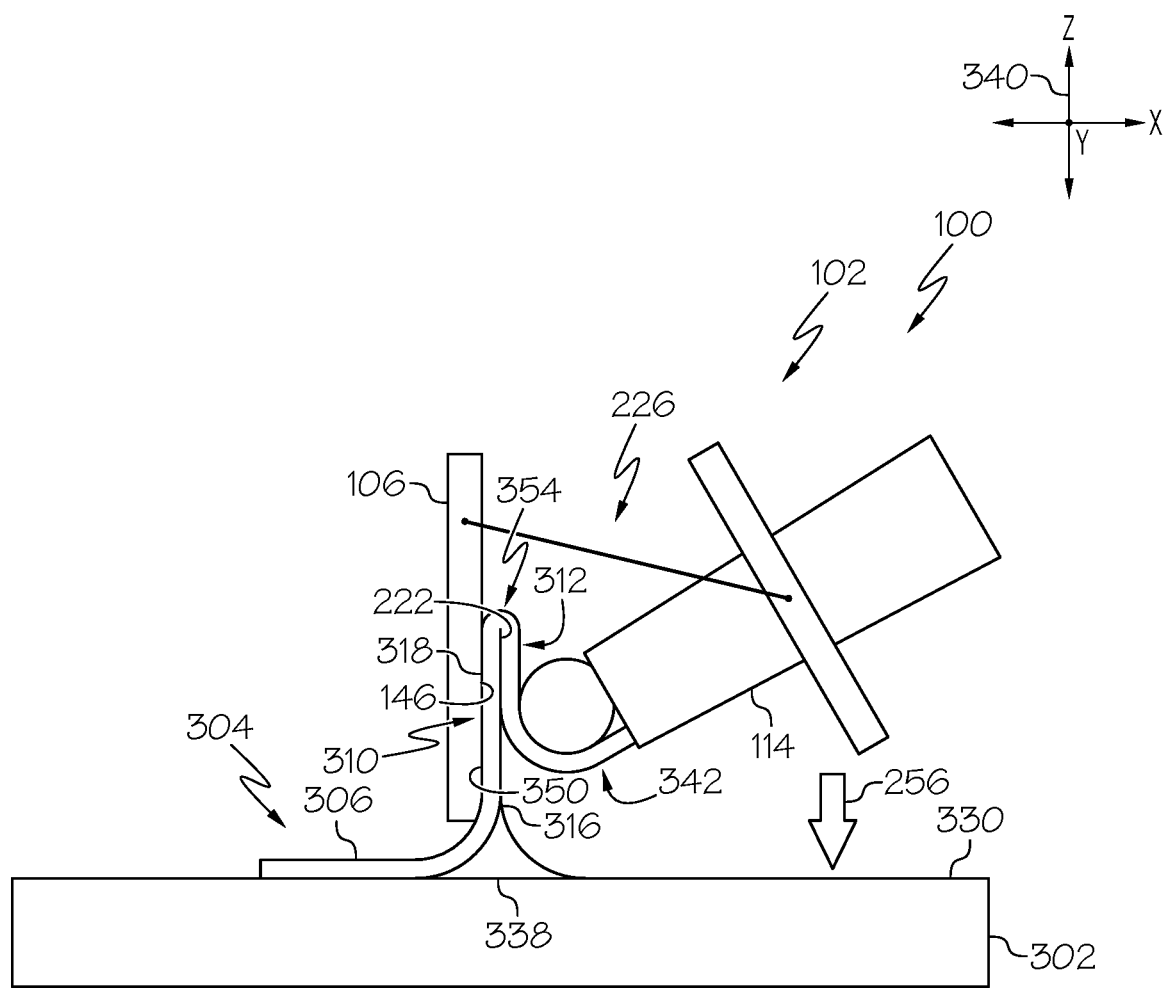

Referring to FIG. 22, following formation of the fold-over portion 354, the backing plate 106 is selectively located to support the web portion 310 so that the continuous segment 342 of the composite tape 104 can be disposed on the web portion 310 to form the complementary web portion 312. In an example, the backing plate 106 is selectively located so that the plate surface 146 is in contact with the second surface 350 of the web portion 310 of the initial ply 306. The continuous segment 342 of the composite tape 104 is disposed on the first surface 316 of the web portion 310 of the initial ply 306, which serves as the placement surface 222, by the delivery head 114 and is compressed by the compaction roller 124. The backing plate 106 supports the web portion 310 and reacts to the placement force 112 applied to the web portion 310 of the initial ply 306 by the delivery head 114.

In an example, the backing plate 106 is selectively (e.g., linearly and/or rotationally) moved relative to (e.g., along or parallel to the X-axis and/or the Z-axis and/or about the Y-axis of) the environment reference frame 340. In an example, the backing plate 106 is selectively rotationally moved about at least one of the first axis of rotational motion 162 and the second axis of rotational motion 166 to orient the backing plate 106 relative to the web portion 310 of the initial ply 306 in at an angular orientation corresponding to the angular orientation of the web portion 310 of the initial ply 306 (e.g., the web 328 of the composite stiffener 308). In an example, the backing plate 106 is selectively linearly moved along the first axis of linear motion 168 toward the delivery head 114 to position the backing plate 106 into contact with the second surface 350 of the web portion 310 of the initial ply 306. In an example, the backing plate 106 is selectively linearly moved along the third axis of linear motion 172 such that the arm 178 of the drive assembly 174 does not interfere with a portion of the composite stiffener 308 that is being laid up or has previously been laid up.

Referring to FIG. 16, in an example, the method 1000 includes a step of layup up, with the delivery head 114, the continuous segment 342 of the composite tape 104 on the web portion 310 of the initial ply 306, supported by the backing plate 106, to form the complementary web portion 312 of the initial ply 306 of the composite stiffener 308 (Block 1020). In an example, the complementary web portion 312 of the initial ply 306 (FIG. 22) forms a portion (e.g., a layer) of the web 328 (FIGS. 2-4) of the composite stiffener 308. For example, the complementary web portion 312 of the initial ply 306 is a portion of the first web-layer of the web 328 (FIG. 10).

In an example, as illustrated in FIG. 22, the delivery head 114 is selectively moved (e.g., positioned and/or oriented) relative to the composite panel 302, the backing plate 106, and the web portion 310 of the initial ply 306 to dispose the continuous segment 342 of the composite tape 104 on the web portion 310 of the initial ply 306 to form the complementary web portion 312 of the initial ply 306 of the composite stiffener 308. For example, the delivery head 114 is linearly moved relative to (e.g., along or parallel to the Z-axis of) the environment reference frame 340 along the placement path, indicated by directional arrow 256, so that the continuous segment 342 of the composite tape 104 is placed on the first surface 316 of the web portion 310 of the initial ply 306, which serves as the placement surface 222, by the delivery head 114. The compaction roller 124 immediately or subsequently compresses the continuous segment 342 of the composite tape 104, as the composite tape 104 is disposed.

When the delivery head 114 moves relative to the backing plate 106 and the web portion 310 of the initial ply 306 to dispose the continuous segment 342 of the composite tape 104 on the backing plate 106 to form the complementary web portion 312 of the initial ply 306 of the composite stiffener 308, a sufficient length of the composite tape 104 is fed from the delivery head 114 so as to not deform the web portion 310 of the initial ply 306.

Referring to FIG. 16, in an example, the method 1000 includes a step of supporting the web portion 310 of the initial ply 306 with the backing plate 106 when laying up the composite tape 104 on the web portion 310 of the initial ply 306 to form the complementary web portion 312 of the initial ply 306 of the composite stiffener 308 (Block 1022).

When laying the continuous segment 342 of the composite tape 104 on the web portion 310 of the initial ply 306 to form the complementary web portion 312 of the initial ply 306, supporting the web portion 310 of the initial ply 306 with the backing plate 106 reacts to the placement force 112 applied by the delivery head 114. to the web portion 310 of the initial ply 306 by transferring the placement force 112 from the backing plate 106, through the reaction structure 226, and back to the delivery head 114.

In an example, the method 1000 includes a step of fixing a location of the backing plate 106 relative to the web portion 310 of the initial ply 306 of the composite stiffener 308 and a step of moving the delivery head 114 relative to the backing plate 106 when laying up the composite tape 104 on the web portion 310 of the initial ply 306 to form the complementary web portion 312 of the initial ply 306 of the composite stiffener 308.

Referring to FIG. 22, in an example, with the backing plate 106 selectively located for placement of the composite tape 104, the location of the backing plate 106 relative to the composite panel 302, the web portion 310 of the initial ply 306, and the radius filler 338 is fixed. The delivery head 114 moves relative to the composite panel 302, the radius filler 338, the backing plate 106, and the web portion 310 of the initial ply 306 to dispose the composite tape 104 on the web portion 310 of the initial ply 306 to form a portion of the composite stiffener 308. In an example, the backing plate 106 is fixed relative to the environment reference frame 340 and the delivery head 114 moves along the placement path, indicated by directional arrow 256, relative to the environment reference frame 340 to place the continuous segment 342 of the composite tape 104 on the web portion 310 of the initial ply 306 to form the complementary web portion 312 of the composite stiffener 308. Thus, during placement of the composite tape 104 on the web portion 310 of the initial ply 306 to form the complementary web portion 312 of the initial ply 306, the delivery head 114 moves relative to the backing plate 106, which remains stationary and at the fixed location relative to the environment reference frame 340. The drive assembly 174 reacting to the movement of the delivery head 114 maintains the fixed location of the backing plate 106 and achieves movement of the delivery head 114 relative to the backing plate 106.

In an example, the method 1000 includes a step of laying up, with the delivery head 114, the continuous segment 342 of the composite tape 104 on the radius filler 338 to form a complementary transition portion of the initial ply 306 of the composite stiffener 308. In an example, the complementary transition portion of the initial ply 306 forms a portion (e.g., a layer) of the transition 364 (FIGS. 2-4) of the composite stiffener 308.

In an example, the delivery head 114 is then selectively moved relative to the web portion 310 of the initial ply 306 and the radius filler 338 to transition from the web portion 310 to the radius filler 338 and to dispose the continuous segment 342 of composite tape 104 on the radius filler 338. For example, the delivery head 114 is selectively (linearly and/or rotationally) moved relative to (e.g., along or parallel to the Z-axis and/or the X-axis and/or about the Y-axis of) the environment reference frame 340 so that the continuous segment 342 of the composite tape 104 is placed on the radius filler 338, which serves as the placement surface 222, by the delivery head 114. The compaction roller 124 immediately or subsequently compresses the continuous segment 342 of the composite tape 104, as the composite tape 104 is disposed.

When the delivery head 114 transitions from disposing the composite tape 104 on the web portion 310 of the initial ply 306 to disposing the composite tape 104 on the radius filler 338, a sufficient length of the composite tape 104 is fed from the delivery head 114 so as to not lift or otherwise pull the continuous segment 342 of composite tape 104, forming the web portion 310 of the initial ply 306, from the first surface 316 of the web portion 310 of the initial ply 306.

Referring to FIG. 16, in an example, the method 1000 includes a step of laying up, with the delivery head 114, the continuous segment 342 of the composite tape 104 on the composite panel 302 to form a complementary flange portion 314 of the initial ply 306 of the composite stiffener 308 (Block 1024). In an example, the complementary flange portion 314 of the initial ply 306 (FIG. 23) forms a portion (e.g., a layer) of the flange 332 (FIGS. 2 and 3) of the composite stiffener 308. For example, the complementary flange portion 314 of the initial ply 306 is a portion of the first flange-layer 372 of the flange 332 (FIG. 10).

Figure 23:
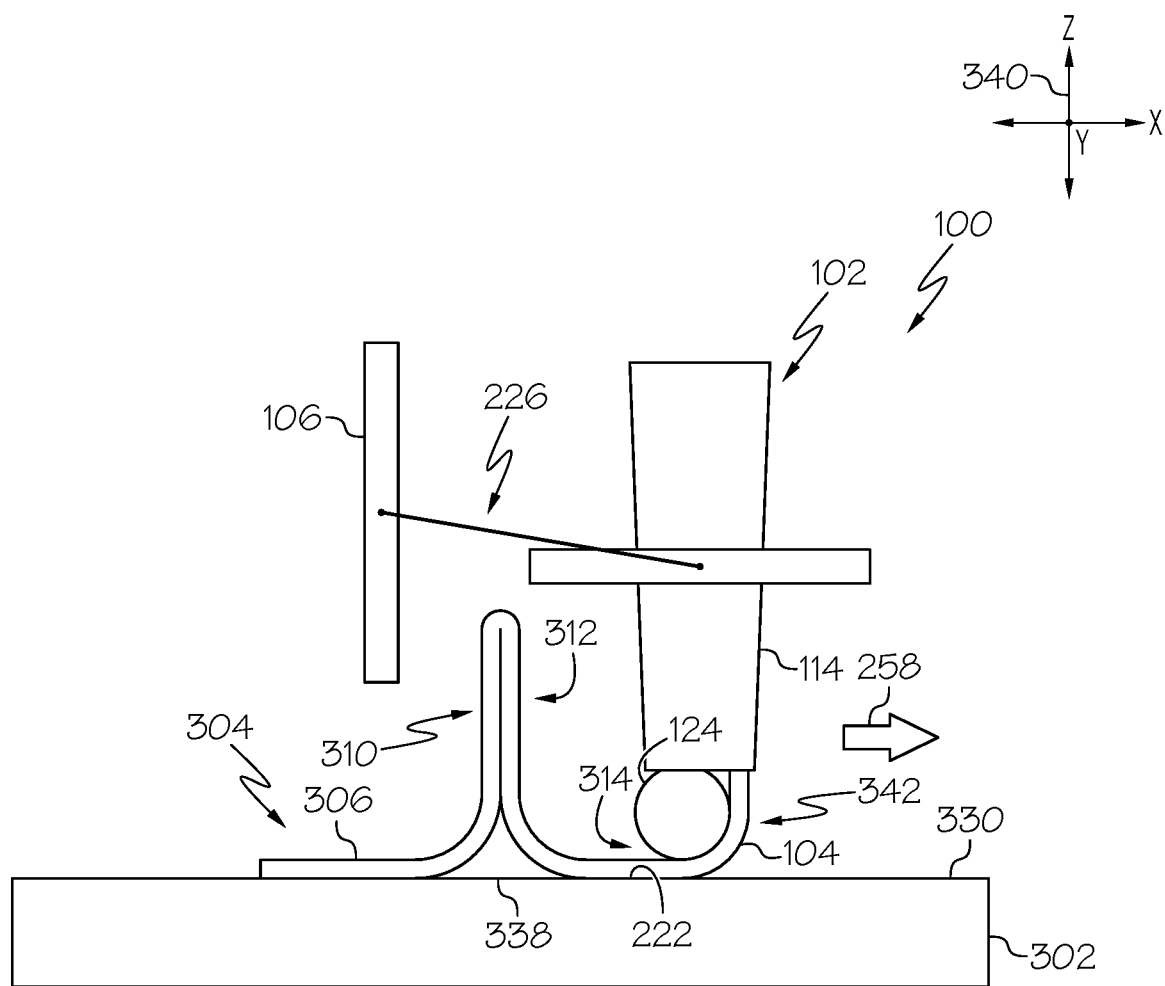

Referring to FIG. 23, in an example, the delivery head 114 is then selectively moved relative to the web portion 310 of the initial ply 306 and the radius filler 338 to transition from the radius filler 338 to the composite panel 302 and to dispose the continuous segment 342 of composite tape 104 on the composite panel 302 to form the complementary flange portion 314 of the initial ply 306. In an example, the complementary flange portion 314 of the initial ply 306 is placed perpendicular to the complementary web portion 312 of the initial ply 306.

In an example, the delivery head 114 is then selectively moved relative to the composite panel 302 to dispose the continuous segment 342 of the composite tape 104 on the composite panel 302 to form the complementary flange portion 314 of the initial ply 306 of the composite stiffener 308. For example, the delivery head 114 is linearly moved relative to (e.g., along or parallel to the X-axis of) the environment reference frame 340 along the placement path, indicated by directional arrow 258, so that the continuous segment 342 of the composite tape 104 is placed on the inner surface 330 of the composite panel 302, which serves as the placement surface 222, by the delivery head 114. The compaction roller 124 immediately or subsequently compresses the continuous segment 342 of the composite tape 104, as the composite tape 104 is disposed.

Referring to FIG. 16, in an example, the method 1000 includes a step of cutting the continuous segment 342 of the composite tape 104 to conclude the initial ply 306 (Block 1026). In various examples, the manner in which the continuous segment 342 of the composite tape 104 is cut may depend, for example, on the particular lay up configuration of the composite stiffener 308.

In an example, cutting the continuous segment 342 of the composite tape 104 after placing the continuous segment 342 of the composite tape 104 to form the flange portion 304 and the web portion 310 of the initial ply 306 forms the base structure of the composite stiffener 308 having a L-shape in cross-section.

In some examples, the method 1000 may also include a step of laying up additional continuous segments of the composite tape 104 on the web portion 310 to form the complementary web portion 312 and/or the complementary flange portion 314. In an example, cutting the additional segments of the composite tape 104 after placement to form the complementary web portion 312 forms the base structure of the composite stiffener 308 having a bac-to-back L-shape in cross-section.

In an example, cutting the continuous segment 342 of the composite tape 104 after placing the continuous segment 342 of the composite tape 104 to form the flange portion 304, the web portion 310, the complementary web portion 312, and the complementary flange portion 314 of the initial ply 306 forms the base structure of the composite stiffener 308 having a T-shape in cross-section.

In an example, the method 1000 includes a step of laying up, with the delivery head 114, a plurality of subsequent continuous segments 344 of the composite tape 104 on the initial ply 306 to form a plurality of subsequent plies 320 of the composite stiffener 308 (Block 1028). In an example, each one of the subsequent plies 320 is one of the plies 334 of the composite tape 104 (FIGS. 2-4) that is laid up to form the composite stiffener 308.

Referring to FIGS. 17-30, in accordance with the disclosed method 1000, the step of laying up the continuous segment 342 of the composite tape 104 to form the initial ply 306 of the composite stiffener 308 and the step of laying up the subsequent continuous segments 344 of the composite tape 104 on the initial ply 306 to form the subsequent plies 320 of the composite stiffener 308 may be performed in a variety of different ways to achieve a desired configuration of the plies 334 (FIGS. 2-4) of the composite tape 104.

In an example, the composite tape 104 includes a fiber orientation. When forming the composite stiffener 308, the continuous segments of the composite tape 104 may be placed so that each one of the plies 334 of the composite stiffener 308 has a predefined fiber orientation angle relative to a longitudinal axis 324 of the composite stiffener 308. In some examples, the composite stiffener 308 is one of a symmetric laminate, an anti-symmetric laminate, an un-symmetric laminate, a quasi-isotropic laminate, a unidirectional laminate, an angle-ply laminate, a cross-ply laminate, and the like.

In an example, the continuous segment of the composite tape 104 may be placed so that one or more of the plies 334 of the composite stiffener 308 has a fiber orientation angle of 90-degrees relative to the longitudinal axis 324 of the composite stiffener 308. In an example, the continuous segment of the composite tape 104 may be placed so that one or more of the plies 334 of the composite stiffener 308 has a fiber orientation angle of 45-degrees relative to the longitudinal axis 324 of the composite stiffener 308. In an example, the continuous segment of the composite tape 104 may be placed so that one or more of the plies 334 of the composite stiffener 308 has a fiber orientation angle of 0-degrees relative to the longitudinal axis 324 of the composite stiffener 308. In an example, the continuous segment of the composite tape 104 may be placed so that one or more of the plies 334 of the composite stiffener 308 has a fiber orientation angle of 30-degrees relative to the longitudinal axis 324 of the composite stiffener 308. In an example, the continuous segment of the composite tape 104 may be placed so that one or more of the plies 334 of the composite stiffener 308 has a fiber orientation angle of 60-degrees relative to the longitudinal axis 324 of the composite stiffener 308.

The fiber orientation angle of each one of the plies 334 of the composite stiffener 308 may be depend upon the angular orientation of the delivery head 114 of the tape placement machine 102 and the angular orientation of the placement path that the delivery head 114 follows when placing the composite tape 104. In an example, the ply 334 of the composite stiffener 308 has a 90-degree fiber orientation angle when the placement path of the delivery head 114 traverses the longitudinal axis 324 of the composite stiffener 308 at a 90-degree angle, or perpendicular to the longitudinal axis 324 of the composite stiffener 308. In an example, the ply 334 of the composite stiffener 308 has a 45-degree, 30-degree, or 60-degree fiber orientation angle when the placement path of the delivery head 114 traverses the longitudinal axis 324 of the composite stiffener 308 at a 45-degree, 30-degree, or 60-degree angle, respectively, or oblique to the longitudinal axis of the composite stiffener 308. In an example, the ply 334 of the composite stiffener 308 has a 0-degree fiber orientation angle when the placement path of the delivery head 114 traverses the longitudinal axis 324 of the composite stiffener 308 at a 0-degree angle, or parallel to the longitudinal axis of the composite stiffener 308.

Figure 31:
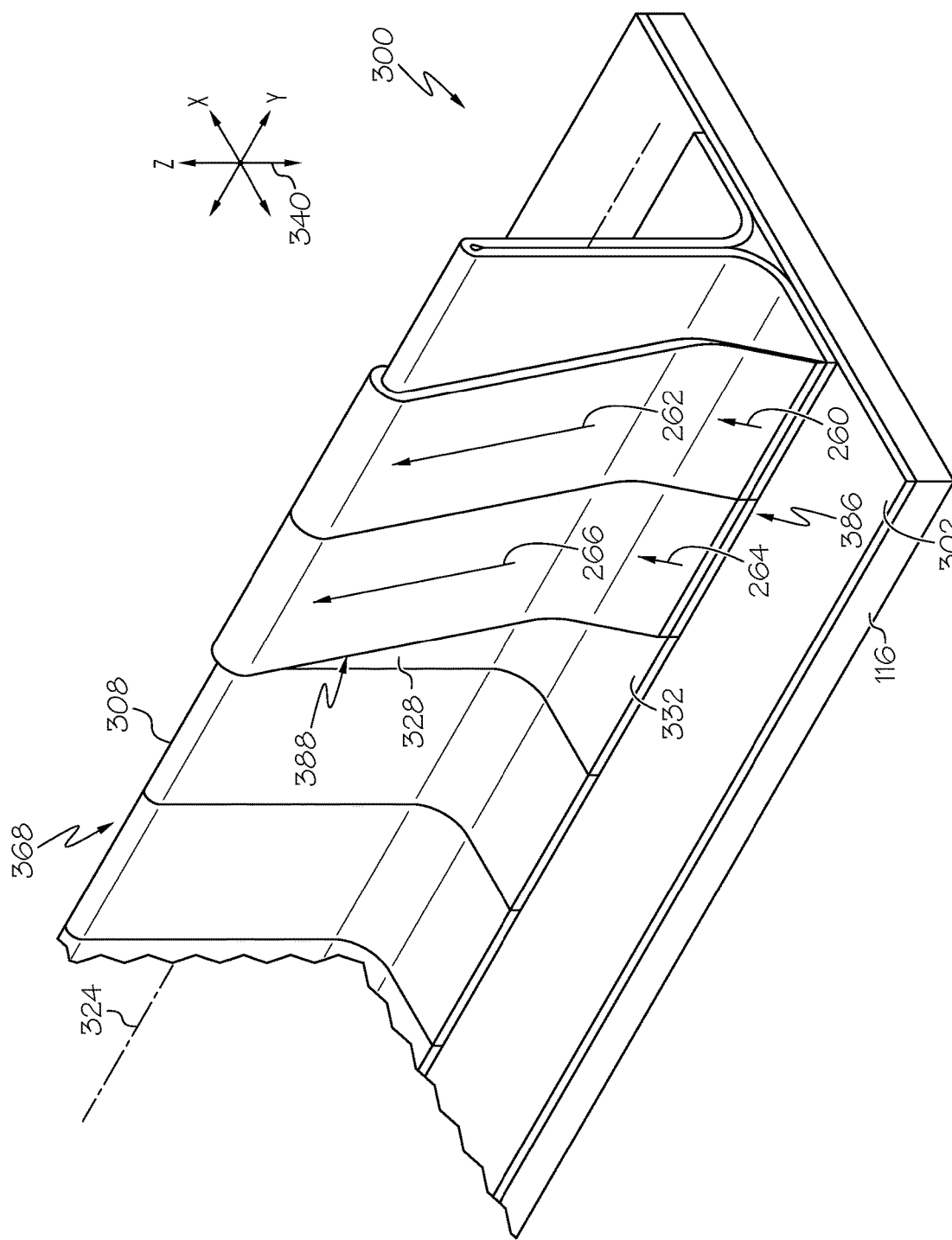
FIG. 31 is a schematic, partial, perspective view of an example of the disclosed composite structure.
Figure 32:
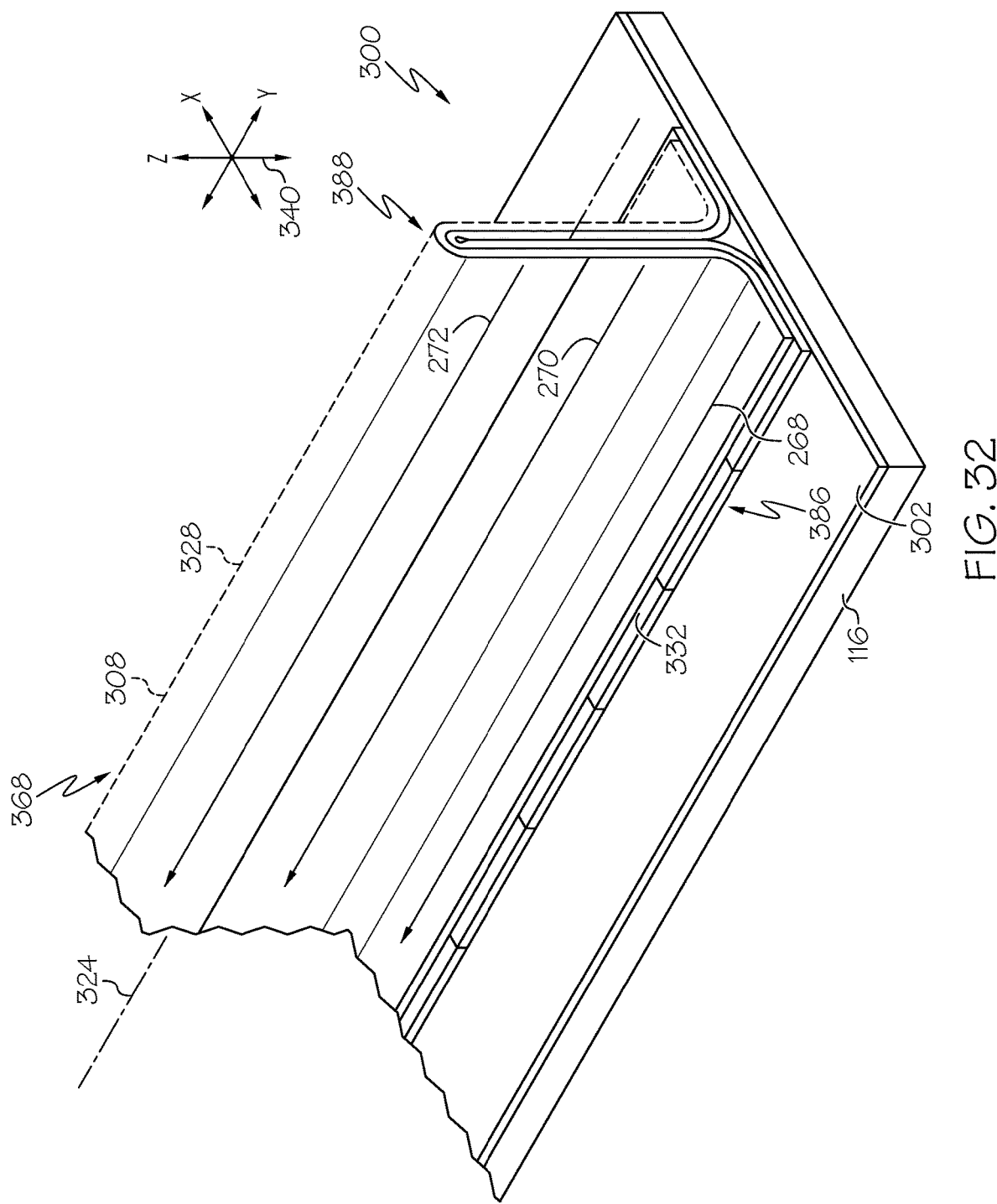
FIG. 32 is a schematic, partial, perspective view of an example of the disclosed composite structure.

FIGS. 10, 31, and 32 schematically illustrate examples of the composite stiffener 308 in which an initial layer 386, or an initial one of the plies 334 (FIGS. 2-4), of the composite stiffener 308 has a 90-degree fiber orientation angle. Each one of the continuous segments of the composite tape 104 is disposed by the delivery head 114 along a placement path that is oriented at a 90-degree angle relative to the longitudinal axis 324 of the composite stiffener 308.

FIG. 10 schematically illustrated an example of the composite stiffener 308 in which a subsequent layer 388, or a subsequent one of the plies 334 (FIGS. 2-4), of the composite stiffener has a 90-degree fiber orientation angle. Each one of the continuous segments of the composite tape 104 is disposed by the delivery head 114 along an associated placement path, indicated by an associated one of the directional arrows 110, 234, 252, 254, that is oriented at a 90-degree angle relative to the longitudinal axis 324 of the composite stiffener 308. In can be appreciated that when disposing the composite tape 104, the compaction roller 124 of the delivery head 114 follows the course of the placement paths, indicated by an associated one of the directional arrows 110, 234, 252, 254.

FIG. 31 schematically illustrated an example of the composite stiffener 308 in which a subsequent layer 388, or a subsequent one of the plies 334 (FIGS. 2-4), of the composite stiffener has an oblique (e.g., 45-degree) fiber orientation angle. Each one of the continuous segments of the composite tape 104 is disposed by the delivery head 114 along an associated placement path, indicated by an associated one of the directional arrows 260, 262, 264, 266, that is oriented at an oblique (e.g., 45-degree) angle relative to the longitudinal axis 324 of the composite stiffener 308. In can be appreciated that when disposing the composite tape 104, the compaction roller 124 of the delivery head 114 follows the course of the placement paths, indicated by an associated one of the directional arrows 260, 262, 264, 266.

FIG. 32 schematically illustrated an example of the composite stiffener 308 in which a subsequent layer 388, or a subsequent one of the plies 334 (FIGS. 2-4), of the composite stiffener has a 0-degree fiber orientation angle. Each one of the continuous segments of the composite tape 104 is disposed by the delivery head 114 along an associated placement path, indicated by an associated one of the directional arrows 268, 270, 272, that is oriented at a 0-degree angle relative to the longitudinal axis 324 of the composite stiffener 308. In can be appreciated that when disposing the composite tape 104, the compaction roller 124 of the delivery head 114 follows the course of the placement paths, indicated by an associated one of the directional arrows 268, 270, 272.

FIGS. 17-23 schematically illustrate placement of the continuous segment 342 of the composite tape 104 to form the initial ply 306 of the composite stiffener 308. In the illustrative examples, the delivery head 114 follows placement paths that are one of perpendicular (90-degrees) to the longitudinal axis 324 of the composite stiffener 308 or oblique (30-degrees, 45-degrees, 60-degrees) to the longitudinal axis 324 of the composite stiffener 308.

FIGS. 24-28 schematically illustrate placement of one of the subsequent continuous segments 344 of the composite tape 104 to form one of the subsequent plies 320 of the composite stiffener 308. In the illustrative examples, the delivery head 114 follows placement paths that are one of perpendicular (90-degrees) to the longitudinal axis 324 of the composite stiffener 308 or oblique (30-degrees, 45-degrees, 60-degrees) to the longitudinal axis of the composite stiffener 308.

Figure 29:
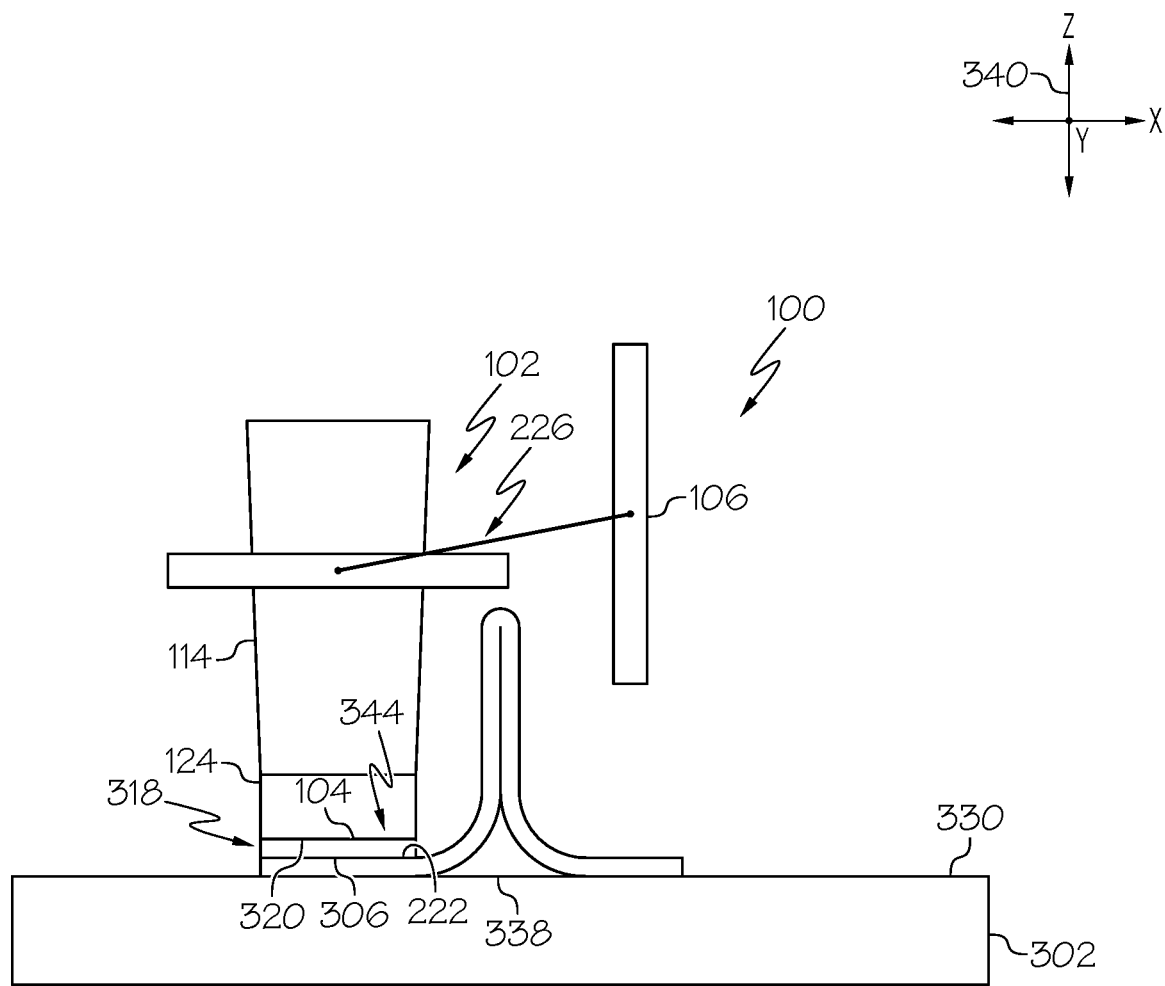
Figure 30:
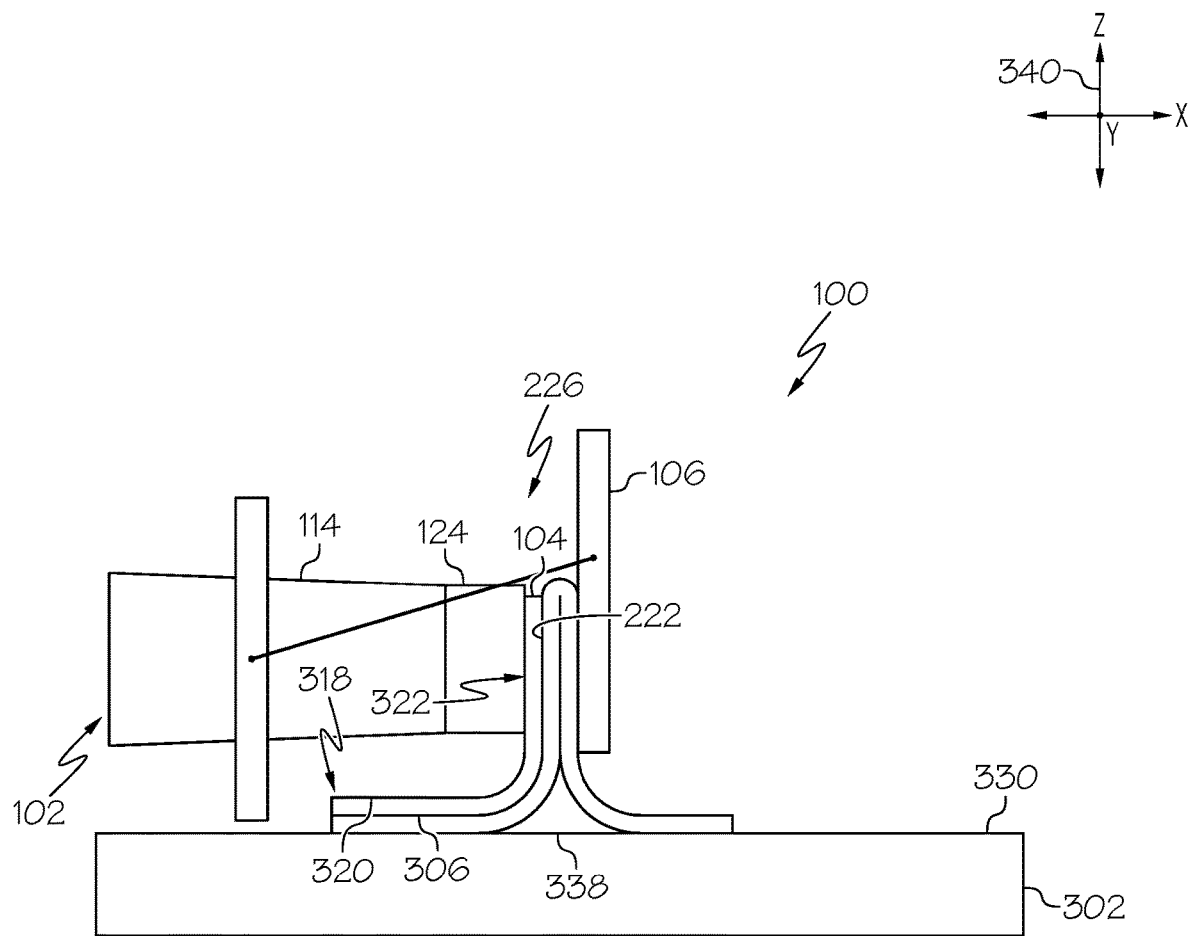

FIGS. 29 and 30 schematically illustrate placement of one of the subsequent continuous segments 344 of the composite tape 104 to form one of the subsequent plies 320 of the composite stiffener 308. In the illustrative examples, the delivery head 114 follows the placement path that is parallel (0-degrees) to the longitudinal axis 324 of the composite stiffener 308.

Figure 24:
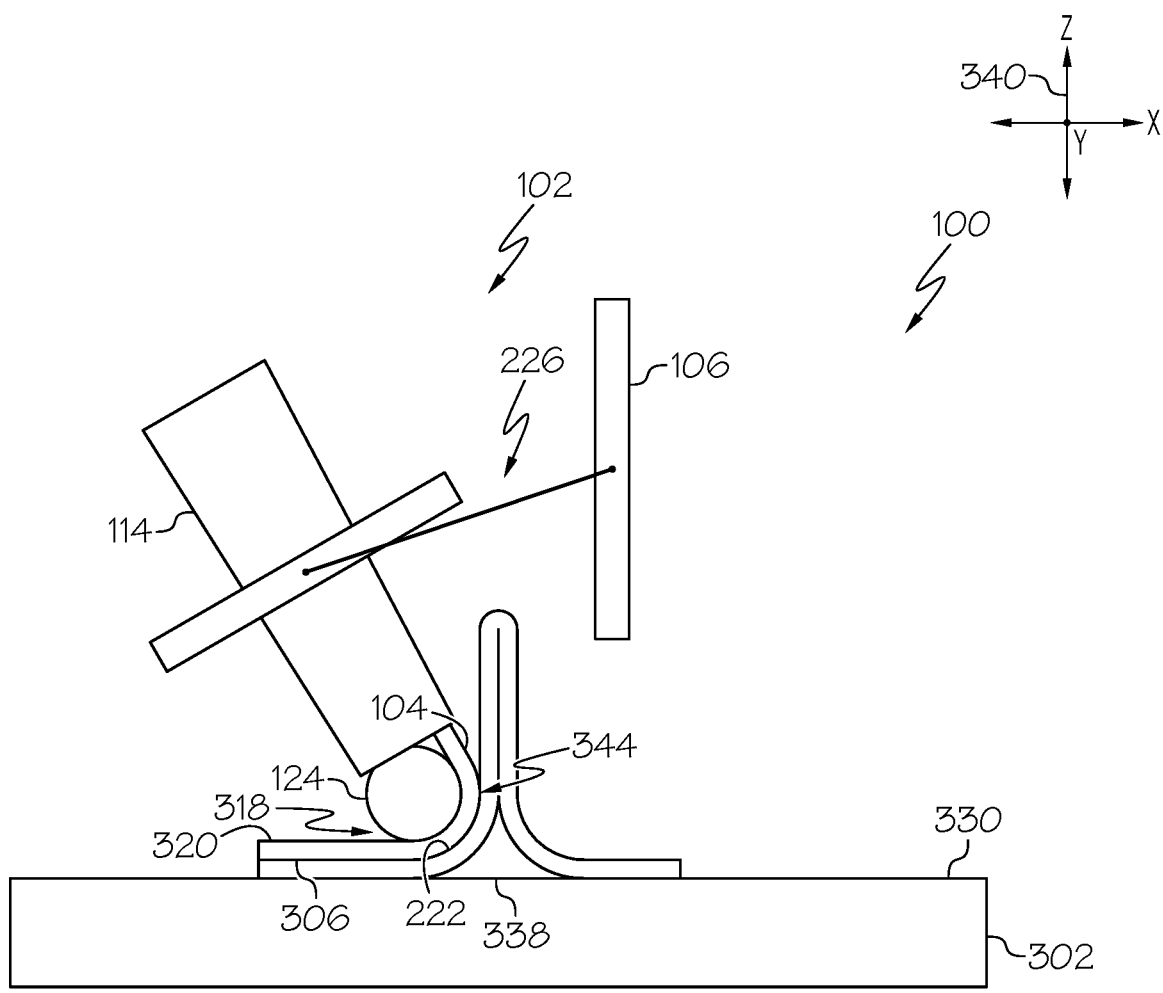

Referring to FIG. 24, in an example, the method 1000 includes a step of laying up, with the delivery head 114, a first one of the subsequent continuous segments 344 of the composite tape 104 on the flange portion 304 of the initial ply 306 of the composite stiffener 308 to form a flange portion 318 of a first one of the subsequent plies 320 of the composite stiffener 308.

Figure 25:
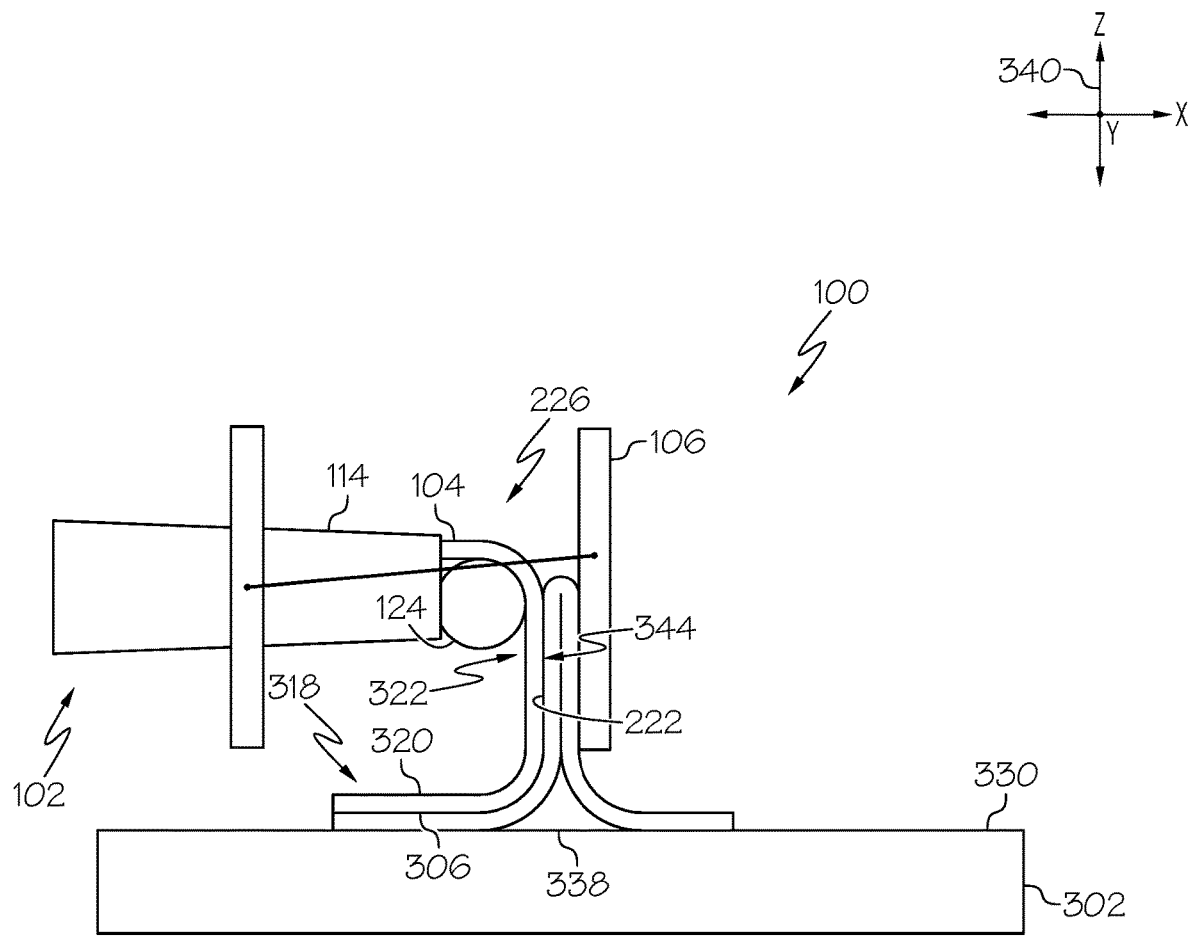

Referring to FIG. 25, in an example, the method 1000 includes a step of locating the backing plate 106 behind the complementary web portion 312 of the initial ply 306. In an example, the method 1000 includes a step of laying up, with the delivery head 114, the first one of the subsequent continuous segments 344 of the composite tape 104 on the web portion 310 of the initial ply 306, supported by the backing plate 106, to form a web portion 322 of the first one of the subsequent plies 320 of the composite stiffener 308.

Figure 26:
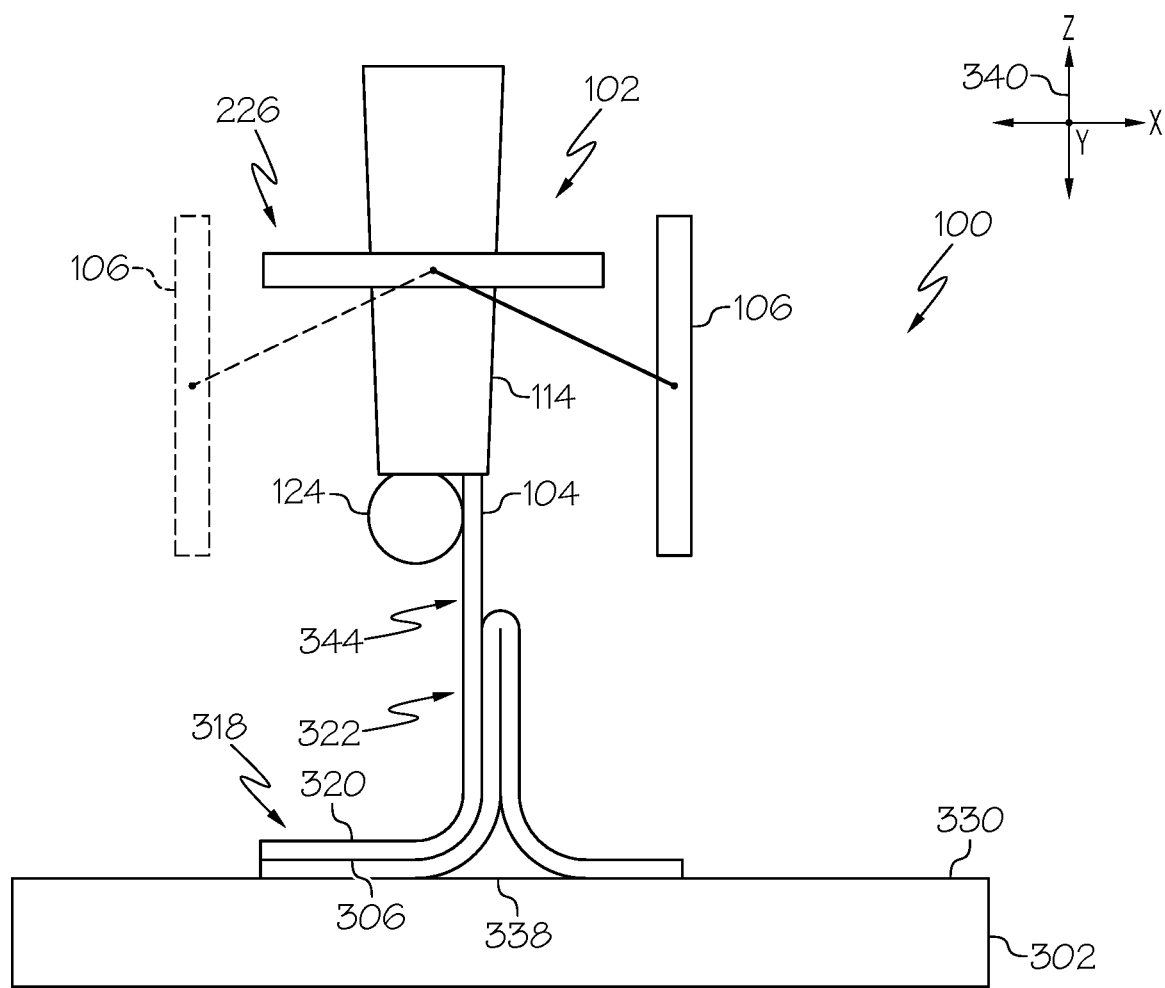

Referring to FIG. 26, in an example, the method 1000 includes a step of locating the backing plate 106 behind the web portion 322 of the first one of the subsequent plies 320.

Figure 27:
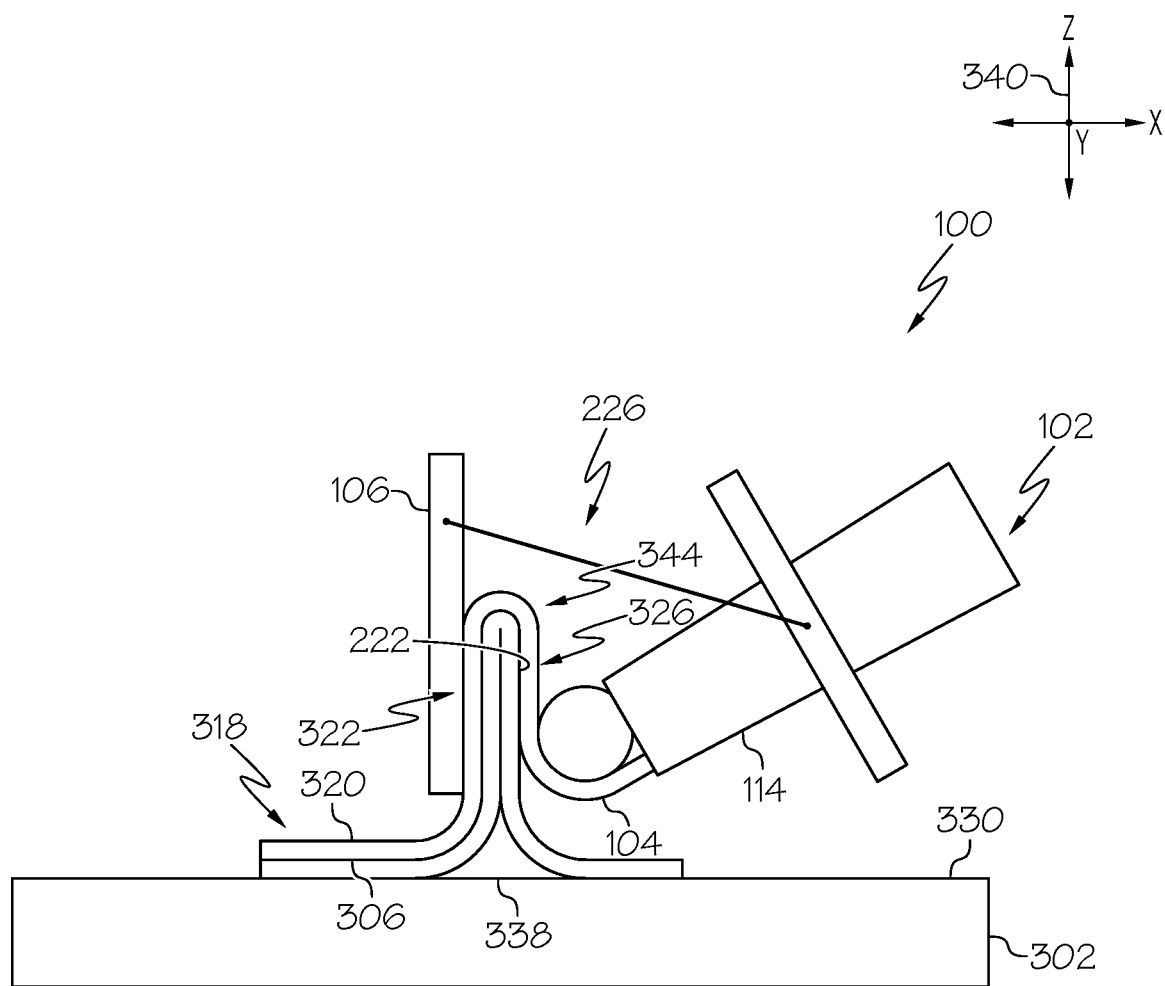

Referring to FIG. 27, in an example, the method 1000 includes a step of layup up, with the delivery head 114, the first one of the subsequent continuous segments 344 of the composite tape 104 on the complementary web portion 312 of the initial ply 306, supported by the backing plate 106, to form a complementary web portion 326 of the first one of the subsequent plies 320 of the composite stiffener 308.

Figure 28:
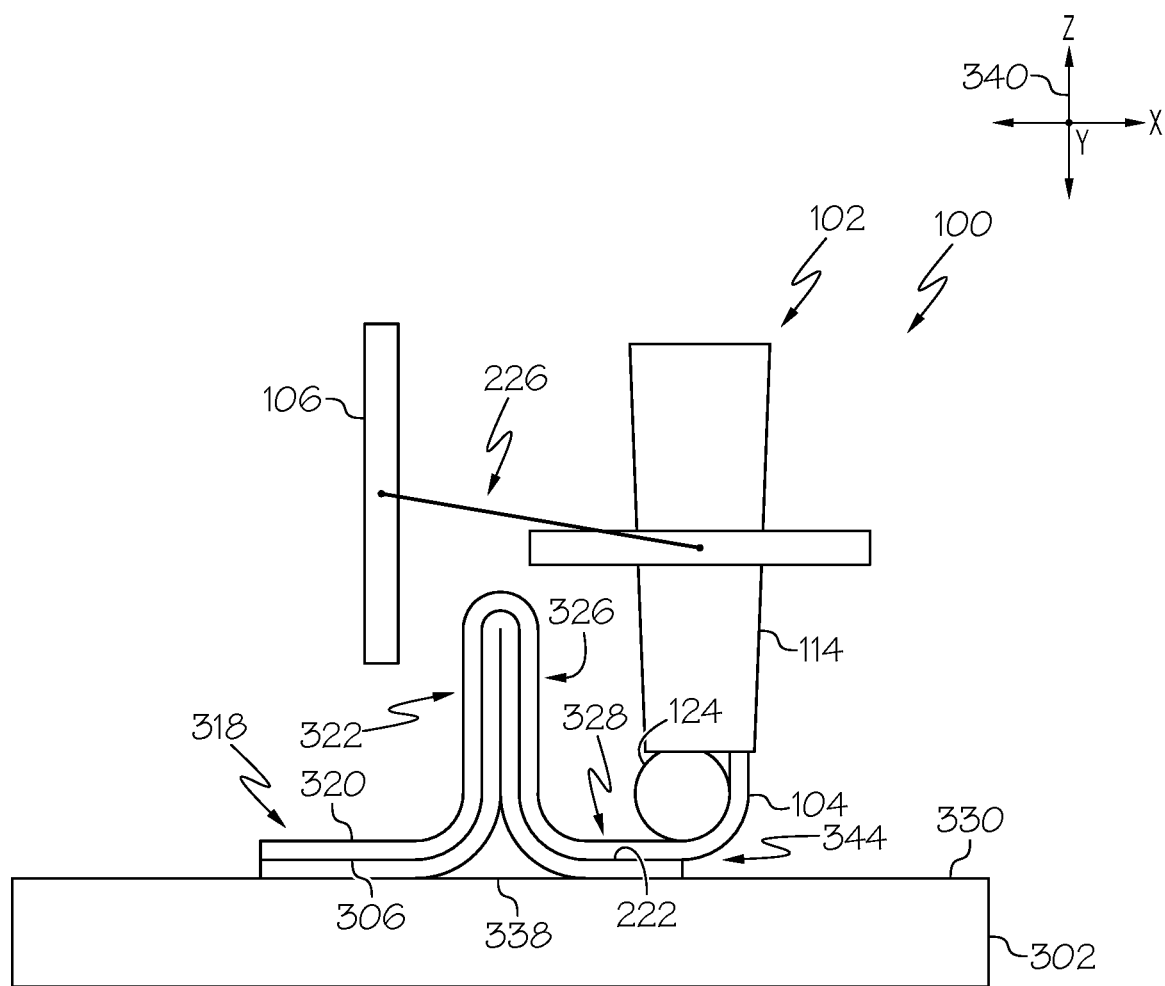

Referring to FIG. 28, in an example, the method 1000 includes a step of laying up, with the delivery head 114, the first one of the subsequent continuous segments 344 of the composite tape 104 on the complementary flange portion 314 of the initial ply 306 of the composite stiffener 308 to form a complementary flange portion 346 of the first one of the subsequent plies 320 of the composite stiffener 308.

In an example, the method 1000 includes a step of cutting the subsequent continuous segment 344 of the composite tape 104 to conclude the first one of the subsequent plies 320. In an example, cutting the subsequent continuous segment 344 of the composite tape 104 after placing the subsequent continuous segment 344 of the composite tape 104 to form the flange portion 318, the web portion 322, the complementary web portion 326, and the complementary flange portion 346 of the subsequent ply 320 further forms the base structure of the composite stiffener 308 having a T-shape in cross-section. In an example, cutting the subsequent continuous segment 344 of the composite tape 104 after placing the subsequent continuous segment 344 of the composite tape 104 to form the flange portion 318 and the web portion 322 of the subsequent ply 320 further forms the base structure of the composite stiffener 308 having a L-shape in cross-section.

Referring to FIG. 29, in an example, the method 1000 includes a step of laying up, with the delivery head 114, a first one of the subsequent continuous segments 344 of the composite tape 104 on the flange portion 304 of the initial ply 306 of the composite stiffener 308 to form a flange portion 318 of a first one of the subsequent plies 320 of the composite stiffener 308.

Referring to FIG. 30, in an example, the method 1000 includes a step of locating the backing plate 106 behind the complementary web portion 312 of the initial ply 306. In an example, the method 1000 includes a step of laying up, with the delivery head 114, a second one of the subsequent continuous segments 344 of the composite tape 104 on the web portion 310 of the initial ply 306, supported by the backing plate 106, to form a web portion 322 of the first one of the subsequent plies 320 of the composite stiffener 308.

In an example, the method 1000 includes a step of laying up, with the delivery head 114, a third one of the subsequent continuous segments 344 of the composite tape 104 on the complementary flange portion 314 of the initial ply 306 of the composite stiffener 308 to form a complementary flange portion 346 of the first third one of the subsequent plies 320 of the composite stiffener 308.

In an example, the method 1000 includes a step of locating the backing plate 106 behind the web portion 322 of the first one of the subsequent plies 320. In an example, the method 1000 includes a step of laying up, with the delivery head 114, a fourth one of the subsequent continuous segments 344 of the composite tape 104 on the complementary web portion 312 of the initial ply 306, supported by the backing plate 106, to form a complementary web portion 326 of the first one of the subsequent plies 320 of the composite stiffener 308.

In an example, the method 1000 includes a step of cutting the subsequent continuous segment 344 of the composite tape 104 to conclude each of the first one, the second one, the third one, and the fourth one of the subsequent plies 320.

In an example, the method 1000 includes a step of laying up, with the delivery head 114, additional ones of the subsequent continuous segments 344 of the composite tape 104 to form additional ones of the subsequent plies 320 of the composite stiffener 308.

It can be appreciated that the operational steps and, more particularly, the selectively locating and moving steps of the delivery head 114 and/or the backing plate 106 relative to each other may be performed as a continuous operation or in a step-wise manner.

Referring to FIG. 5, in some examples, the apparatus 100 includes one or more sensors 274. The sensors 274 are configured to determine the relative location (e.g., position and/or orientation) and relative movement (e.g., linear and/or rotational) of the delivery head 114 and/or the backing plate 106. In some examples, the sensors 274 generate information related to the location of the delivery head 114, such as in response to controlled selective movement of the delivery head 114 by the movement system 130. In some examples, the sensors 274 generate information related to the location of the backing plate 106, such as in response to controlled selective movement of the backing plate 106 by the drive assembly 174. The sensors 274 may include any one or more of proximity sensors, position sensors, accelerometers, infrared (IR) sensors, light sensors, ultrasonic sensors, and any other type of electronic sensors.

In some examples, the apparatus 100 includes one or more encoders 276. The encoders 276 are configured to convert information related to the location (e.g., position and/or orientation) and relative movement (e.g., linear and/or rotational) of the delivery head 114 and/or the backing plate 106 to a format or code usable by the controller 132 and/or the computer system 238. In an example, the encoders 276 convert information related to the location of the delivery head 114, such as provided by the sensors 274, for use by the controller 132 and/or the computer system 238 to selectively control the movement system 130. In an example, the encoders 276 convert information related to the location of the backing plate 106, such as provided by the sensors 274, for use by the controller 132 and/or the computer system 238 to selectively control the drive assembly 174. The encoders 276 may include any one or more of a device, electronic circuits, transducers (e.g., rotary encoders and/or linear encoders), and software programs and/or algorithms, for example, stored in the memory 134 and executed by one or more processors of the computer system 238.

In some examples, the controller 132 and/or the computer system 238 utilizes computer numerical control to automate and selectively control the location and movement of the delivery head 114 and the backing plate 106 when disposing the composite tape 104. The computer numerical control is operable to execute pre-programmed sequences of machine control commands.

Figure 33:
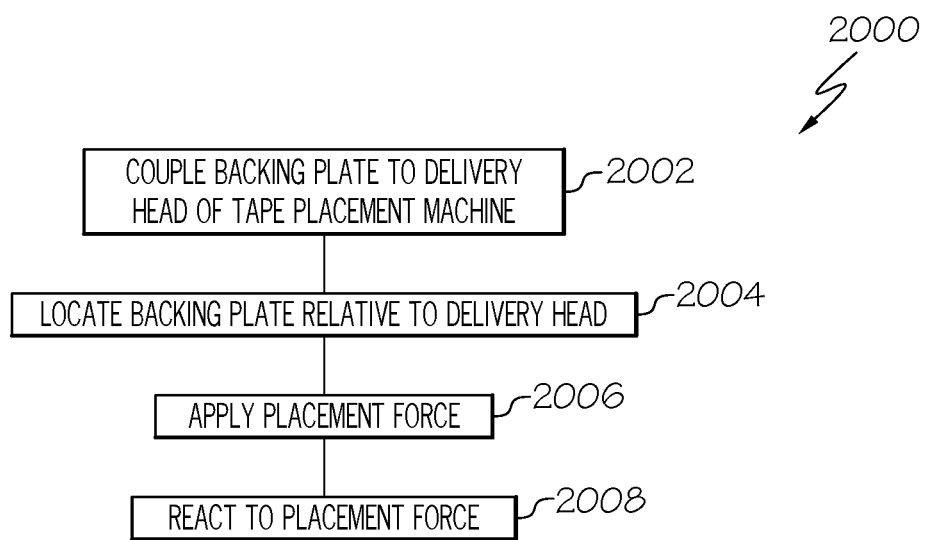
FIG. 33 is a flow diagram of an example of a disclosed method for reacting to a placement force applied by a tape placement machine laying up a composite tape.

Referring to FIG. 33, also disclosed is an example of a method 2000 for reacting to the placement force 112 applied by the tape placement machine 102 laying up the composite tape 104, for example, when forming the composite structure 300.

In an example, the method 2000 includes a step of coupling the backing plate 106 to the delivery head 114 of the tape placement machine 102 (Block 2002). In an example, the method 2000 includes a step of locating the backing plate 106 relative to the delivery head 114 (Block 2004). In an example, the method 2000 includes a step of applying, by the delivery head 114, the placement force 112 when laying up the composite tape 104 on the backing plate 106 with the delivery head 114 (Block 2006). In an example, the method 2000 includes a step of reacting, by the backing plate 106, to the placement force 112 when laying up the composite tape 104 on the backing plate 106 with the delivery head 114 (Block 2008).

In an example, the compaction roller 124 applies the placement force 112 (e.g., a compaction force) against the backing plate 106, which is linked via the reaction structure 226 to the delivery head 114.

In an example, the method 2000 includes a step of fixing a location of the backing plate 106. Fixing the location of the backing plate 106 enables the backing plate 106 to react to the placement force. In an example, the method 2000 includes a step of moving the delivery head 114 relative to the backing plate 106 when laying up the composite tape 104 on the backing plate 106. Moving the delivery head 114 along the backing plate 106 when laying the composite tape 104 and compressing the composite tape 104 generates the placement force.

Figure 34:
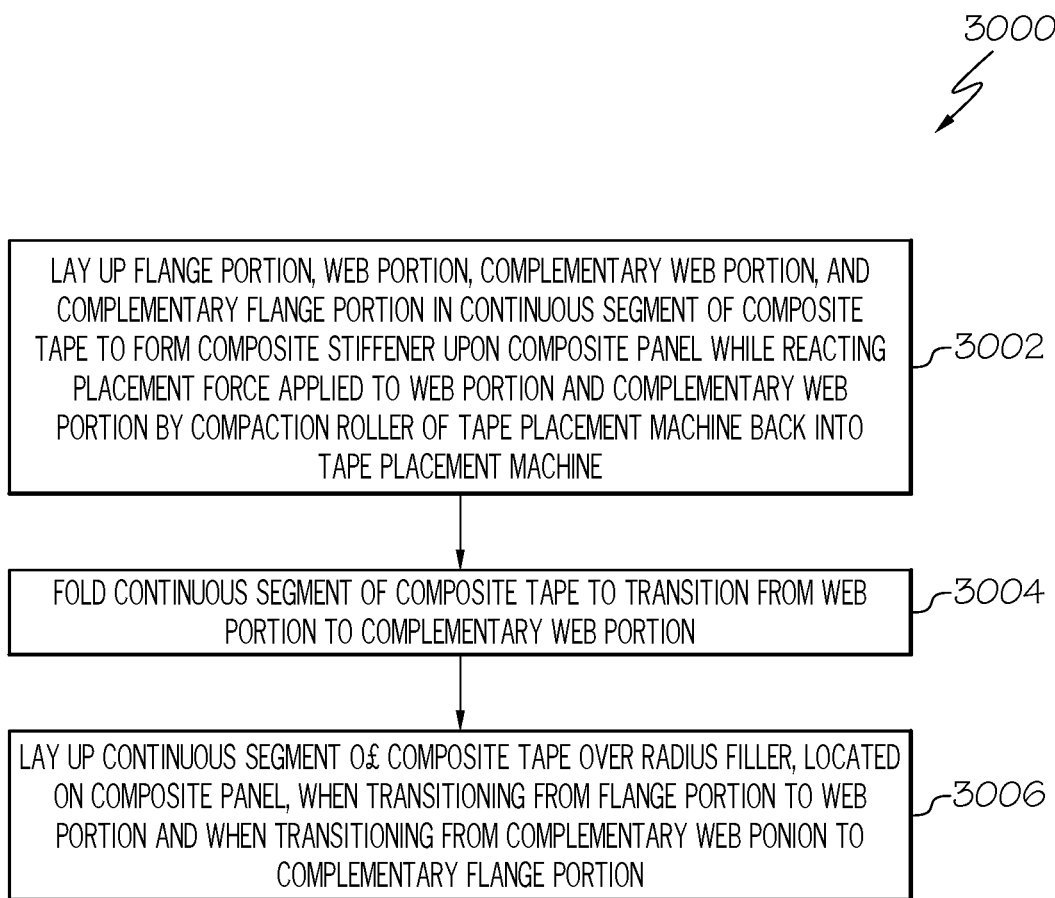
FIG. 34 is a flow diagram of an example of a disclosed method for fabricating a composite structure.

Referring to FIG. 34, also disclosed is a method 3000 for fabricating the composite structure 300. In an example, the method 3000 includes a step of laying up, with a tape placement machine 102, a flange portion 304, a web portion 310, a complementary web portion 312, and a complementary flange portion 314 in a continuous segment 342 of composite tape 104 to form a composite stiffener 308 upon a composite panel 302 while reacting a placement force 112 applied to the web portion 310 and the complementary web portion 312 by a compaction roller 124 of the tape placement machine 102 back into the tape placement machine 102 (Block 3002).

In an example, the method 3000 includes a step of folding the continuous segment 342 of the composite tape 104 to transition from the web portion 310 to the complementary web portion 312 (Block 3004).

In an example, the method 3000 also includes a step of laying up, with the tape placement machine 102, the continuous segment 342 of composite tape 104 over a radius filler 338, located on the composite panel 302, when transitioning from the flange portion 304 to the web portion 310 and when transitioning from the complementary web portion 312 to the complementary flange portion 314 (Block 3006).

Figure 35:
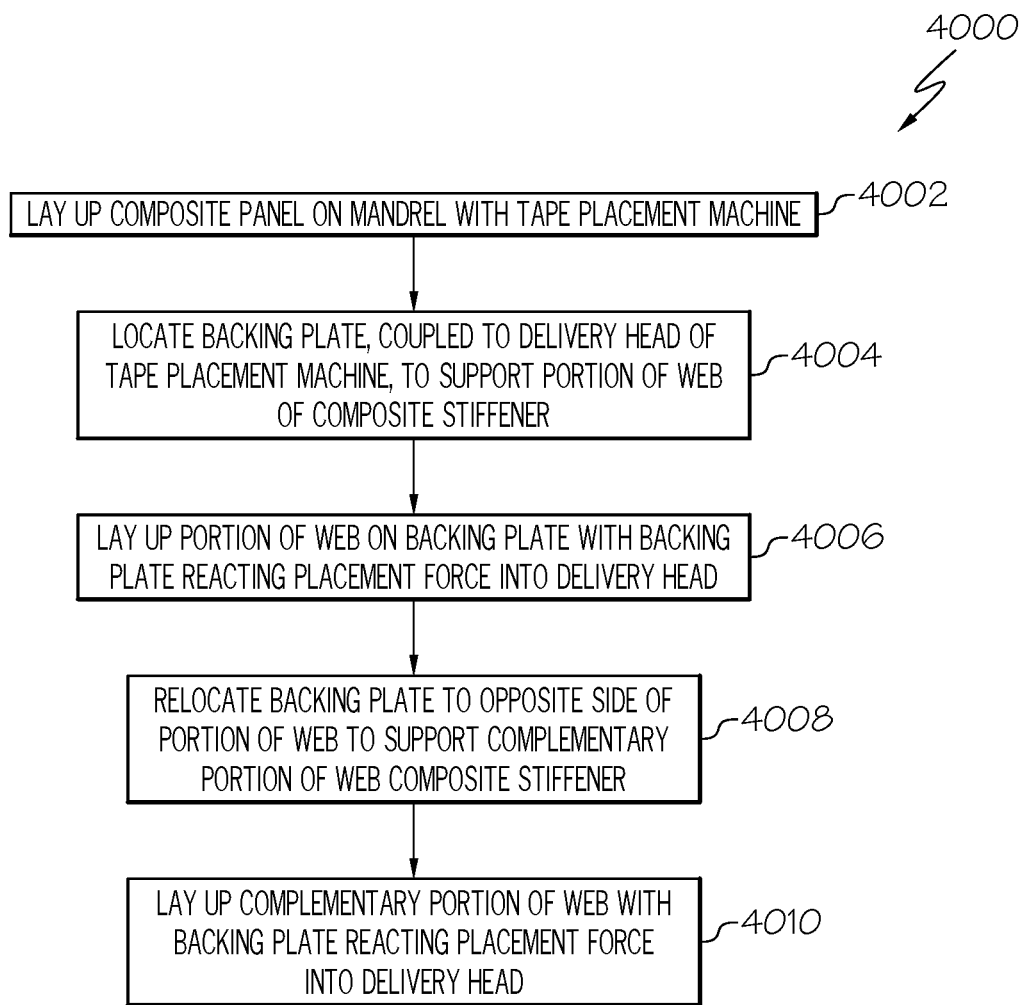
FIG. 35 is a flow diagram of an example of a disclosed method for fabricating a composite structure.

Referring to FIG. 35, also disclosed is a method 4000 for fabricating the composite structure 300 including the composite panel 302 with the integral composite stiffener 308. In an example, the method 4000 includes a step of laying up the composite panel 302 on the mandrel 116 with the tape placement machine 102 (Block 4002). In an example, the method 4000 includes a step of locating the backing plate 106, coupled to the delivery head 114 of the tape placement machine 102, to support a portion of the web 328 of the composite stiffener 308 (Block 4004). In an example, the method 4000 includes a step of laying up the portion of the web 328 on the backing plate 106 with the backing plate 106 reacting the placement force 112 into the delivery head 114 (Block 4006).

In an example, the method 4000 includes a step of relocating the backing plate 106 to an opposite side of the portion of the web 328 to support a complementary portion of the web 328 of the composite stiffener 308 (Block 4008). In an example, the method 4000 includes a step of laying up the complementary portion of the web 328 on the portion of the web 328 with the backing plate 106 reacting the placement force 112 into the delivery head 114 (Block 4010).

In accordance with the method 4000, in an example, the portion of the web 328 and the complementary portion of the web 328 are formed by the continuous segment 342 of the composite tape 104. In an example, the method 4000 includes a step of supporting the continuous segment 342 of the composite tape 104 with the delivery head 114 after forming the portion of the web 328. In an example, the method 4000 includes a step of folding the continuous segment 342 of the composite tape 104 to transition from the portion of the web 328 to the complementary portion of the web 328.

Also disclosed is a portion of the aircraft 1200 assembled according to the method 1000. Also disclosed is a portion of the aircraft 1200 assembled according to the method 2000. Also disclosed is a portion of the aircraft 1200 assembled according to the method 3000. Also disclosed is a portion of the aircraft 1200 assembled according to the method 4000.

In an example, the discloses apparatus 100 for fabricating the composite structure 300 includes the tape placement machine 102 including the delivery head 114 configured to dispose the composite tape 104. The apparatus 100 also includes the backing plate 106 coupled to the delivery head 114 and selectively located relative to the delivery head 114 to react to the placement force 112 applied by the tape placement machine 102 as the composite tape 104 is being disposed.

In an example, the apparatus 100 for fabricating the composite structure 300 includes the mandrel 116 to support formation of the composite panel 302 of the composite structure 300. The apparatus 100 also includes the tape placement machine 102 including the delivery head 114 configured to dispose the composite tape 104 and the compaction roller 124 configured to apply the placement force 112 when disposing the composite tape 104. The apparatus 100 also includes the backing plate 106 coupled to the delivery head 114 and selectively movable relative to the delivery head 114 to support formation of the composite stiffener 308 extending from the composite panel 302. The backing plate 106 reacts the placement force 112 back to the delivery head 114 when the delivery head 114 disposes the composite tape 104 on the backing plate 106.

Also disclosed are methods for fabricating a portion of the aircraft 1200 using the apparatus 100.

In accordance with the examples of the apparatus 100 and the methods 1000, 2000, 3000, and 4000, also disclosed is the composite structure 300 fabricated using the tape placement machine 102 including the delivery head 114 and the backing plate 106 that is movably coupled with the delivery head 114. In an example, the composite structure 300 includes the composite panel 302 and the composite stiffener 308 formed in situ on the composite panel 302 and including the web 328 formed on the backing plate 106 and extending from the composite panel 302.

In an example, the web 328 of the composite stiffener 308 includes the plurality of plies 334 of the composite tape 104 disposed on the backing plate 106 by the delivery head 114. Each one of the plies 334 partially forms the web portion 310 of the web 328 and the complementary web portion 312 of the web 328. At least some of the plies 334 are shared by the composite stiffener 308 and the composite panel 302.

In accordance with the examples of the methods 1000, 2000, 3000, and 4000 disclosed herein, in some examples, a plurality of apparatuses 100 or an apparatus 100 that includes a plurality of delivery heads 114, each having a backing plate 106 and a reaction structure 226 associated therewith, may be used cooperatively to fabricate the composite structure 300. In an example, the plurality of delivery heads 114 substantially form the composite panel 302, for example, by disposing a plurality of layers of the composite tape 104 on the mandrel 116 (FIG. 7). Upon the composite panel 302 being substantially formed, a plurality of delivery heads 114 operate concurrently to form the composite stiffener 308, for example, by disposing a plurality of layers of the composite tape 104 on the composite panel 302 and the backing plate 106 (FIG. 8), and to finalize formation of the composite panel 302.

Examples of the apparatus 100, composite structure 300, and methods 1000, 2000, 3000, and 4000 disclosed herein may find use in a variety of potential applications, particularly in the transportation industry, including for example, aerospace applications. Referring now to FIGS. 33 and 34, examples of the apparatus 100, composite structure 300, and methods 1000, 2000, 3000, and 4000 may be used in the context of an aircraft manufacturing and service method 1100, as shown in the flow diagram of FIG. 36, and the aircraft 1200, as shown in FIG. 37. Aircraft applications of the disclosed examples may include formation of a wing, airfoils, body panels, or other composite structures used in the manufacture of aircraft.

Figure 36:
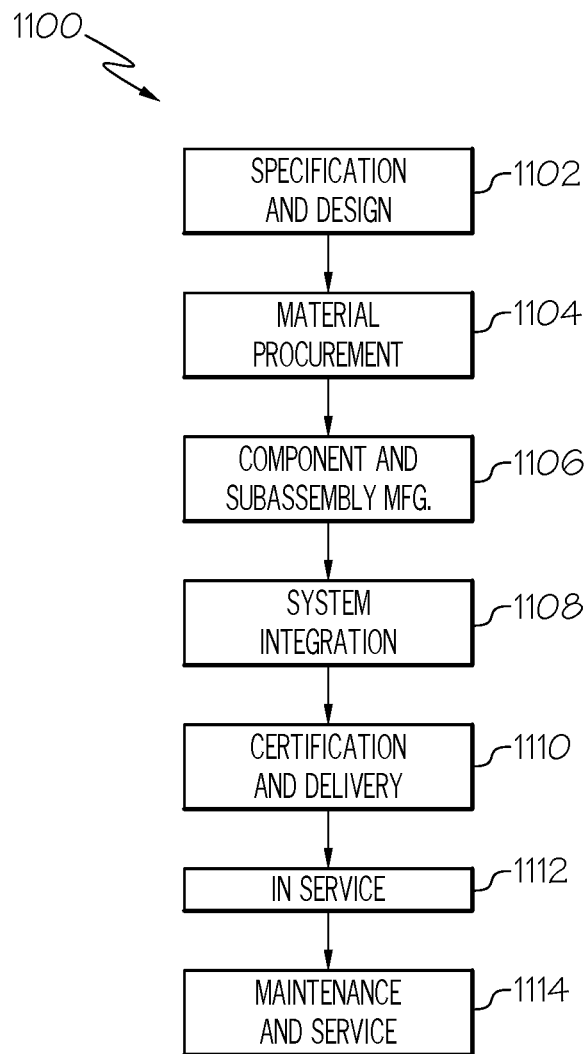
FIG. 36 is a flow diagram of an example aircraft production and service methodology.
Figure 37:
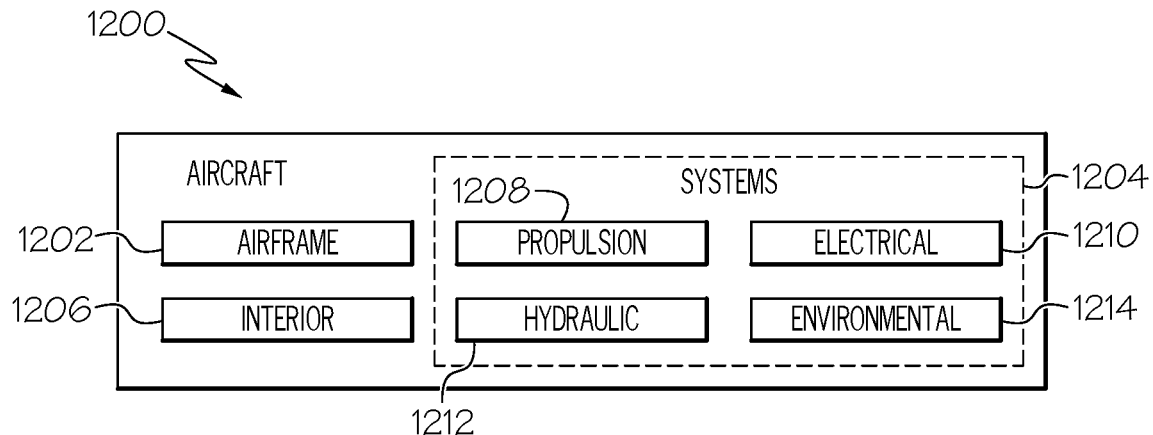
FIG. 37 is a schematic block diagram of another example of the aircraft.

As shown in FIG. 36, during pre-production, the illustrative method 1100 may include specification and design of aircraft 1200 (Block 1102) and material procurement (Block 1104). During production of the aircraft 1200, component and subassembly manufacturing (Block 1106) and system integration (Block 1108) of the aircraft 1200 may take place. Thereafter, the aircraft 1200 may go through certification and delivery (Block 1110) to be placed in service (Block 1112). Routine maintenance and service (Block 1114) may include modification, reconfiguration, refurbishment, etc. of one or more systems of the aircraft 1200. Examples of the disclosed apparatus 100, composite structure 300, and methods 1000, 2000, and 3000 may form a portion of or may be used or implemented with at least component and subassembly manufacturing (Block 1106), system integration (Block 1108), and routine maintenance and service (Block 1114).

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 37, the aircraft 1200 produced by the illustrative method 1100 may include the airframe 1202, a plurality of high-level systems 1204, and an interior 1206. Other examples of the high-level systems 1204 include one or more of a propulsion system 1208, an electrical system 1210, a hydraulic system 1212 and an environmental system 1214. Any number of other systems may be included. Examples of the disclosed apparatus 100, composite structure 300, and methods 1000, 2000, and 3000 may be used to manufacture portions of the airframe 1202 and the interior 1206.

Examples of the apparatus 100 and methods 1000 and 2000 shown or described herein may be employed during any one or more of the stages of the manufacturing and service method 1100 shown in the flow diagram illustrated by FIG. 36. For example, components or subassemblies, such as those that include the composite structure 300, corresponding to component and subassembly manufacturing (Block 1106) may be fabricated or manufactured in a manner similar to components or subassemblies produced while the aircraft 1200 is in service (Block 1112). Also, one or more examples of the apparatus 100, methods 1000 and 2000, or combinations thereof may be utilized during production stages (Blocks 1108 and 1110). Similarly, one or more examples of the apparatus 100, methods 1000 and 2000, or a combination thereof, may be utilized, for example and without limitation, while the aircraft 1200 is in service (Block 1112) and during maintenance and service stage (Block 1114).

Although an aerospace example is shown, the principles disclosed herein may be applied to other industries, such as the automotive industry. Accordingly, in addition to aircraft, the principles disclosed herein may apply to other vehicles, (e.g., land vehicles, marine vehicles, space vehicles, etc.).

Reference herein to "example" means that one or more feature, structure, element, component, characteristic and/or operational step described in connection with the example is included in at least one embodiment and or implementation of the subject matter according to the present disclosure. Thus, the phrase "an example" and similar language throughout the present disclosure may, but do not necessarily, refer to the same example. Further, the subject matter characterizing any one example may, but does not necessarily, include the subject matter characterizing any other example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise indicated, the terms "first", "second", etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, "coupled", "coupling", and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In FIGS. 5 and 37, referred to above, the blocks may represent elements, components, and/or portions thereof and lines, if any, connecting various elements and/or components may represent mechanical, electrical, fluid, optical, electromagnetic and other couplings and/or combinations thereof. Couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples. Likewise, elements and/or components, if any, represented with dashed lines, indicate alternative examples. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 5 and 47 may be combined in various ways without the need to include other features described in FIGS. 1 and 38, other drawing figures, and/or the accompanying disclosure, even though such combination or combinations are not explicitly illustrated herein. Similarly, additional features not limited to the examples presented, may be combined with some or all of the features shown and described herein.

In FIGS. 16 and 33-36, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 16 and 33-36 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various examples of the disclosed apparatus, composite structure, and methods have been shown and described, modifications may occur to those skilled in the art upon reading the specification. The present application includes such modifications and is limited only by the scope of the claims.

What is claimed is:

1. A method for fabricating a composite structure, the method comprising:
   laying up, with a delivery head of a tape placement machine, a continuous segment of a composite tape on a composite panel to form a flange portion of an initial ply of a composite stiffener;
   locating a backing plate, coupled to the delivery head, relative to the delivery head and composite panel; and
   further laying up, with the delivery head, the continuous segment of the composite tape on the backing plate to form a web portion of the initial ply of the composite stiffener.

2. The method of claim 1, further comprising:
   fixing a location of the backing plate relative to the composite panel; and
   moving the delivery head relative to the backing plate when laying up the continuous segment of the composite tape on the backing plate to form the web portion of the initial ply of the composite stiffener.

3. The method of claim 1, further comprising:
   relocating the backing plate to a side of the web portion of the initial ply, opposite from the delivery head;
   further laying up, with the delivery head, the continuous segment of the composite tape on the web portion of the initial ply, supported by the backing plate, to form a complementary web portion of the initial ply of the composite stiffener; and
   further laying up, with the delivery head, the continuous segment of the composite tape on the composite panel to form a complementary flange portion of the initial ply of the composite stiffener.

4. The method of claim 3, further comprising folding the continuous segment of the composite tape to transition from the web portion of the initial ply to the complementary web portion of the initial ply.

5. The method of claim 3, further comprising:
   fixing a location of the delivery head relative to the composite panel to support an orientation of the web portion of the initial ply of the composite stiffener;
   moving the backing plate relative to the delivery head to separate the backing plate from a first surface of the web portion of the initial ply;
   moving the backing plate relative to the delivery head into contact engagement with a second surface of the web portion of the initial ply, opposite the first surface of the web portion of the initial ply; and
   supporting the web portion of the initial ply with the backing plate when laying up the composite tape on the web portion of the initial ply to form the complementary web portion of the initial ply of the composite stiffener.

6. The method of claim 5, further comprising:
   fixing a location of the backing plate relative to the web portion of the initial ply of the composite stiffener; and
   moving the delivery head relative to the backing plate when laying up the continuous segment of the composite tape on the web portion to form the complementary web portion of the initial ply of the composite stiffener.

7. The method of claim 3, further comprising laying up, with the delivery head, a plurality of subsequent continuous segments of the composite tape on the initial ply to form a plurality of subsequent plies of the composite stiffener.

8. The method of claim 7, further comprising:
   locating the backing plate behind the complementary web portion of the initial ply of the composite stiffener; and
   laying up, with the delivery head, a first one of the subsequent continuous segments of the composite tape on the web portion of the initial ply of the composite stiffener, supported by the backing plate, to form a web portion of a first one of the subsequent plies of the composite stiffener.

9. The method of claim 8, further comprising:
   locating the backing plate behind the web portion of the initial ply of the composite stiffener; and
   further laying up, with the delivery head, the first one of the subsequent continuous segments of the composite tape on the complementary web portion of the initial ply, supported by the backing plate, to form a complementary web portion of the first one of the subsequent plies of the composite stiffener.

10. The method of claim 8, further comprising:
    locating the backing plate behind the web portion of the initial ply of the composite stiffener; and
    laying up, with the delivery head, a second one of the subsequent continuous segments of the composite tape on the complementary web portion of the initial ply, supported by the backing plate, to form a complementary web portion of the first one of the subsequent plies of the composite stiffener.

11. The method of claim 7, further comprising:
    laying up the composite panel on a mandrel; and
    placing a radius filler on the composite panel before laying up the composite tape to form the composite stiffener.

12. The method of claim 1, wherein the composite tape comprises a thermosetting resin.

13. The method of claim 1, further comprising co-curing the composite stiffener and the composite panel.

14. A method for reacting to a placement force applied by a tape placement machine laying up a composite tape, the method comprising:
coupling a backing plate to a delivery head of the tape placement machine with a reaction structure;
selectively locating the backing plate relative to the delivery head with a drive assembly;
laying up, with the delivery head, the composite tape on the backing plate;
applying, by the delivery head, the placement force to the composite tape when laying up the composite tape on the backing plate with the delivery head; and
reacting to the placement force through the backing plate to the reaction structure and from the reaction structure back to the delivery head when laying up the composite tape on the backing plate with the delivery head.

15. The method of claim 14, further comprising:
fixing a location of the backing plate relative to the delivery head before laying up the composite tape on the backing plate; and
moving the delivery head relative to the backing plate when laying up the composite tape on the backing plate.

16. A method for fabricating a composite structure, the method comprising:
laying up, with a tape placement machine, a flange portion, a web portion, a complementary web portion, and a complementary flange portion in a continuous segment of a composite tape to partially form a composite stiffener upon a composite panel while reacting a placement force applied to the web portion and the complementary web portion by a compaction roller of the tape placement machine back into the tape placement machine; and
laying up, with the tape placement machine, the continuous segment of the composite tape over a radius filler, located on the composite panel, when transitioning from the flange portion to the web portion and when transitioning from the complementary web portion to the complementary flange portion.

17. The method of claim 16, further comprising folding the continuous segment of the composite tape to transition from the web portion to the complementary web portion.

18. A method for fabricating a composite structure comprising a composite panel with an integral composite stiffener, the method comprising:
laying up the composite panel on a mandrel with a tape placement machine;
locating a backing plate, coupled to a delivery head of the tape placement machine, to support a portion of a web of the composite stiffener; and
laying up the portion of the web on the backing plate with the backing plate reacting a placement force into the delivery head.

19. The method of claim 18, further comprising:
relocating the backing plate to an opposite side of the portion of the web to support a complementary portion of the web of the composite stiffener; and
laying up the complementary portion of the web on the portion of the web with the backing plate reacting the placement force into the delivery head.

20. The method of claim 19, wherein:
the portion of the web and the complementary portion of the web are formed by a continuous segment of a composite tape; and
the method further comprises:
supporting the continuous segment of the composite tape with the delivery head after forming the portion of the web; and
folding the continuous segment of the composite tape to transition from the portion of the web to the complementary portion of the web.

* * * * *